US012228866B2

(12) United States Patent
Fukasawa et al.

(10) Patent No.: US 12,228,866 B2
(45) Date of Patent: Feb. 18, 2025

(54) IMAGE FORMING APPARATUS AND DEVELOPING CARTRIDGE

(71) Applicant: CANON KABUSHIKI KAISHA, Tokyo (JP)

(72) Inventors: Yu Fukasawa, Tokyo (JP); Yukio Kubo, Tokyo (JP); Daisuke Abe, Suntou-gun (JP); Mitsuhiro Sato, Akishima (JP); Masahiro Suetsugu, Kawasaki (JP); Kengo Sakai, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/243,792

(22) Filed: Sep. 8, 2023

(65) Prior Publication Data

US 2023/0418182 A1 Dec. 28, 2023

Related U.S. Application Data

(63) Continuation of application No. 17/530,601, filed on Nov. 19, 2021, now Pat. No. 11,789,378, which is a (Continued)

(30) Foreign Application Priority Data

Jul. 17, 2019 (JP) ................................ 2019-132086
Jul. 23, 2019 (JP) ................................ 2019-135189
(Continued)

(51) Int. Cl.
*G03G 15/08* (2006.01)

(52) U.S. Cl.
CPC ................................ *G03G 15/0863* (2013.01)

(58) Field of Classification Search
CPC ............ G03G 15/0863; G03G 21/181; G03G 21/1647; G03G 21/1652; G03G 21/1676;
(Continued)

(56) References Cited

U.S. PATENT DOCUMENTS 7,986,897 B2 7/2011 Nishimura
9,291,994 B2 3/2016 Kanno et al.
(Continued)

FOREIGN PATENT DOCUMENTS

JP 2003-195730 A 7/2003
JP 2003-280491 A 10/2003
(Continued)

OTHER PUBLICATIONS

Japanese Office Action dated Apr. 2, 2024, in related Japanese Patent Application No. 2020-098379.
(Continued)

*Primary Examiner* — Sandra Brase
(74) *Attorney, Agent, or Firm* — VENABLE LLP

(57) ABSTRACT

An image forming apparatus includes a main body having a first metal terminal, a plurality of toner cartridges to store toner and including a housing storing the toner, a supporting member provided at one end, and a memory medium including a chip for recording information about the toner cartridge and an electrical contact and being supported by the supporting member, and a tray movable between a housed position and a drawn-out position. The tray includes a frame which can mount the plurality of toner cartridges, a plurality of tray-side electrical contacts provided at the frame and able to contact the electrical contact of the memory medium of the plurality of toner cartridges respectively, and a second metal terminal electrically connected to the plurality of tray-side electrical contacts and able to contact the first metal terminal.

13 Claims, 44 Drawing Sheets

Related U.S. Application Data continuation of application No. 16/928,076, filed on Jul. 14, 2020, now Pat. No. 11,204,566.

(30) Foreign Application Priority Data

Jul. 29, 2019 (JP) ................................ 2019-139129
Sep. 20, 2019 (JP) ................................ 2019-172221
Jun. 5, 2020 (JP) ................................ 2020-098379

(58) Field of Classification Search
CPC .......... G03G 21/1842; G03G 21/1821; G03G 21/1825
See application file for complete search history.

(56) References Cited

U.S. PATENT DOCUMENTS

| | | | |
|---|---|---|---|
| 9,304,484 | B2 | 4/2016 | Ogino et al. |
| 9,310,756 | B2 | 4/2016 | Koishi et al. |
| 9,946,190 | B2 | 4/2018 | Itabashi |
| 10,095,178 | B2 | 10/2018 | Ogino et al. |
| 10,545,429 | B2 | 1/2020 | Itabashi |
| 10,564,594 | B2 | 2/2020 | Ogino et al. |
| 11,029,624 | B2 | 6/2021 | Itabashi |
| 11,204,566 | B2 | 12/2021 | Fukasawa et al. |
| 11,347,162 | B2 | 5/2022 | Itabashi |
| 11,474,450 | B2 | 10/2022 | Itabashi |
| 11,474,451 | B2 | 10/2022 | Itabashi |
| 11,592,764 | B2 | 2/2023 | Itabashi |
| 11,789,378 | B2 * | 10/2023 | Fukasawa .......... G03G 15/0863 399/83 |
| 2010/0239314 | A1 | 9/2010 | Takayama |
| 2018/0181058 | A1 | 6/2018 | Yokoi |
| 2018/0284647 | A1 | 10/2018 | Yokoi |
| 2019/0041792 | A1 | 2/2019 | Kishi et al. |
| 2019/0196361 | A1 | 6/2019 | Kyotani |
| 2021/0034003 | A1 | 2/2021 | Kubo et al. |

FOREIGN PATENT DOCUMENTS

| | | | |
|---|---|---|---|
| JP | 2004-264757 | A | 9/2004 |
| JP | 2006-337532 | A | 12/2006 |
| JP | 2009-003174 | A | 1/2009 |
| JP | 2011-069953 | A | 4/2011 |
| JP | 2011-075654 | A | 4/2011 |
| JP | 2015-062053 | A | 4/2015 |
| JP | 2015-152803 | A | 8/2015 |
| JP | 2016-008977 | A | 1/2016 |
| JP | 2017-116826 | A | 6/2017 |
| JP | 2018-031862 | A | 3/2018 |

OTHER PUBLICATIONS

Japanese Office Action dated Nov. 26, 2024, in related Japanese Patent Application No. 2024-147498.

* cited by examiner

IMAGE FORMING APPARATUS AND DEVELOPING CARTRIDGE

This application is a continuation of application Ser. No. 17/530,601, filed Nov. 19, 2021, which is a continuation of application Ser. No. 16/928,076, filed Jul. 14, 2020, now U.S. Pat. No. 11,204,566, issued Dec. 21, 2021.

BACKGROUND OF THE INVENTION

Field of the Invention

The present invention relates to an image forming apparatus and a developing cartridge.

Description of the Related Art

Conventionally, electrophotographic image forming apparatuses such as laser printers or LED printers are known. In those image forming apparatuses, a method of attaching and detaching a developing cartridge including a container for containing a developer to and from an apparatus main body is known. Further, a developing cartridge-type image forming apparatus may be provided with a cartridge tray for mounting a developing cartridge. Due to this, a user can easily draw out the cartridge tray from the image forming apparatus main body and replace the developing cartridge. A cartridge tray is provided with a photosensitive drum at a position facing a developing roller of a developing cartridge. The developing roller supplies a developer to a photoconductor to develop a latent image. An image is formed by supplying a toner in a developing cartridge through a developing roller to a photosensitive drum on which an electrostatic latent image is formed by selective exposure after charging. For example, Japanese Patent Application Laid-open 2016-008977 discloses an image forming apparatus having a cartridge tray to which a developing cartridge can be detachably attached.

The developing cartridge may be provided with a memory medium which stores information about the developing cartridge. The information about the developing cartridge includes yield information such as the number of printable sheets, information indicating the remaining amount of developer, and the like. These pieces of information are used for controlling the apparatus or managing the life of the developing cartridge by a control unit of the image forming apparatus main body. For example, when a memory chip such as a contact-type IC chip is used as the memory medium, information about the cartridge is communicated between the memory medium and the control unit of the image forming apparatus main body by bringing an electrical contact portion of the memory medium into contact with an electrical contact portion of the cartridge tray or the apparatus main body. For example, Japanese Patent Application Laid-open 2015-062053 discloses a memory medium which stores information about a cartridge.

Japanese Patent Application Laid-open 2015-062053 discloses an image forming apparatus in which information about a developing cartridge is stored in a memory unit provided in a side folder of a cartridge and used for control.

SUMMARY OF THE INVENTION

When a developing cartridge has a memory medium and information of the memory medium is read through a contact portion provided on a cartridge tray, an engaging portion and a contact portion with the memory medium of the developing cartridge is provided in the cartridge tray. Further, the cartridge tray needs to be provided with a tray communication unit for communicating with an image forming apparatus main body. Further, the apparatus main body needs to be provided with a main body side metal terminal for communicating with a tray side metal terminal.

Therefore, a space for arranging parts for information communication is required in the cartridge tray or the developing cartridge, which may increase the size of the image forming apparatus. Alternatively, instead of increasing the size of the apparatus, it is necessary to reduce the size of the cartridge tray or the developing cartridge to secure a component arrangement space. However, for example, when the size of the developing cartridge is reduced to secure the component arrangement space, there may occur a problem such as a decrease in the amount of developer which can be stored in the developing cartridge.

The present invention has been made in view of the above problems, and an object of the present invention is to provide a technology for an image forming apparatus, in which a developing cartridge provided with a memory medium is mounted on a cartridge tray, capable of suppressing an increase in the size of the image forming apparatus or securing a developer capacity in the developing cartridge.

In view of the above problems, another object of the present invention is to provide a technology capable of downsizing a memory medium unit.

By the way, since a developing roller is a member exposed to the outside of the developing cartridge in use, a protective member may cover and protect the developing roller so as to prevent damage during conveyance. Further, since an electrical contact portion of a memory chip is also exposed to the outside of the developing cartridge, a protective member may cover the electrical contact portion of the memory chip so as to prevent damage during conveyance. However, when a plurality of protective members for protecting the developing roller and the electrical contact portion are provided, the time and effort are required to remove the plurality of protective members and the replacement work is time-consuming, resulting in deterioration of usability. Further, there is a concern that a user may forget to remove one of the protective members, or a user may come into contact with the electrical contact portion in the process of removing one protective member and then the other protective member.

In view of the above problems, an object of the present invention is to provide a developing cartridge capable of improving usability.

Further, in such an image forming apparatus, a memory unit is attached to the developing cartridge, and a control unit provided on the main body side of the image forming apparatus reads information from the memory unit or writes information to the memory unit. As the memory unit, a contact-type IC chip is suitable from the viewpoint of performance or cost. Communication between the control unit and the memory unit is enabled by contacting an electrical contact portion of a memory connection unit on the main body side electrically connected to the control unit and an electrical contact portion of a cartridge side electrically connected to the memory unit.

However, as such, in the configuration in which the memory unit attached to the developing cartridge side and the memory connection unit attached to the image forming apparatus main body side are in contact with each other at the electrical contact portion, a friction may occur between the memory unit and the memory connection unit when a relative position between the image forming apparatus main body and the developing cartridge changes. Such a change in the relative position occurs, for example, during a separating operation of separating the photosensitive drum arranged on the main body side and the developing roller arranged on the developing cartridge side.

In view of the above problems, an object of the present invention is to provide a technology for reducing a friction of a memory unit which stores information about a developing cartridge.

The present invention provides an image forming apparatus comprising:

a main body;

a developing cartridge which stores a developer, the developing cartridge including:

a housing;

a memory medium which is provided in the housing and stores information about the developing cartridge, and a memory medium unit which supports the memory medium;

a developer carrier which carries the developer; and a protrusion portion protruding in a longitudinal direction of the developer carrier from part of the housing which intersects with the longitudinal direction; and a tray which is movable between a housed position housed in the main body and a drawn-out position drawn out from the main body, the tray including:

a frame on which the developing cartridge is mountable;

an image bearing member provided so as to face the developer carrier when the developing cartridge is mounted on the frame, an electrostatic latent image being formed on the image bearing member, and the image bearing member being supplied with the developer from the developer carrier to the electrostatic latent image;

a guide member which is provided at a position corresponding to one end of the developing cartridge in the longitudinal direction when the developing cartridge is mounted on the frame, and guides the protrusion portion, and an electrical contact portion which abuts on and is electrically connected to the memory medium when the developing cartridge is mounted on the frame; and a memory unit support portion which supports the memory medium unit when the developing cartridge is mounted on the frame, wherein the guide member includes a portion which functions as the memory unit support portion that supports the memory medium unit when the developing cartridge is mounted on the frame, and a downstream portion located downstream of the memory unit support portion in a mounting direction of the developing cartridge, and the memory unit support portion guides the protrusion portion toward a surface of the downstream portion abutting on the developing cartridge when the developing cartridge is mounted on the frame.

The present invention also provides a developing cartridge comprising:

a housing which stores a developer;

a developing roller which is supported to the housing so that at least part of the developing roller is exposed to the outside of the housing, and develops a latent image formed on an image bearing member of an image forming apparatus with the developer in a state in which the developing cartridge is mounted on an apparatus main body of the image forming apparatus;

a memory unit which includes an electrical contact portion exposed to the outside of the housing and stores information about the developing cartridge; and a cover member formed as an integrated member including a first cover portion which covers at least part of a portion where the developing roller is exposed to the outside of the housing and a second cover portion which covers at least part of the electrical contact portion, the cover member being detachably attached to the housing.

The present invention also provides an image forming apparatus comprising:

a main body; and a developing cartridge which stores a developer, the developing cartridge including:

a housing;

a memory medium which is provided in the housing and stores information about the developing cartridge, and a memory medium unit which supports the memory medium; and a developer carrier which carries the developer; and a tray which is movable between a housed position housed in the main body and a drawn-out position drawn out from the main body, the tray including:

a frame on which the developing cartridge is mountable;

an image bearing member provided so as to face the developer carrier when the developing cartridge is mounted on the frame, an electrostatic latent image being formed on a surface of the image bearing member, and the image bearing member being supplied with the developer from the developer carrier to the electrostatic latent image;

a guide member which is provided at a position corresponding to at least one end portion in the longitudinal direction of the developing cartridge when the developing cartridge is mounted on the frame, and guides the mounting of the developing cartridge;

an electrical contact portion which is pressurized and electrically connected to the memory medium when the developing cartridge is mounted on the frame; and a memory unit support portion which supports the memory medium unit while maintaining an electrical connection between the memory medium and the electrical contact portion when the developing cartridge is mounted on the frame, wherein the developing cartridge is configured to be movable to a first mounting position at which the developer carrier abuts on the image bearing member and a second mounting position at which the developer carrier is separated from the image bearing member, with respect to the frame in a state of being mounted on the frame, and when the developing cartridge moves from the first mounting position to the second mounting position, the memory medium unit is configured to pressurize the memory medium against the electrical contact portion in substantially the same direction as a horizontal direction perpendicular to a direction of gravity when the developing cartridge moves with respect to the frame.

The present invention also provides an image forming apparatus comprising:

a main body;

a cartridge tray which is movable between a first tray position stored in the main body and a second tray position drawn out from the main body;

a developing cartridge housed in the cartridge tray, the developing cartridge including:

a housing;

a memory which is arranged in the housing and stores information about the developing cartridge;

a container which is capable of storing a developer; and a developer carrier which is supplied with the developer from the container;

an image bearing member on which an electrostatic latent image formed on a surface is developed by the developer supplied from the developing cartridge, the image bearing member being arranged to face the developer carrier when the developing cartridge is housed in the cartridge tray; and a memory connection unit provided in the main body and electrically connected to the memory, wherein the memory connection unit moves according to a change between a separation position at which the developer carrier and the image bearing member are separated from each other and an abutting position at which the developer carrier and the image bearing member abut on each other in a positional relationship between the cartridge tray and the developing cartridge housed in the cartridge tray, so that an electrical connection between the memory and the memory connection unit is maintained.

According to the present invention, it is possible to provide a technology for the image forming apparatus in which the developing cartridge provided with the memory medium is mounted on the cartridge tray, capable of suppressing an increase in the size of the image forming apparatus or securing the developer capacity in the developing cartridge.

Further, it is possible to provide a technology capable of downsizing the memory medium unit.

Further, according to the present invention, it is possible to provide the developing cartridge capable of improving usability.

Further, according to the present invention, it is possible to provide a technology for reducing the friction of the memory unit for storing the information about the developing cartridge.

Further features of the present invention will become apparent from the following description of exemplary embodiments with reference to the attached drawings.

DESCRIPTION OF THE EMBODIMENTS

Figure 1:
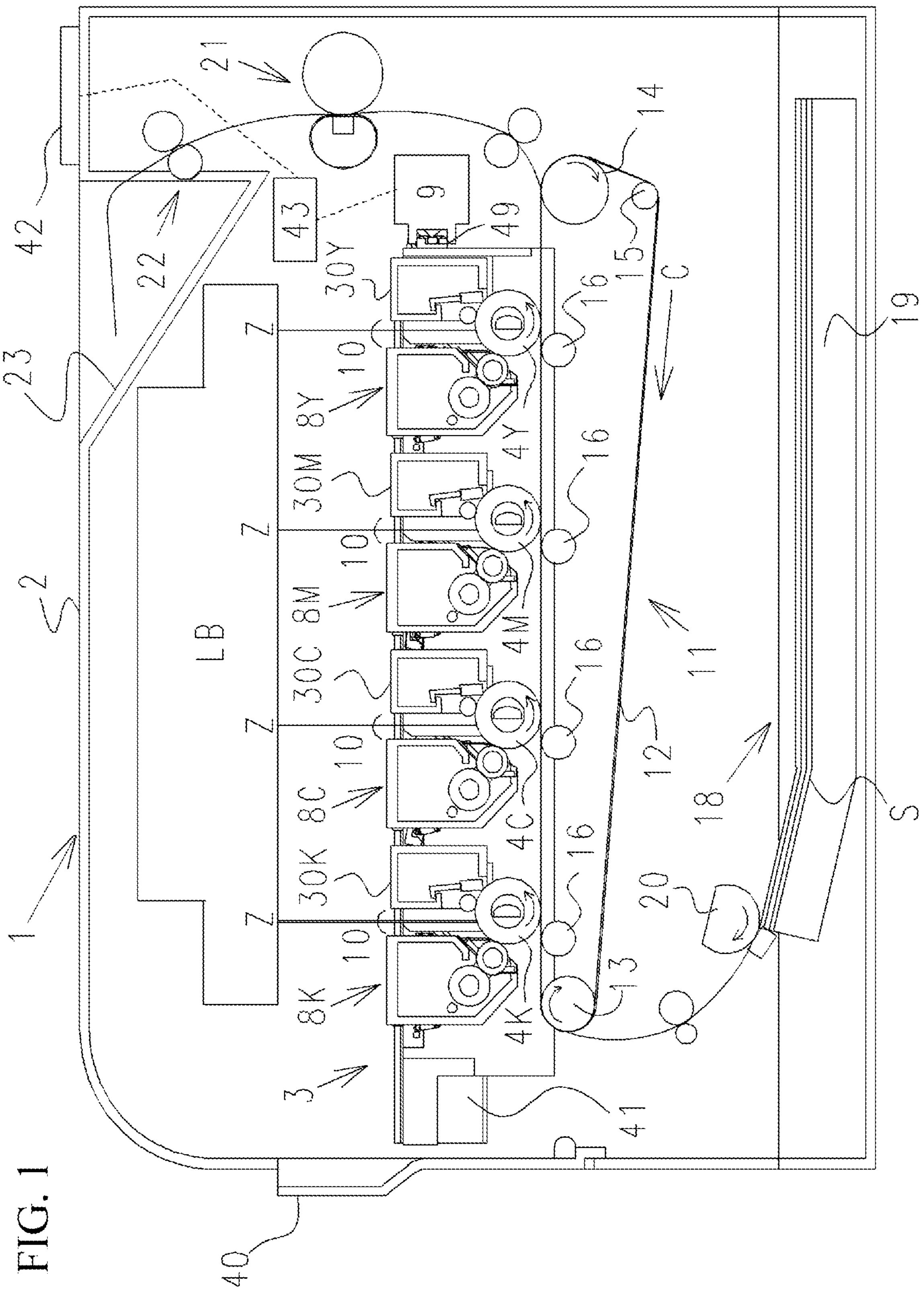
FIG. 1 is a schematic cross-sectional view of an image forming apparatus.

In the following description, modes for carrying out the present invention will be exemplarily described in detail with reference to the drawings and the embodiments. However, the functions, materials, shapes, relative arrangements, and the like of the constituent elements described in this embodiment are not intended to limit the scope of the present invention unless otherwise specified. Further, the functions, materials, shapes, and the like of the members described once in the following description are the same as those in the first description unless otherwise specified.

Further, in the following description, a direction extending on a drum axis (rotation axis) of a photosensitive drum of a cartridge tray is referred to as a "first direction, longitudinal direction, or longitudinal". Further, a direction intersecting with the first direction (in the present embodiment, a direction in which a developing cartridge is inserted into a cartridge tray) is referred to as a "second direction" or a "developing cartridge mounting direction". Further, a direction in which a cartridge tray is inserted into an image forming apparatus main body is referred to as a "third direction" or a "cartridge tray mounting direction". Further, when it is necessary to explain the shapes of members constituting a developing cartridge and a positional relationship between the members, a description will be given using these directions on the assumption that a housing of a developing cartridge is in the same attitude as when mounted on a cartridge tray.

The first direction and the second direction intersect with each other and are preferably orthogonal to each other. The second direction and the third direction intersect with each other and are preferably orthogonal to each other. The third direction and the first direction intersect with each other and are preferably orthogonal to each other. In the drawings related to a certain embodiment, the first direction corresponds to a Y direction, the second direction corresponds to a Z direction, and the third direction corresponds to an X direction, but the present invention is not limited to this example.

Further, in the following description, with respect to the image forming apparatus, a side provided with a front door is a front surface (anterior surface), and a surface opposite to the front surface is a rear surface (posterior surface). Further, when seen from the front of the image forming apparatus, a left side is referred to as a driving side and a right side is referred to as a non-driving side.

Embodiment 1

An embodiment of an image forming apparatus 1 according to the present invention and a developing cartridge 8 and a cartridge tray 3 used in the image forming apparatus 1 will be described with reference to the drawings.

<<Configuration of Image Forming Apparatus>>

Figure 2A:
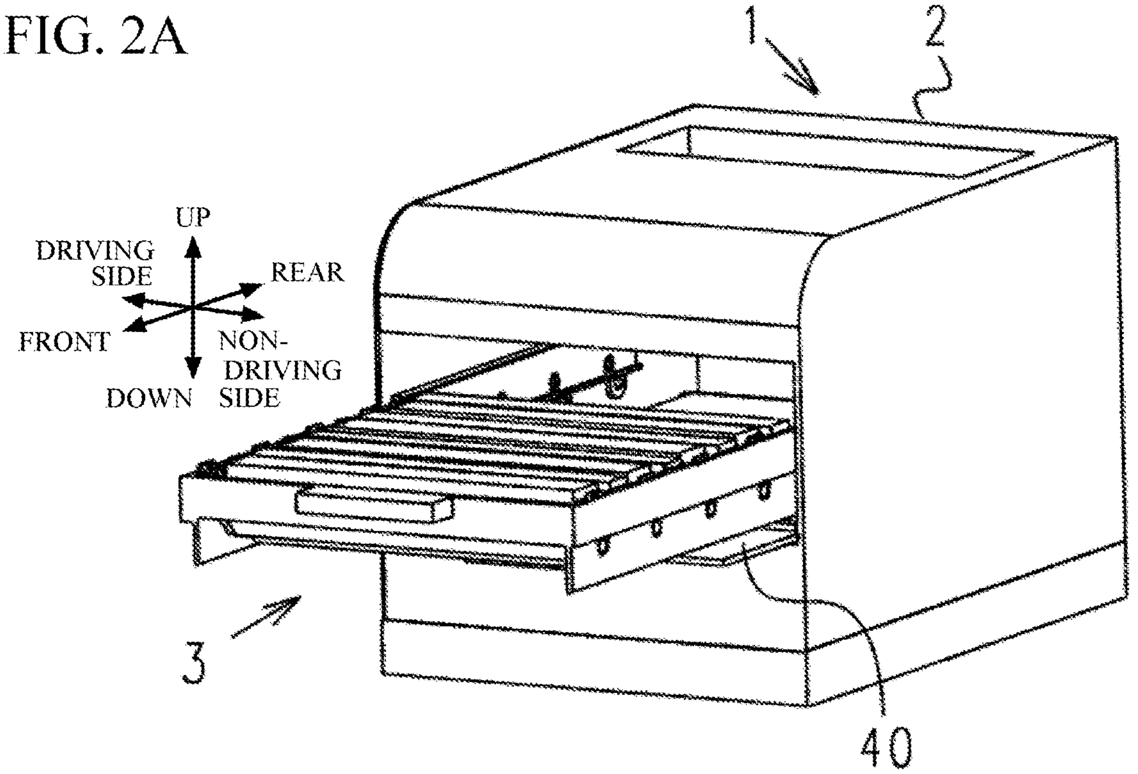
FIGS. 2A and 2B are perspective views explaining housing of a cartridge tray.
Figure 2B:
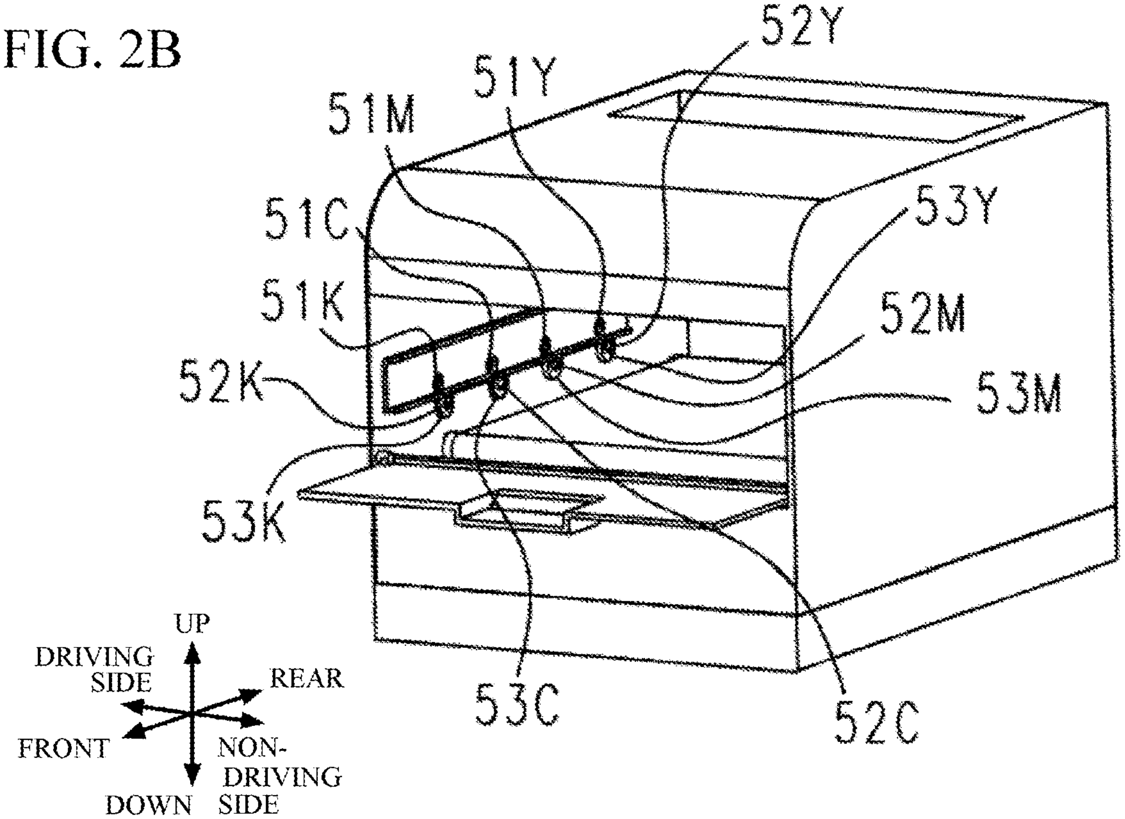
Figure 3:
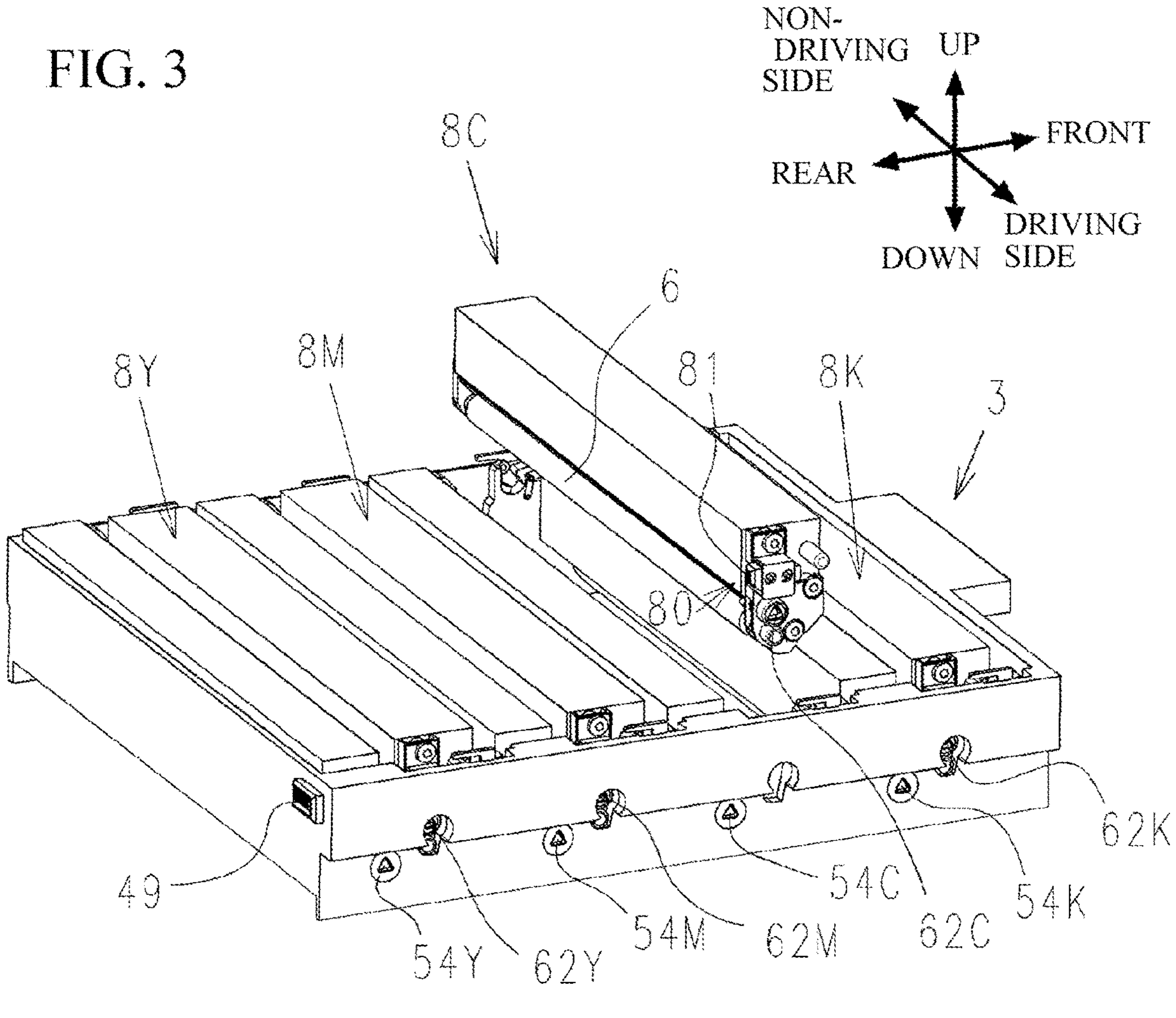
FIG. 3 is a perspective view explaining mounting of a developing cartridge on a cartridge tray.

The configuration of the image forming apparatus will be described. FIG. 1 is a schematic cross-sectional view of an image forming apparatus 1. FIGS. 2A and 2B are perspective views of the image forming apparatus 1, respectively. FIG. 3 is a perspective view of a cartridge tray 3 and a developing cartridge 8.

The image forming apparatus 1 has an apparatus main body 2 and the cartridge tray 3 on which the developing cartridge 8 is mounted. As illustrated in FIG. 1, the image forming apparatus 1 is a four-color full-color laser printer using an electrophotographic image forming process and forms a color image on a recording medium S.

The cartridge tray 3 is a tray capable of holding four developing cartridges 8 (8Y, 8M, 8C, 8K). The image forming apparatus 1 forms an image on the recording medium S (for example, printing paper) with a developer (for example, toner) supplied from the developing cartridges 8 (8Y, 8M, 8C, 8K). The cartridge tray 3 can be detached from the apparatus main body 2. The cartridge tray 3 is movable between a housed position housed in the apparatus main body 2 and a drawn-out position drawn out from the apparatus main body 2. When the cartridge tray 3 is in the drawn-out position, the developing cartridge 8 can be mounted on the cartridge tray 3.

In the present embodiment, four developing cartridges 8 which store developers of different colors (for example, yellow, cyan, magenta, and black) can be mounted on one cartridge tray 3. However, the number of developing cartridges 8 mounted on the cartridge tray 3 is not limited to four, and may be one to three or may be five or more. Further, the type of color is not limited to this. The order of color arrangement is not limited to the example of FIG. 1. For example, in FIG. 1, the developing cartridges may be arranged in the order of YMCK from the left side.

As illustrated in FIGS. 1, 2A, 2B, and 3, the image forming apparatus 1 has a laser scanner unit LB as an exposure means, a transfer belt unit 11 as a transfer means, a sheet feeding unit 18 as a feeding means, a fixing unit 21 as a fixing means, and a discharging unit 22 as a discharging means.

The laser scanner unit LB is provided above the developing cartridges 8 (8Y, 8M, 8C, 8K) and the cartridge tray 3. The laser scanner unit LB outputs a laser beam Z corresponding to image information. The laser beam Z passes through an exposure window 10 and scans and exposes the surfaces of photosensitive drums 4 (4Y, 4M, 4C, 4K).

The transfer belt unit 11 is provided below the developing cartridges 8 (8Y, 8M, 8C, 8K) and the cartridge tray 3. The transfer belt unit 11 has a driving roller 13 and tension rollers 14 and 15, and a transfer belt 12 having plasticity is wound around these rollers. The photosensitive drums 4 (4Y, 4M, 4C, 4K) are in contact with the upper surface of the transfer belt 12. This contact portion is a transfer portion. Transfer rollers 16 are provided inside the transfer belt so as to face the photosensitive drums 4 (4Y, 4M, 4C, 4K). A certain bias is applied to the transfer rollers 16 during transfer, and electrical charges are applied to the recording medium S via the transfer belt 12. An electric field generated at this time causes a developer image on the photosensitive drums 4 to be transferred to the recording medium S which is in contact with the photosensitive drums 4.

The sheet feeding unit 18 is provided below the transfer belt unit 11. The sheet feeding unit 18 has a sheet feeding tray 19 in which recording media S are stacked and stored, and a sheet feeding roller 20. The fixing unit 21 and the discharging unit 22 are provided above the apparatus main body 2. The recording medium S onto which the developer image is transferred is fixed by the fixing unit 21 and is discharged to a discharge tray 23 via the discharging unit 22.

As illustrated in FIG. 1, the apparatus main body 2 is provided with a front door After opening the front door 40, a user can draw out the cartridge tray 3 along a tray draw-out rail 41. As illustrated in FIG. 3, the user can individually draw out and replace each of the developing cartridges 8 (8Y, 8M, 8C, 8K). In the cartridge tray 3 of the present embodiment, four slots corresponding to the developing cartridges 8 (8Y, 8M, 8C, 8K) are arranged in a direction orthogonal to a longitudinal direction. The four developing cartridges 8 can be mounted in the respective slots so that their longitudinal directions are aligned.

As illustrated in FIG. 1, the respective slots of the cartridge tray 3 are provided with the photosensitive drums 4 (4Y, 4M, 4C, 4K) as image bearing members corresponding to the respective developing cartridges 8 (8Y, 8M, 8C, 8K). Each slot is further provided with a charge roller 5 which is a charging means and a cleaning blade 7 which is a cleaning means, as process means which act on the photosensitive drums 4 (4Y, 4M, 4C, 4K).

Figure 4:
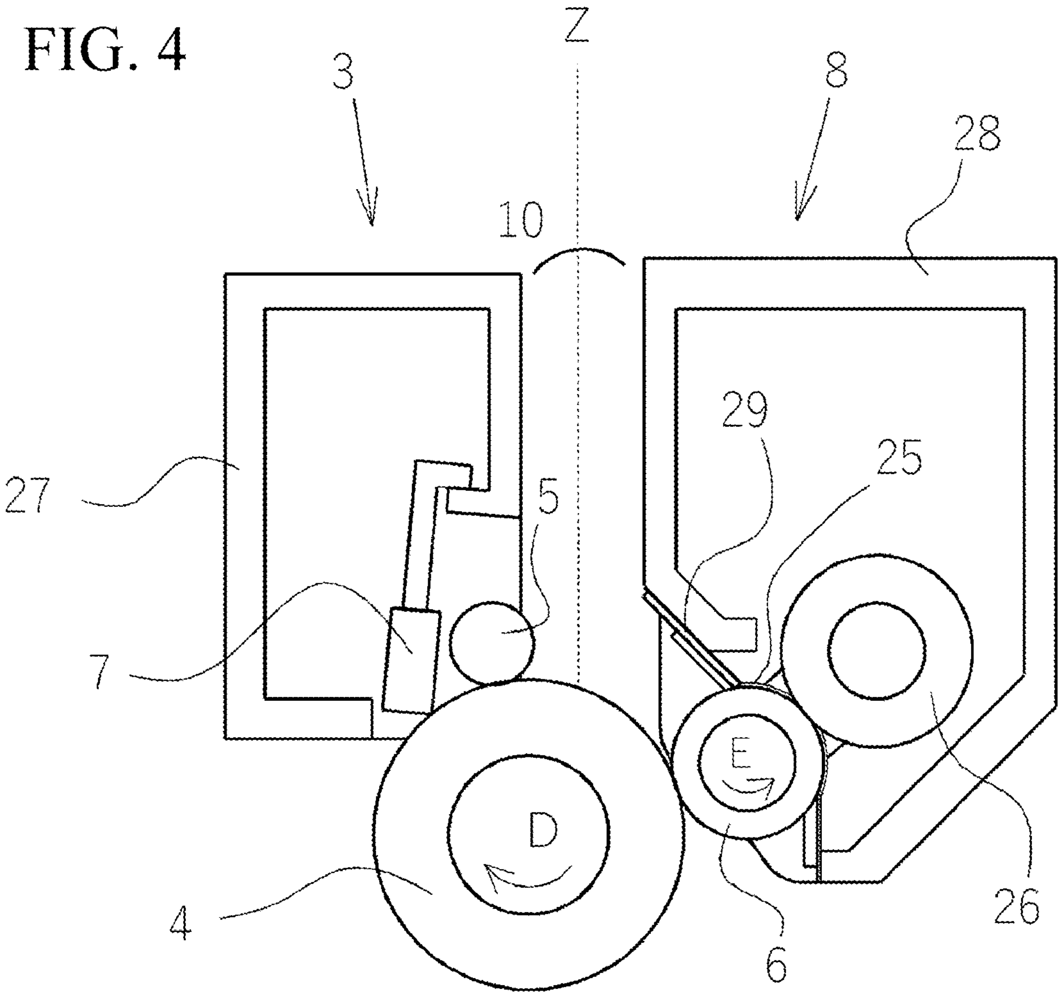
FIG. 4 is a schematic cross-sectional view of a cartridge tray and a developing cartridge.

As illustrated in FIG. 4, the developing cartridge 8 (8Y, 8M, 8C, 8K) is provided with a developing roller 6 as a developer carrier which supplies a developer onto the photosensitive drum 4 (4Y, 4M, 4C, 4K). The developing cartridge 8 further includes a memory tag unit 80 as illustrated in FIG. 3. A memory tag 81, which is a memory medium for storing information, is attached to the memory tag unit 80. The memory tag 81 is, for example, a contact-type IC chip having an electrical contact portion. The electrical contact portion of the memory tag 81 comes into contact with a tray side contact portion 32 (see FIG. 5) which is an electrical contact portion provided in the cartridge tray 3, so that the control unit 43 of the image forming apparatus 1 communicates with the memory medium to read and write information. Due to this, for example, the user can be notified of information about the developing cartridge such as the remaining amount of the developer.

As illustrated in FIGS. 1 and 3, the cartridge tray 3 includes a tray side metal terminal 49. The tray side metal terminal 49 is connected to the tray side contact portion 32 of each slot by an electrical wiring (not illustrated), and the information read from the memory tag 81 by each tray side contact portion 32 is relayed to a main body side metal terminal 9. Although one tray side metal terminal 49 is provided in the cartridge tray 3 in the drawing, the tray side metal terminal may be provided for each slot. In that case, the main body side metal terminal 9 is also provided for each slot. After the developing cartridge 8 is attached at the drawn-out position outside the apparatus main body, the cartridge tray 3 is housed and positioned at the housed position in the apparatus main body. The tray side metal terminal 49 of the cartridge tray 3 and the main body side metal terminal 9 of the apparatus main body 2 are brought into contact with each other and electrically connected to each other. Due to this, the control unit 43 can communicate with the memory tag 81. When the cartridge tray 3 is attached to the apparatus main body 2, the main body side metal terminal 9 is electrically connected to the tray side metal terminal 49 provided in the cartridge tray 3 and transmits and receives signals to and from the tray side metal terminal 49. The main body side metal terminal 9 is an apparatus main body communication unit.

The control unit 43 provided in the image forming apparatus 1 has arithmetic resources such as a processor such as a CPU and various memories. The control unit 43 is configured by, for example, a circuit board, and a processor operates according to a program to perform various processes in the image forming apparatus 1. As described above, the control unit 43 can communicate with the memory tag 81 via the main body side metal terminal 9, the tray side metal terminal 49, and the tray side contact portion 32 and read or write information. Further, a display unit 42 provided in the image forming apparatus 1 is a user interface of the image forming apparatus 1. The display unit 42 has a display device such as a liquid crystal panel and can provide information to the user in the form of characters or images. The display unit 42 displays information to the user under the control of the control unit 43. For example, the control unit 43 can display the remaining amount of the developer of each color in the developing cartridge 8, which is read from the memory tag 81.

<<Image Forming Operation>>

The image forming operation will be described with reference to FIGS. 1, 2A, 2B, 3, and 4. FIG. 4 is a schematic cross-sectional view of the cartridge tray 3 and the developing cartridge 8.

An operation for forming a full color image is as follows. The front door 40 is closed in a state in which the cartridge tray 3 on which the developing cartridge 8 (8Y, 8M, 8C, 8K) is attached is in the housed position. This completes the mounting of the developing cartridge 8 and the cartridge tray 3. At this time, a drum drive coupling 52 (52Y, 52M, 52C, 52K in FIG. 2B) provided in the apparatus main body 2 of the image forming apparatus 1 is engaged with a drum drive input coupling 54 (54Y, 54M, 54C, 54K in FIG. 3) connected to the photosensitive drum 4 (4Y, 4M, 4C, 4K) provided in the cartridge tray 3. Further, a developing drive coupling 51 provided in the apparatus main body 2 is engaged with an engagement coupling portion of a drive input gear 62 (FIG. 3) of each developing cartridge 8 mounted on the cartridge tray 3.

A drum drive gear 53 (53Y, 53M, 53C, 53K) is rotated and driven via a drive output motor (not illustrated) and a gear (not illustrated) of the image forming apparatus 1. The photosensitive drum 4 (4Y, 4M, 4C, 4K) is rotated and driven at a certain speed via the drum drive gear (arrow D direction in FIGS. 1 and 4).

Further, each developing cartridge 8 is driven via the developing drive coupling 51 and the drive input gear 62.

The transfer belt 12 is also rotated and driven at a speed corresponding to the speed of the photosensitive drum 4 (4Y, 4M, 4C, 4K) (arrow C direction of FIG. 1). The laser scanner unit LB is also driven. In synchronization with the driving of the laser scanner unit LB, the charge roller 5 uniformly charges the surface of the photosensitive drum 4 (4Y, 4M, 4C, 4K) to a certain polarity and potential. The laser scanner unit LB scans and exposes the surface of the photosensitive drum 4 (4Y, 4M, 4C, 4K) with the laser beam Z according to an image signal of each color. Therefore, an electrostatic latent image corresponding to the image signal of the corresponding color is formed on the surface of the photosensitive drum 4 (4Y, 4M, 4C, 4K). This electrostatic latent image is developed by the developing roller 6 which is rotated and driven at a certain speed (arrow E direction of FIG. 4) to become a developer image (toner image).

Such an electrophotographic image forming process is performed so that a yellow developer image corresponding to a yellow component of a full color image is formed on the photosensitive drum 4Y. Similarly, developer images corresponding to magenta, cyan, and black of the full color image are formed on the photosensitive drums 4M, 4C, and 4K, respectively.

Meanwhile, the recording media S are separated and fed one by one at a certain control timing. Further, the front end of the developer image on the peripheral surface of the photosensitive drum 4 moves to a transfer portion which is a point facing the transfer belt 12. The timing at which the recording medium S is conveyed to the transfer portion is synchronized with the rotation of the photosensitive drum 4, and the recording medium S is conveyed to the transfer belt 12 at a certain control timing so that a print start position is matched. On the recording medium S which is electrostatically attracted to the transfer belt 12 and conveyed, the developer images on the respective photosensitive drums 4 are sequentially transferred by the electric fields formed between the respective photosensitive drums 4 and the transfer roller 16. The recording medium S onto which the four-color developer images are transferred is fixed by the fixing unit 21 and discharged to the discharge tray 23 via the discharging unit 22.

<<Configuration of Cartridge Tray>>

Figure 5:
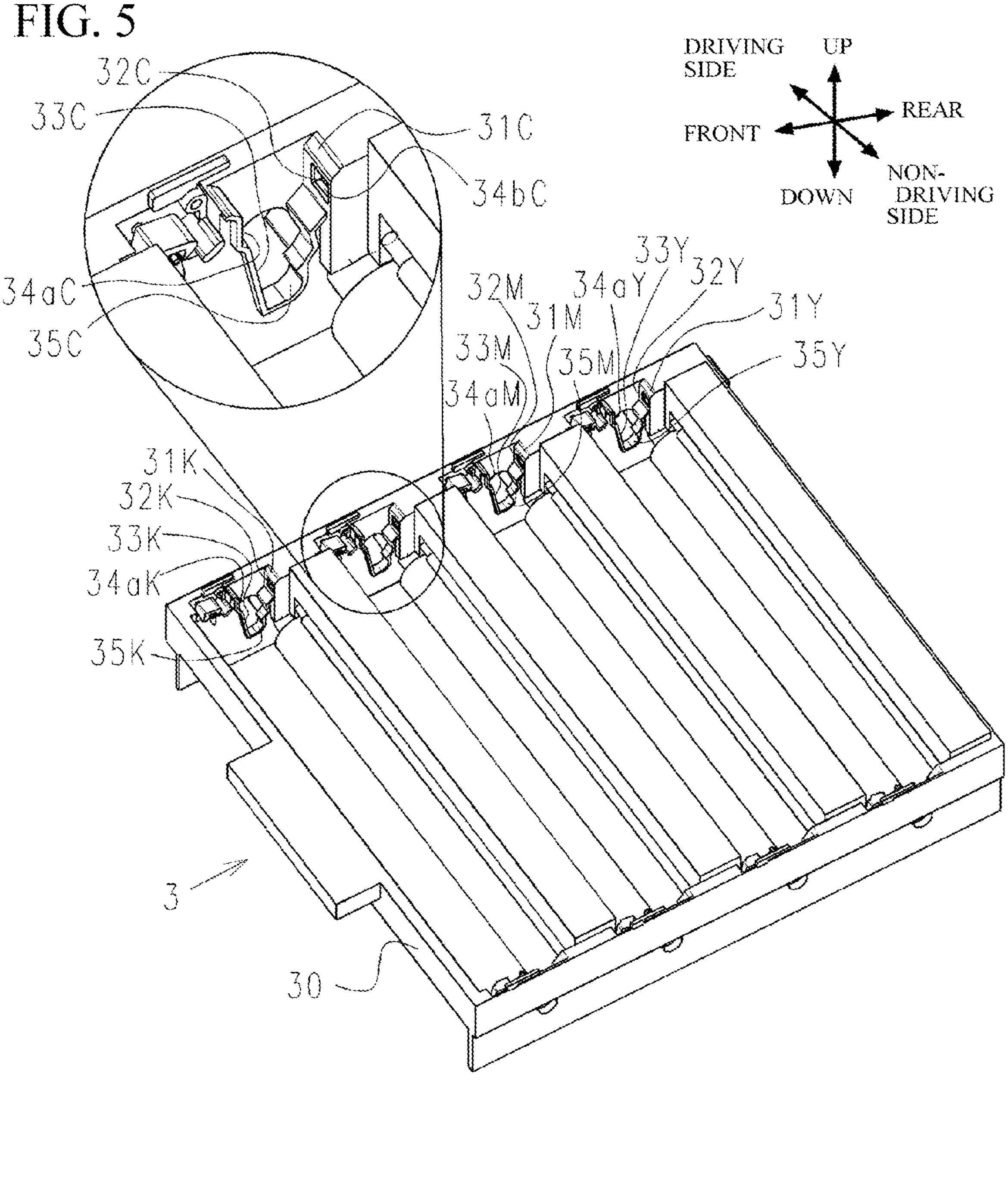
FIG. 5 is a perspective view illustrating a guide portion and a memory unit support portion in a cartridge tray.
Figure 6A:
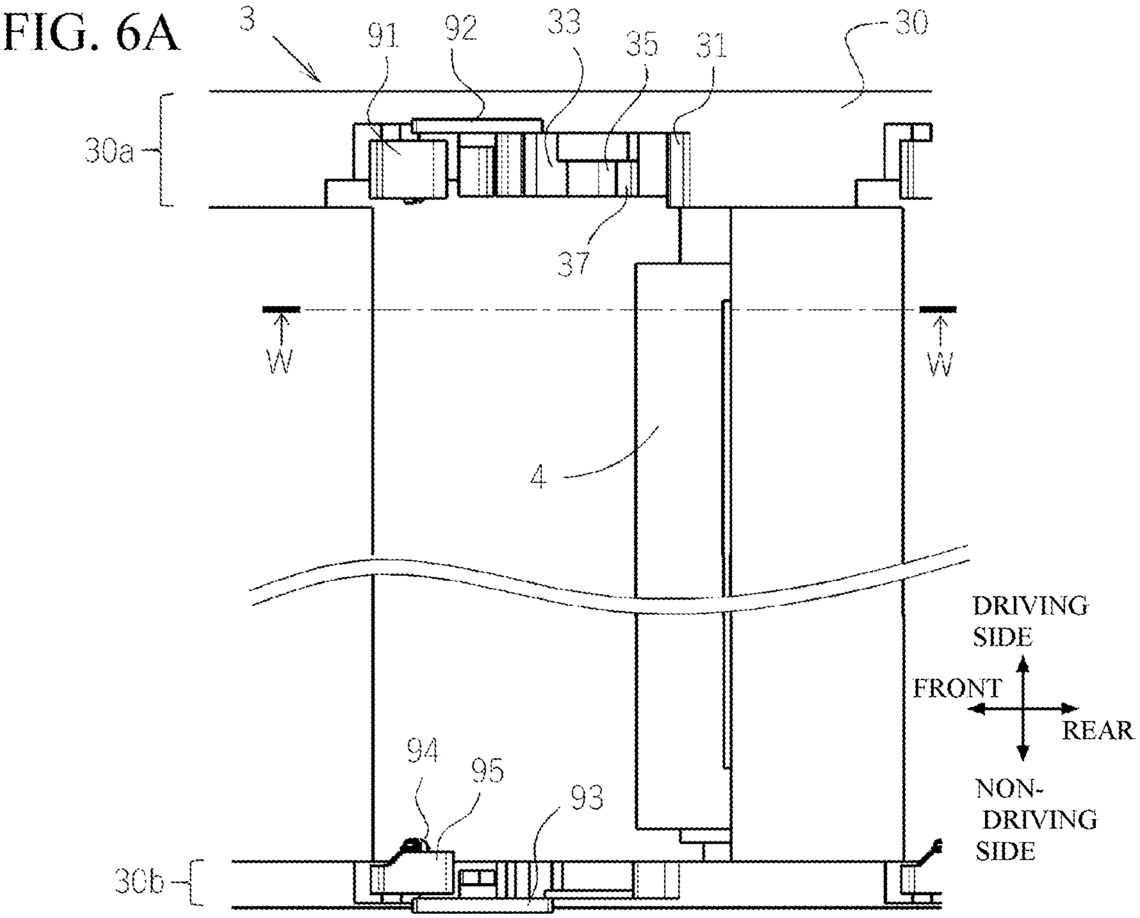
FIGS. 6A and 6B are a top view and a schematic cross-sectional view illustrating a configuration of a cartridge tray, respectively.
Figure 6B:
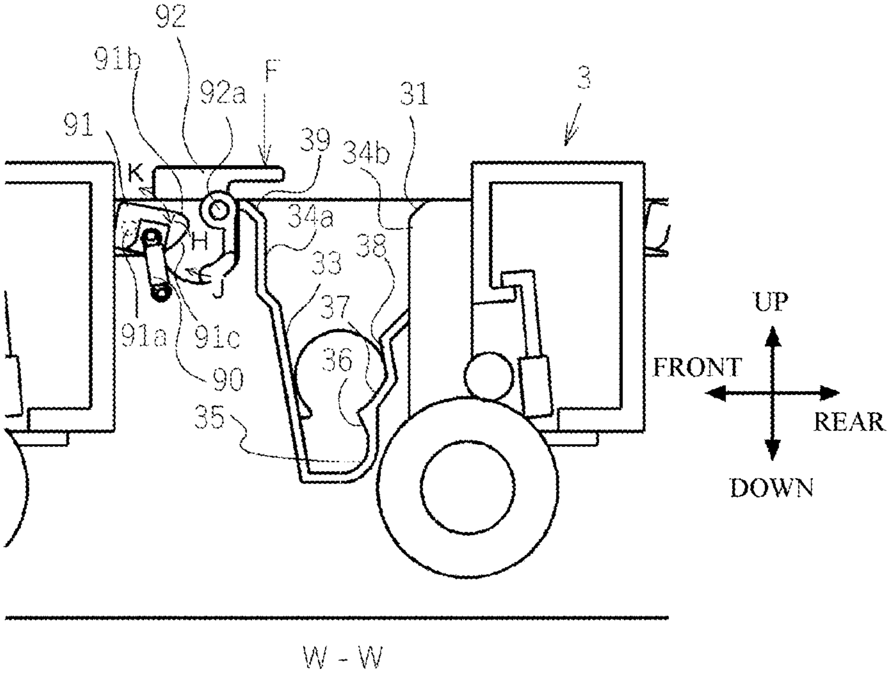
Figure 7:
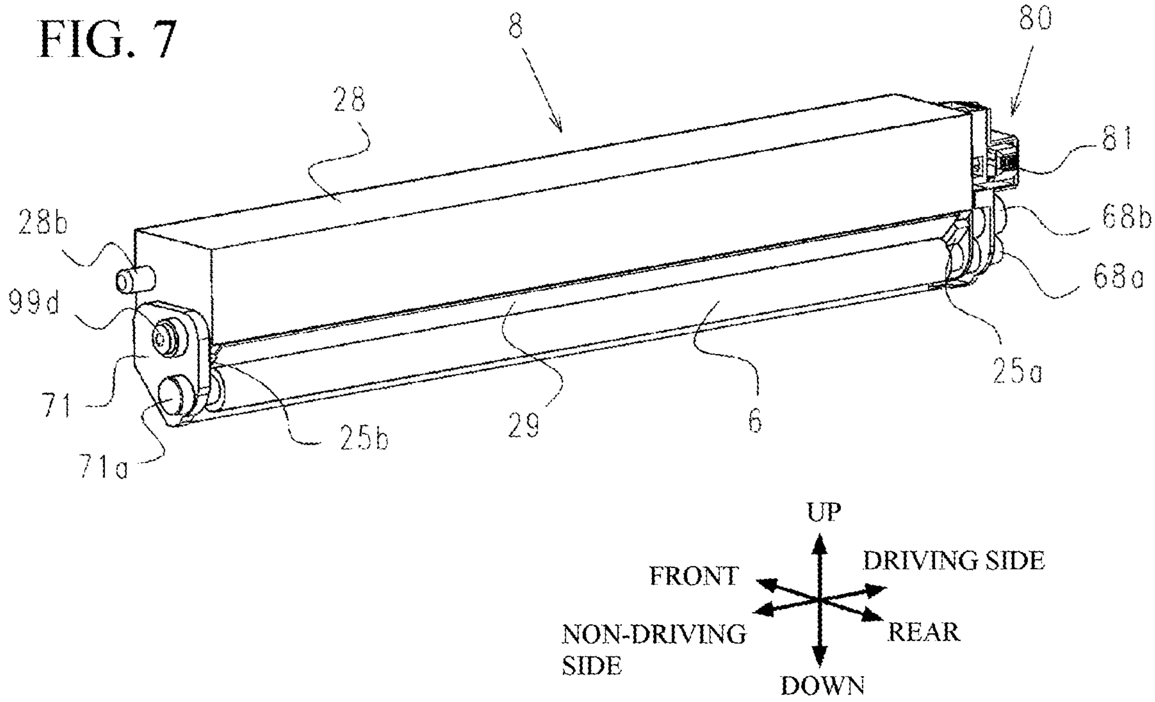
FIG. 7 is a perspective view seen from a developing cartridge non-driving side.
Figure 8A:
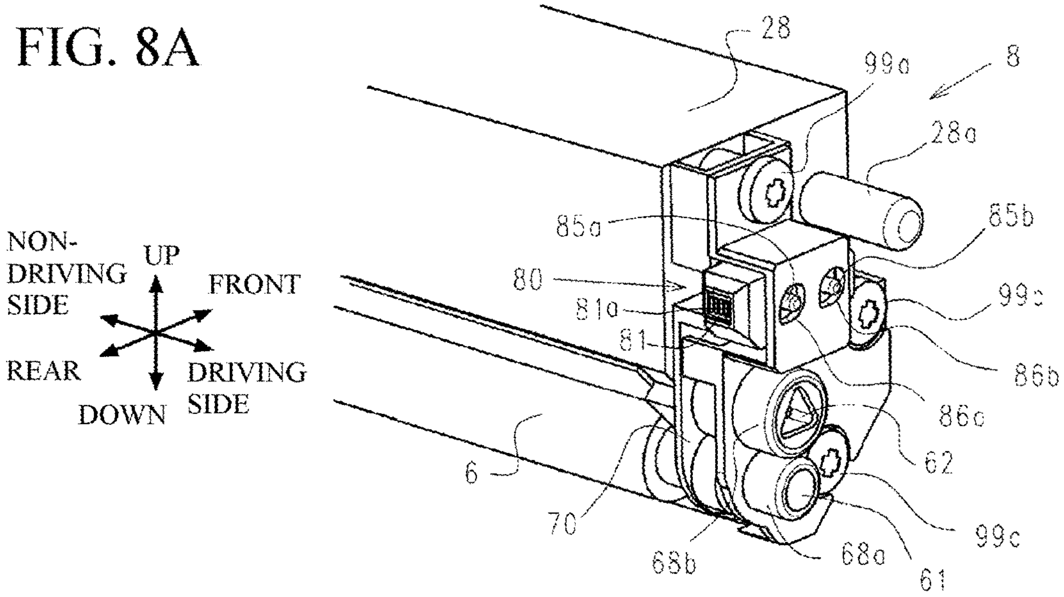
FIGS. 8A and 8B are a perspective view and a configuration diagram seen from a developing cartridge driving side, respectively.
Figure 8B:
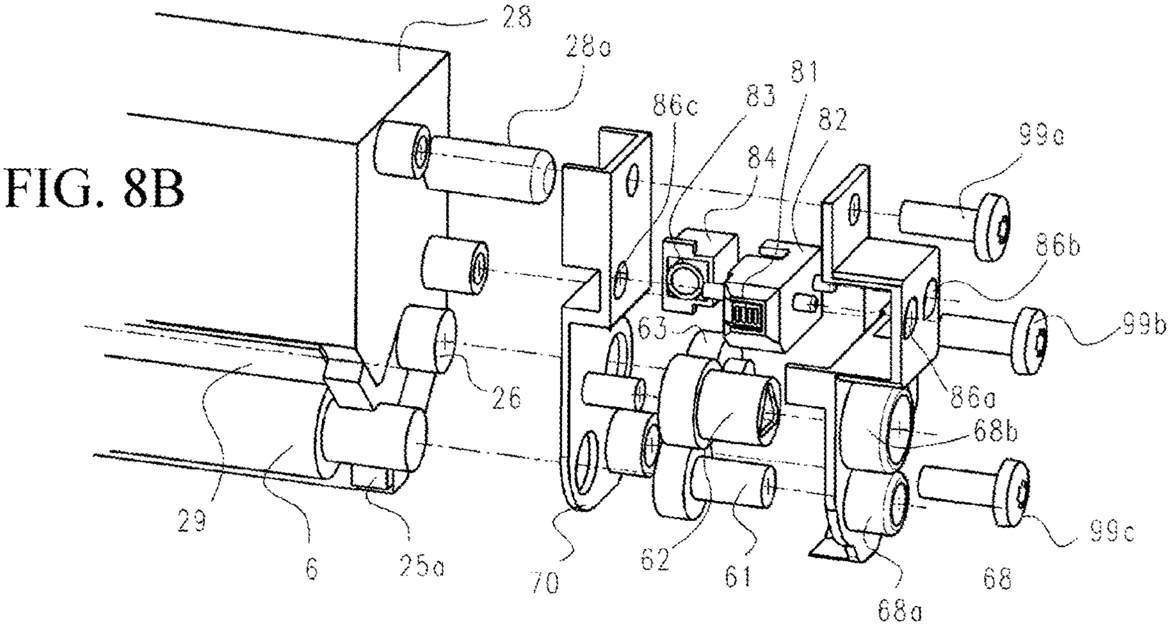

A detailed configuration of the cartridge tray 3 will be described with reference to FIGS. 4, 5, 6A, 6B, 7, 8A, and 8B. FIG. 5 is a perspective view illustrating a positional relationship among a cartridge guide portion 33, a memory guide portion 31, and a memory unit support portion 34*a*, and a part thereof is surrounded by a circular frame and enlarged. FIGS. 6A and 6B illustrate the cartridge tray 3 according to the present embodiment. FIG. 6A is a top view and FIG. 6B is a schematic cross-sectional view. FIG. 7 is a perspective view of the developing cartridge 8 according to the present embodiment, when seen from the non-driving side. FIGS. 8A and 8B illustrate the driving side of the developing cartridge 8 according to the present embodiment. FIG. 8A is a perspective view and FIG. 8B is an exploded configuration diagram. As illustrated in FIGS. 1, 5, 6A, and 6B, the photosensitive drum 4 is attached to a cartridge tray frame 30 provided in the cartridge tray 3, so as to be rotatable about a rotational shaft extending in a first direction (arrow D direction).

(Mechanism Related to Image Formation)

The drum drive input coupling 54 for transmitting driving force to the photosensitive drum 4 is provided on the driving side of the photosensitive drum 4. The drum drive input coupling 54 is engaged with the drum drive coupling 52 of the image forming apparatus 1 (see FIG. 2B), and the driving force from the image forming apparatus 1 is transmitted to the photosensitive drum 4.

The charge roller 5 is rotatable about the rotational shaft extending in the first direction. The charge roller 5 is supported to the cartridge tray frame 30, so that the charge roller 5 comes into contact with the photosensitive drum 4 and is driven to rotate. Further, the charge roller 5 is electrically connected to the image forming apparatus 1, so that the surface of the photosensitive drum 4 is uniformly charged to a certain polarity and potential. However, the charging means for charging the photosensitive drum 4 is not limited thereto.

Further, the cartridge tray frame 30 is provided with a cleaning blade 7 as a cleaning means and a cleaning frame 27. The cleaning blade 7 is fixed at a position which is in contact with the photosensitive drum 4, and removes the waste developer on the surface of the photosensitive drum 4 which remains untransferred during image formation. The cleaning frame 27 collects the removed waste developer. It is noted that the waste developer may be collected in the developing cartridge 8 or the fixing unit 21, without providing the cleaning means.

(Mechanism Related to Guide and Fixing)

The cartridge tray frame 30 is provided with a guide member for guiding the developing cartridge 8 including the memory tag unit 80 until the developing cartridge 8 is in the mounted state at the mounting position. The guide member includes a portion which abuts on the memory tag unit 80 provided in the developing cartridge 8 or the cartridge side positioning portion and functions as a guide portion for assisting the mounting. The guide member also includes a portion which functions as a fixing portion (guide side positioning portion) for positioning and fixing the memory tag unit or the cartridge side positioning portion. The cartridge tray 3 also has a developing pressure member 91 which functions as a rotation stopper or the like. It is noted that a part of the guide member may have both the guide function and the positioning function.

The guide members are arranged at both ends of the developing cartridge 8 in the longitudinal direction among side walls of the cartridge tray frame 30. Both ends correspond to two side walls of the cartridge tray frame 30. As illustrated in FIGS. 5, 6B, and 10A to FIG. 13, the cross-sectional shape of the guide member is substantially a U-shape including one side portion and the other side portion facing each other. As will be described below in detail, the memory medium unit is supported between one side portion and the other side portion in the mounted state.

Each guide portion includes a first guide member for guiding a developing roller cover positioning portion 68*a* and a developing roller bearing positioning portion 71*a* of the developing cartridge 8, and a second guide member for guiding the memory tag unit 80.

The developing roller cover positioning portion 68*a* and the developing roller bearing positioning portion 71*a* are protrusion portions which protrude from the side wall of the cartridge in the first direction (longitudinal direction), as illustrated in FIGS. 7, 8A, and 8B. It is noted that although FIGS. 7, 8A, and 8B illustrate cylindrical protrusion portions, other shapes such as a polygonal column shape can be adopted as long as they can be guided by the guide portion and can be stably positioned.

Referring to FIG. 6B, the first guide member includes all or part of the receiving member guide portion 39, the memory unit support portion 34*a*, the cartridge guide portion 33, the drive input positioning portion 37, the drive input guide portion 38, the memory second guide portion 34*c*, and the memory guide portion 31. The second guide member includes the memory guide portion 31 and the memory second guide portion 34*c*. That is, the second guide member also has a function as the first guide member.

Which guide portion guides which part of the developing cartridge 8 or the memory tag unit 80 depends on an angle or a trajectory when the user inserts the developing cartridge. Therefore, a relationship between the guide portion and the guided portion is not limited to the fixed relationship. For example, the memory guide portion 31 may abut on a portion other than the memory tag unit 80.

Further, as each guide side positioning portion, there is a member (developing roller positioning portion 35, drive input positioning portion 37) for positioning and fixing the developing cartridge 8 or a member (memory unit support portion 34*a*, memory unit support concave portion 34*b*) for positioning and fixing the memory tag unit. The memory unit support portion 34*a* and the memory unit support concave portion 34*b* correspond the first memory unit support portion and the second memory unit support portion. It is noted that the drive input positioning portion 37 is also a guide portion for, when the developing cartridge 8 is mounted, abutting on the developing roller cover positioning portion 68*a* and guiding to the developing roller positioning portion 35.

Although details will be described below, in the guide member of the embodiment, the guide portion for guiding the mounting of the developing cartridge 8 and the guide side positioning portion for positioning and supporting the memory tag unit are provided at substantially the same position in the longitudinal direction. The state in which the guide portion and the guide side positioning portion are substantially at the same position in the longitudinal direction means a state in which the guide portion and the guide side positioning portion have substantially the same width in the longitudinal direction and both are substantially superimposed. However, the effect can be obtained when the guide portion and the guide side positioning portion are provided so that at least part thereof is superimposed in the direction orthogonal to the longitudinal direction. Further, in the embodiment, each guide portion and each guide side positioning portion provided in the side wall of the cartridge tray frame 30 have a longitudinal size that fits within the width of the side wall in the longitudinal direction.

The surface of the developing roller positioning portion 35 is fixed and positioned while abutting on the developing cartridge 8 in the mounted state. In the embodiment, the developing roller positioning portions 35 are provided on both the driving side and the non-driving side of the cartridge tray 3. It is necessary to provide the guide side positioning portion in at least one end portion. Although FIG. 6B illustrates the developing roller positioning portion 35 on the driving side, the non-driving side is also provided at a symmetrical position (not illustrated). In the embodiment, the memory unit support portion for fixing the memory tag unit 80 is also provided on the driving side, but the memory unit support portion may be provided on the non-driving side.

When the developing cartridge 8 is inserted, the cartridge side positioning portion (developing roller cover positioning portion 68*a*, developing roller bearing positioning portion 71*a*) arranged coaxially with the developing roller 6 of the developing cartridge 8 abuts on the developing roller positioning portion 35. Due to this, the developing cartridge 8 is positioned.

The developing roller cover positioning portion 68*a* and the developing roller bearing positioning portion 71*a*, which are arranged coaxially with the developing roller 6 of the developing cartridge 8 illustrated in FIG. 7, abut on the developing roller positioning portion 35 and the drive input positioning portion 37 (FIGS. 6A and 6B) when the mounting of the developing cartridge 8 is completed. Due to this, the developing cartridge 8 is positioned in the vertical direction, which is the mounting direction (second direction) of the developing cartridge 8. That is, when the mounting of the developing cartridge is performed, the developing roller cover positioning portion 68*a* and the developing roller bearing positioning portion 71*a* function as a positioning unit for abutting on a member directly or indirectly supported to the apparatus main body of the image forming apparatus and positioning the developing cartridge. The "member directly or indirectly supported to the apparatus main body of the image forming apparatus" in the present embodiment is the developing roller positioning portion 35 and the drive input positioning portion 37.

The developing pressure member 91, which is a pressure member, functions as a rotation stopper when the mounting of the developing cartridge 8 is completed. The developing pressure member 91 is provided on both the driving side and the non-driving side of the cartridge tray 3. FIG. 6B illustrates the developing pressure member 91 on the driving side, and the non-driving side is also provided at a symmetrical position (developing pressure member 95 in FIG. 6A). The developing pressure member 91 is supported to the cartridge tray frame 30 so as to be rotatable about an axis in the longitudinal direction. When the developing cartridge 8 is not mounted, the developing pressure member 91 is pulled by a developing pressure spring 90 in the arrow H direction and is fixed while abutting on the cartridge tray frame 30.

The developing pressure member 91 has a rotation stopper boss guide portion 91*b*. When the developing cartridge 8 is mounted, the rotation stopper boss guide portion 91*b* guides the mounting of developing rotation stopper bosses 28*a* and 28*b* provided in the developing cartridge 8. Further, the developing pressure member 91 has a cartridge pressure portion 91*c* for, when the mounting of the developing cartridge 8 is completed, stably positioning the developing roller cover positioning portion 68*a* and the developing roller bearing positioning portion 71*a* on the developing roller positioning portion 35.

For example, when the developing cartridge 8C is the first developing cartridge, the guide member corresponding to the first developing cartridge is the first guide member. Further, when the developing cartridge 8K adjacent thereto is the second developing cartridge, the guide member corresponding to the second developing cartridge is the second guide member. The developing pressure member 91C is the first pressure member, and the developing pressure member 91K is the second pressure member. At this time, with the configuration of the present embodiment, even when the developing pressure member 91C rotates in the arrow K direction or the arrow H direction, the developing pressure member 91C rotates in a space provided in the cartridge tray frame 30. Thus, the developing pressure member 91C does not come into contact with the second guide member.

It is noted that, in the embodiment, the memory tag unit 80 and the drive input cover positioning portion 68*b* do not exist on the non-driving side of the developing cartridge 8. Therefore, the guide portion of the cartridge tray frame 30 on the non-driving side may have a shape different from that on the driving side because it is sufficient that the developing roller bearing positioning portion 71*a* is positioned on the developing roller positioning portion 35.

The cartridge tray frame 30 has the cartridge guide portion 33, the developing roller positioning guide portion 36, the memory guide portion 31, the memory unit support portion 34*a*, the drive input positioning portion 37, the drive input guide portion 38, and the receiving member guide portion 39. These guide portions function as guide portions for, when the developing cartridge 8 is mounted, assisting and guiding the developing roller cover positioning portion 68*a* and the developing roller bearing positioning portion 71*a* until they are mounted on the developing roller positioning portion 35. As illustrated in FIGS. 7, 8A, and 8B, no elements or shapes such as the memory tag unit 80 and the drive input cover positioning portion 68*b* are provided on the non-driving side of the developing cartridge 8. Therefore, the shape of the auxiliary mounting guide of the cartridge tray frame 30 on the non-driving side does not necessarily require a guide such as a memory tag unit which is to be described below. That is, since it is sufficient that the developing roller bearing positioning portion 71*a* can be positioned on the developing roller positioning portion 35, it may have a shape symmetrical with the driving side or a dedicated shape. As the symmetrical shape, only the driving side will be mainly described below.

The cartridge guide portion 33 (33Y, 33M, 33C, 33K) and the developing roller positioning guide portion 36 illustrated in FIGS. 5, 6A, and 6B are guide portions for, when the developing cartridge 8 is mounted, abutting on the developing roller cover positioning portion 68*a* and guiding to the developing roller positioning portion 35.

The drive input positioning portion 37 is a mounting guide for, when the developing cartridge 8 is mounted, abutting on the developing roller cover positioning portion 68*a* and guiding to the developing roller positioning portion 35. Further, when the mounting is completed, the drive input positioning portion 37 is positioned while abutting on the drive input cover positioning portion 68*b*. That is, the drive input positioning portion 37 has a function as a guide portion and a function as a guide side positioning portion.

In the mounted state, the developing roller cover positioning portion 68*a* is pressurized and fixed to the developing roller positioning portion 35 by the developing pressure member 91. Similarly, the drive input cover positioning portion 68*b* is fixed to the drive input positioning portion 37. Therefore, the developing cartridge 8 is stably positioned by the developing roller positioning portion 35 and the drive input positioning portion 37 as the guide side positioning portion and the developing pressure member 91.

The drive input guide portion 38 is a mounting guide for, when the developing cartridge 8 is mounted, abutting on the developing roller cover positioning portion 68*a* and guiding to the developing roller positioning portion 35. The drive input guide portion 38 is also a mounting guide for abutting on the drive input cover positioning portion 68*b* and guiding to the drive input positioning portion 37.

When the developing cartridge 8 is mounted, the memory guide portion 31, the memory unit support portion 34*a*, and the receiving member guide portion 39 abut on the developing roller cover positioning portion 68*a* and guide to the developing roller positioning portion 35. Further, the memory guide portion 31, the memory unit support portion 34*a*, and the receiving member guide portion 39 are mounting guides for abutting on the drive input cover positioning portion 68*b* and guiding to the drive input positioning portion 37. Therefore, these members function not only as the memory guide portion or the memory positioning portion but also as the guide portion of the developing cartridge 8 itself. Where each portion of the developing cartridge 8 abuts on each guide portion or each guide side positioning portion at the time of mounting depends on the attitude of the developing cartridge 8 at the time of mounting. However, according to the configuration of the embodiment, the developing cartridge 8 is guided to the downstream portion in the mounting direction while abutting on any portion of the guide member and is finally positioned on an appropriate surface.

Further, the memory unit support portion 34*a* stably positions the electrical contact portion of the memory tag 81 provided in the memory tag unit 80 with respect to the tray side contact portion 32. That is, the memory unit support portion 34*a* functions as a backup portion, and spring force of a memory tag pressure spring 83 pressurizes the memory tag 81.

The memory guide portion 31 and the receiving member guide portion 39 are mounting guides for guiding the memory tag unit 80 to the memory unit support portion 34*a*.

With this configuration, when the developing cartridge 8 is mounted, the memory tag unit portion is guided by the memory guide portion 31 and the receiving member guide portion 39, which are guide portions provided in the cartridge tray 3. The electrical contact portion of the memory tag 81 is guided to a position which can come into contact with the tray side contact portion 32. The memory tag unit 80 is positioned by the memory unit support portion 34*a*, so that stable electrical connection is made.

<<Configuration of Developer Cartridge>>

The developing cartridge 8 will be described with reference to FIGS. 4 and 7 to 9B. The developing cartridge 8 is roughly provided with a developer storage frame 28, a developing roller 6, an end sealing member 25, a stirring roller 26, a developer regulation blade 29, a cartridge bearing (driving side) 70, a cartridge bearing (non-driving side) 71, a cartridge side cover 68, a developing roller gear 61, a drive input coupling gear 62, a stirring roller gear 63, and a memory tag unit 80.

(Configuration Related to Development and Driving)

The developer storage frame 28 is a housing which can store the developer and supplies the developer to the developing roller 6. The stirring roller 26 has a function of stirring the developer of the developer storage frame 28 and applying the developer to the developing roller 6. The end sealing member 25 is provided with a driving side sealing member 25*a* and a non-driving side sealing member 25*b* provided on both sides in the longitudinal direction (FIG. 7), and regulates the leaking of the developer from both ends of the developing roller 6 to the outside of the developer storage frame 28. The developing roller 6 and the stirring roller 26 are rollers which are rotatable about the rotational shaft extending in the first direction and each include a roller main body and a roller shaft. As a material for the roller main body, for example, an elastic rubber or a sponge member is used. As a material for the roller shaft, a metal or a resin having conductivity is used.

As illustrated in FIGS. 7 and 8A, the developing roller 6 and the stirring roller 26 are rotatably supported by the cartridge bearing (driving side) 70 and the cartridge bearing (non-driving side) 71. The cartridge bearing (driving side) 70 is fixed to the developer storage frame 28 together with the cartridge side cover 68 by screws 99*a* and 99*c*. The cartridge bearing (non-driving side) 71 is fixed to the developer storage frame 28 by a screw 99*d*. As illustrated in FIG. 8B, the roller shafts of the developing roller 6 and the stirring roller 26 pass through the cartridge bearing (driving side) 70, and the roller shafts are connected to the developing roller gear 61 and the stirring roller gear 63. The developing roller gear 61 transmits, to the developing roller 6, the driving force input from the main body via the drive input gear 62, and the stirring roller gear 63 transmits, to the stirring roller 26, the driving force input via the drive input gear 62.

The drive input coupling gear 62 as a drive input unit is a gear which is rotatably supported to the cartridge bearing (driving side) 70 and the cartridge side cover 68. The drive input coupling gear 62 has an engagement coupling portion for receiving the driving force from the main body, and transmits the driving force from the main body to the developing roller gear 61 and the stirring roller gear 63. The shape of the engagement coupling may be any shape as long as the driving force can be transmitted. In the embodiment, the developing cartridge side has a triangular concave hole. The shape of the engagement coupling portion on one main body side has a convex triangular rib corresponding to the triangular concave shape.

The developer regulation blade 29 (FIGS. 5 and 7) is a blade which abuts on the developing roller 6 and regulates the thickness of the developer carried on the developing roller 6. The developer regulation blade 29 is fixed to the developer storage frame 28 by a screw or the like, and controls the abutting angle with the developing roller 6 or the amount of intrusion to constantly regulate the thickness of the developer on the developing roller. As a material for the developer regulation blade 29, a stainless plate such as SUS or a rubber material is generally used. The cartridge side cover 68 rotatably supports one end of each of the developing roller gear 61 and the drive input coupling gear 62.

(Configuration Related to Guide and Fixing)

Further, the cartridge side cover 68 includes a cartridge side positioning portion (developing roller cover positioning portion 68*a* and drive input cover positioning portion 68*b*) which slidably abuts on the guide portion and the fixed portion provided on the cartridge tray 3 when the developing cartridge 8 is mounted on the cartridge tray 3. The developing roller cover positioning portion 68*a* is coaxial with the developing roller 6 and the developing roller gear 61 and has a cylindrical outer shape. The drive input cover positioning portion 68*b* is coaxial with the drive input coupling gear 62 and has a cylindrical outer shape.

As can be seen from FIGS. 8A and 8B, the end portion (outermost shell portion) of the cartridge side cover 68 in the first direction (longitudinal direction) is arranged outside the developing roller cover positioning portion 68*a* which is the protrusion portion. In other words, it is possible to obtain the effect that can make the developing cartridge 8 larger than in the case in which the memory tag unit 80 is arranged inside the developing roller cover positioning portion 68*a* in the longitudinal direction.

As described above, after the developing cartridge 8 is mounted on the cartridge tray 3, the developing cartridge 8 is positioned and fixed by the developing roller cover positioning portion 68*a*, the drive input cover positioning portion 68*b*, and the development rotation stopper boss (driving side) 28*a* provided in the developer storage frame 28.

As illustrated in FIG. 7, on the non-driving side, the developing cartridge 8 is mounted by slidably abutting on the cartridge guide provided in the cartridge tray 3 by the cartridge bearing (non-driving side) 71 and the developing rotation stopper boss (non-driving side) 28*b* of the developer storage frame 28. Similar to the driving side, each boss has a cylindrical shape and is thus smoothly guided. The developing roller bearing positioning portion 71*a* is arranged on the axis of the developing roller 6 and is arranged coaxially with the developing roller gear 61 and the developing roller cover positioning portion 68*a* on the driving side. The developing rotation stopper boss (non-driving side) 28*b* is coaxial with the developing rotation stopper boss (driving side) 28*a*.

(Configuration Related to Memory)

Figure 9A:
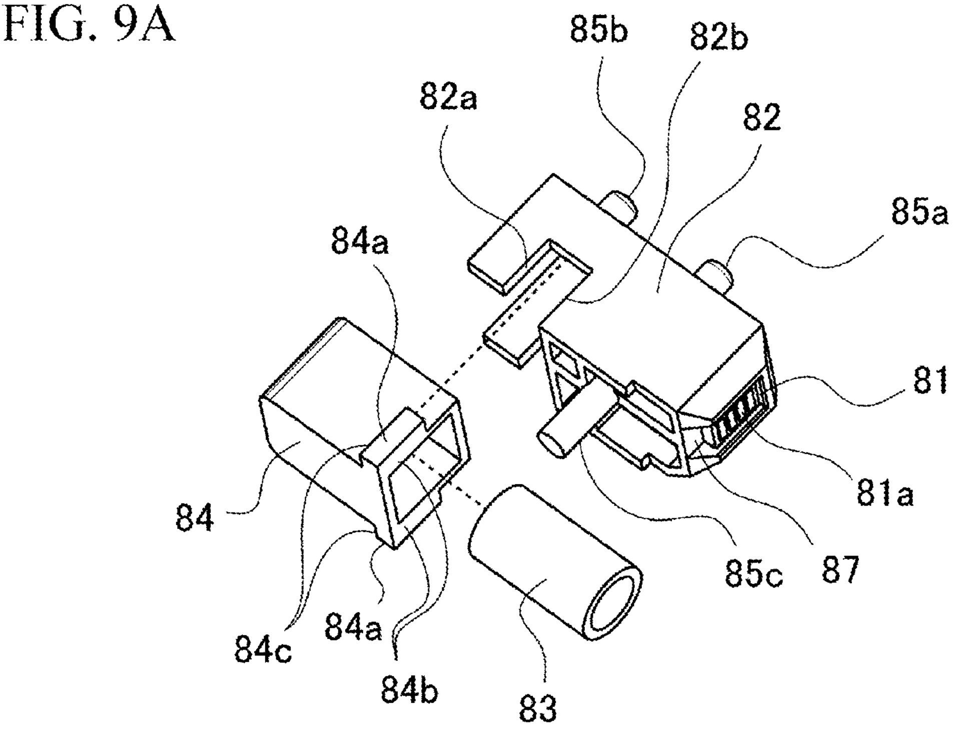
FIGS. 9A and 9B are configuration diagrams of a memory tag unit provided in a developing cartridge, respectively.
Figure 9B:
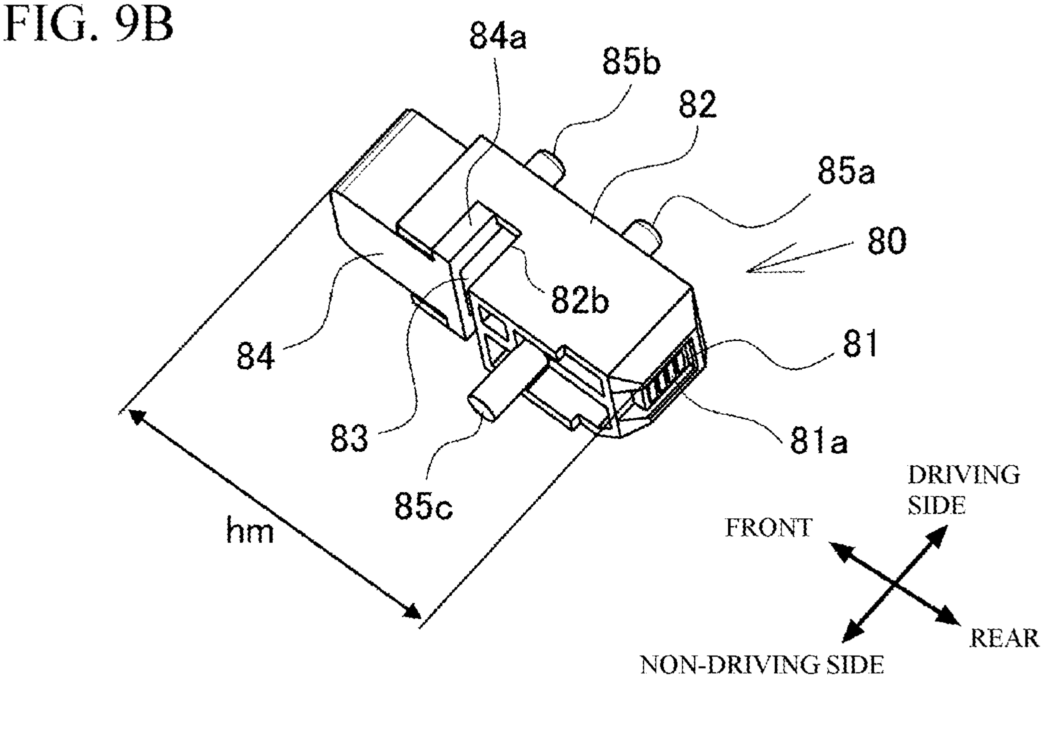

FIGS. 9A and 9B are configuration diagrams of the memory tag unit 80 of the developing cartridge 8 according to the present embodiment. As illustrated in the exploded view of FIG. 9A, the memory tag unit 80 includes a memory tag 81, a memory tag pressing member 82 which is a pressing member, a memory tag pressure spring 83, and a pressure spring receiving member 84. The memory tag pressing member 82 has a memory installation groove 87 for installing and fixing the memory tag 81. The memory tag 81 is fixed by an arbitrary method such as adhesive, a double-sided tape, or thermal caulking. The surface of the memory tag 81 is provided with an electrical contact portion such as a metal terminal, and the electrical contact portion is exposed when the memory tag 81 is fixed to the memory installation groove 87. As illustrated in FIG. 9B, the memory tag pressing member 82, the memory tag pressure spring 83, and the pressure spring receiving member 84 are configured as an integrated unit.

The memory tag pressure spring 83 as a biasing unit is a compression spring. The memory tag pressure spring 83 abuts on each of the spring receiving surface (not illustrated) of the memory tag pressing member 82 and the spring receiving surface (not illustrated) of the pressure spring receiving member 84 and is in a compressed state from a natural state. The memory tag pressure spring 83 constantly biases the memory tag pressing member 82 in a certain direction (rear side in the present embodiment). Further, the memory tag pressing member 82 is movable in the front-rear direction with respect to the pressure spring receiving member 84 as long as the protruding spring receiving member regulated portion 84*a* provided in the pressure spring receiving member 84 moves between the front regulation portion 82*a* and the rear regulation portion 82*b* provided in the memory tag pressing member 82. The spring receiving member regulated portion 84*a* of the spring receiving member 84 has a first regulated surface 84*c* facing the front regulation portion 82*a* and a second regulated surface 84*b* facing the rear regulation portion 82*b*. Hereinafter, in the present embodiment, although the pressure spring receiving member 84 is described as being movable with respect to the developer storage frame 28 which is the housing of the developing cartridge 8, the pressure spring receiving member 84 can be a member which is fixed to the developer storage frame 28 by an arbitrary method such as screwing.

Due to the spring force of the memory tag pressure spring 83, the front regulation portion 82*a* of the memory tag pressing member 82 and the spring receiving member regulated portion 84*a* of the pressure spring receiving member 84 abut on each other, and the memory tag unit is held as an integrated unit.

Further, the memory tag unit 80 can further expand and contract in the compression direction of the memory tag pressure spring 83 as compared with FIG. 9B. That is, it is possible to compress to the position at which the rear regulation portion 82*b* of the memory tag pressing member 82 and the second regulated surface 84*b* of the pressure spring receiving member 84 abut on each other. That is, when the memory tag unit 80 exists alone, as illustrated in FIG. 9B, the spring force of the memory tag pressure spring 83 causes the first regulated surface 84c provided on the spring receiving member regulated portion 84a of the pressure spring receiving member 84 to abut on the front regulation portion 82a of the memory tag pressing member 82 and become expandable. In this state, the length of the memory tag unit 80 measured in the front-back direction (second direction), which is the expansion/contraction direction of the memory tag pressure spring 83, is the natural length hm of the memory tag unit 80. When the memory tag 81 is pressurized with the mounting of the developing cartridge 8, the memory tag pressing member 82 moves relatively forward against the spring force of the memory tag pressure spring 83, and the memory tag unit 80 is in a compressed state. The length of the memory tag unit 80 can be shorter than the natural length hm until the second regulated surface 84b of the spring receiving member regulated portion 84a of the spring receiving member 84 abuts on the rear regulation portion 82b of the memory tag pressing member 82.

The memory tag pressing member 82 has an attitude regulation boss 85 (85a, 85c). When the memory tag unit 80 is assembled with the developing cartridge 8 as illustrated in FIGS. 8A and 8B, the memory tag unit 80 is assembled to be sandwiched between the cartridge bearing (driving side) 70 and the cartridge side cover 68 in the longitudinal direction, and the movement in the first direction which is the longitudinal direction is regulated. At this time, the attitude regulation bosses 85a and are fitted to the attitude regulation holes 86a and 86b of the cartridge side cover 68, and the attitude regulation boss 85c is fitted to the attitude regulation hole 86c of the cartridge bearing (driving side) 70.

The hole diameter of the attitude regulation hole 86 is set to be larger than the boss diameter of the attitude regulation boss 85. For example, when the boss diameter of the cylinder is φ3 mm and the hole diameter of each attitude regulation hole is φ8 mm, the attitude regulation boss can move in an in-plane direction perpendicular to the axis within clearance range of about 5 mm. Due to this, the memory tag unit 80 is allowed to move in the second direction and the third direction within a range regulated by the attitude regulation boss 85 (85a, 85b, 85c) and the attitude regulation hole 86 (86a, 86b, 86c).

Since the memory tag 81 is fixed to the memory tag pressing member 82, the attitude regulation boss 85 is provided in the memory tag pressing member 82 so that the component tolerance becomes advantageous when positioning the cartridge tray 3. However, the attitude regulation boss 85 may be provided in the pressure spring receiving member 84. Further, the method of making the gap in the first, second, and third directions which regulates the movement of the memory tag unit 80 or the relationship between the attitude regulation boss 85 and the attitude regulation hole 86 may be adjusted so that the engagement between the cartridge tray 3 and the memory tag unit 80, which will be described below, can be operated smoothly, and the shapes of the attitude regulation boss 85 and the attitude regulation hole 86 do not have to be perfect circles.

Further, in the present embodiment, the memory tag unit 80 is configured to be held by the cartridge bearing (driving side) 70 and the cartridge side cover 68 so as to be movable in a certain range at positions in the first, second, and third directions. However, the configuration of the present embodiment is not limited as long as the memory tag unit 80 is movable in at least one arbitrary direction in a state of being incorporated in the developing cartridge 8. Further, although the memory tag unit 80 is configured on the driving side of the developing cartridge 8 in the present embodiment, the memory tag unit 80 may be configured on the non-driving side.

<<Developing Cartridge Mounting Operation>>

The operation of mounting the developing cartridge 8 on the cartridge tray 3 will be described. FIGS. 10A to 10D are views explaining the behavior when the developing cartridge 8 is mounted on the cartridge tray 3 of the present embodiment and are schematic cross-sectional views of the side surface of the driving side of the developing cartridge 8 and the corresponding cartridge tray 3.

Figure 10A:
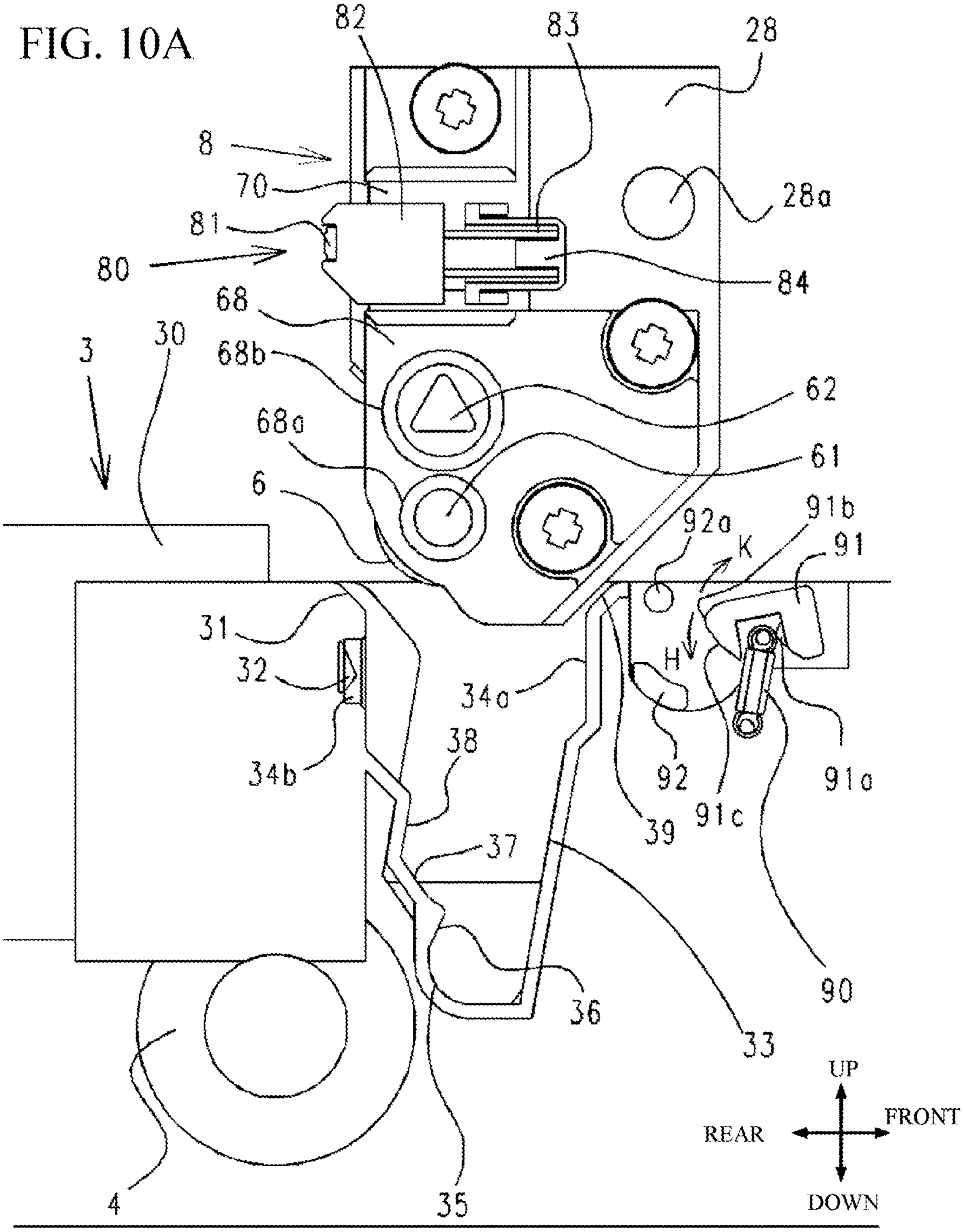
FIG. 10A is a schematic cross-sectional view illustrating a state before a developing cartridge is mounted.

FIG. 10A is a schematic cross-sectional view immediately before the developing cartridge 8 is inserted into an arbitrary slot of the cartridge tray 3. At this time, the developing cartridge 8 is not mounted on the cartridge tray 3. The developing pressure member 91 is in a state of being pulled by the developing pressure spring 90 so that its position is regulated by the cartridge tray 3. Further, the developing cartridge 8 is in the same state as in FIGS. 7 and 8A. At this time, the position of the memory tag unit 80 is regulated within the clearance ranges of the attitude regulation hole 86 (86a, 86b, 86c) of the developing cartridge 8 and the attitude regulation boss 85 (85a, 85b, 85c) of the memory tag unit 80.

Figure 10B:
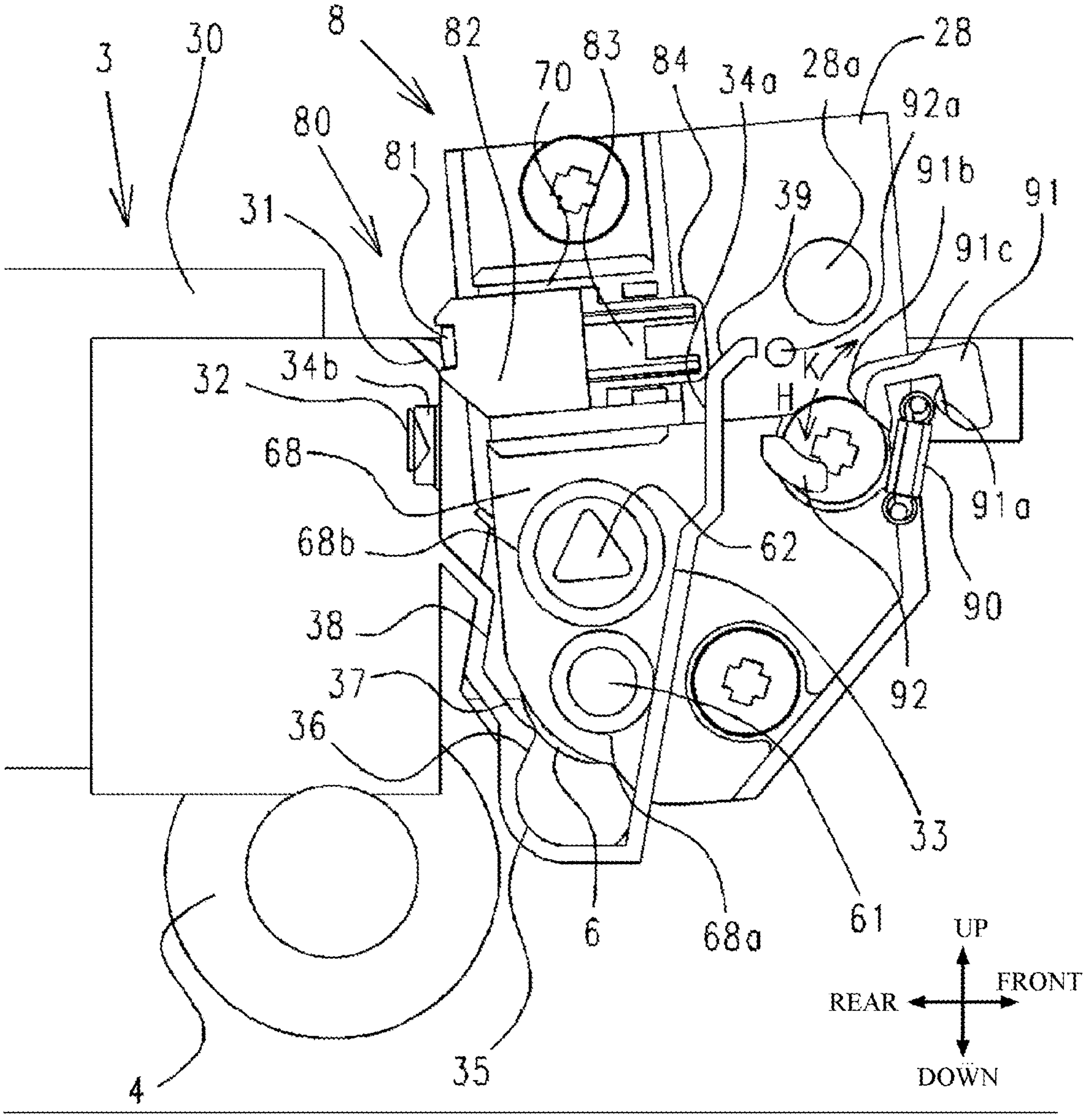
FIG. 10B is a schematic cross-sectional view illustrating a state in which a developing cartridge is being mounted.

FIG. 10B illustrates a state in which the developing cartridge 8 is being mounted on the cartridge tray 3. FIGS. 8A and 8B illustrate a state in which the developing cartridge 8 advances toward the downstream portion of the guide member in the mounting direction. The developing roller cover positioning portion 68a of the developing cartridge 8 abuts on the cartridge guide portion 33 of the cartridge tray 3, and the memory tag pressing member 82 and the pressure spring receiving member 84 of the memory tag unit 80 abut on the memory guide portion 31 and the receiving member guide portion 39 of the cartridge tray 3, respectively.

When shifting from the state of FIG. 10A to the mounting state of FIG. 10B, the memory unit support portion 34a of the guide member guides the developing roller cover positioning portion 68a of the developing cartridge 8 toward the developing roller positioning portion 35 which is the guide side positioning portion located downstream. Due to this, the developing roller cover positioning portion 68a of the developing cartridge 8 is smoothly guided toward the surface to be abutted when the developing cartridge 8 is mounted. Further, the presence of the cartridge guide portion 33 guides the developing roller cover positioning portion 68a more stably.

It is noted that the mounting attitude or the insertion trajectory of the developing cartridge 8 is different according to each user's gripping angle or inserting operation of the developing cartridge 8. Therefore, each portion of the guide member of the cartridge tray 3 (memory guide portion 31, receiving member guide portion 39, memory unit support portion 34a, cartridge guide portion 33, developing roller positioning guide portion 36, drive input guide portion 38) can guide the developing roller cover positioning portion 68a to the developing roller positioning portion 35. Further, each of these portions can guide the drive input cover positioning portion 68b to the drive input positioning portion 37. However, regardless of the mounting attitude or the like, the contact with each guide portion regulates the attitude or the trajectory of the developing cartridge 8 and the developing cartridge 8 is smoothly guided to a mounting completion position.

Figure 10C:
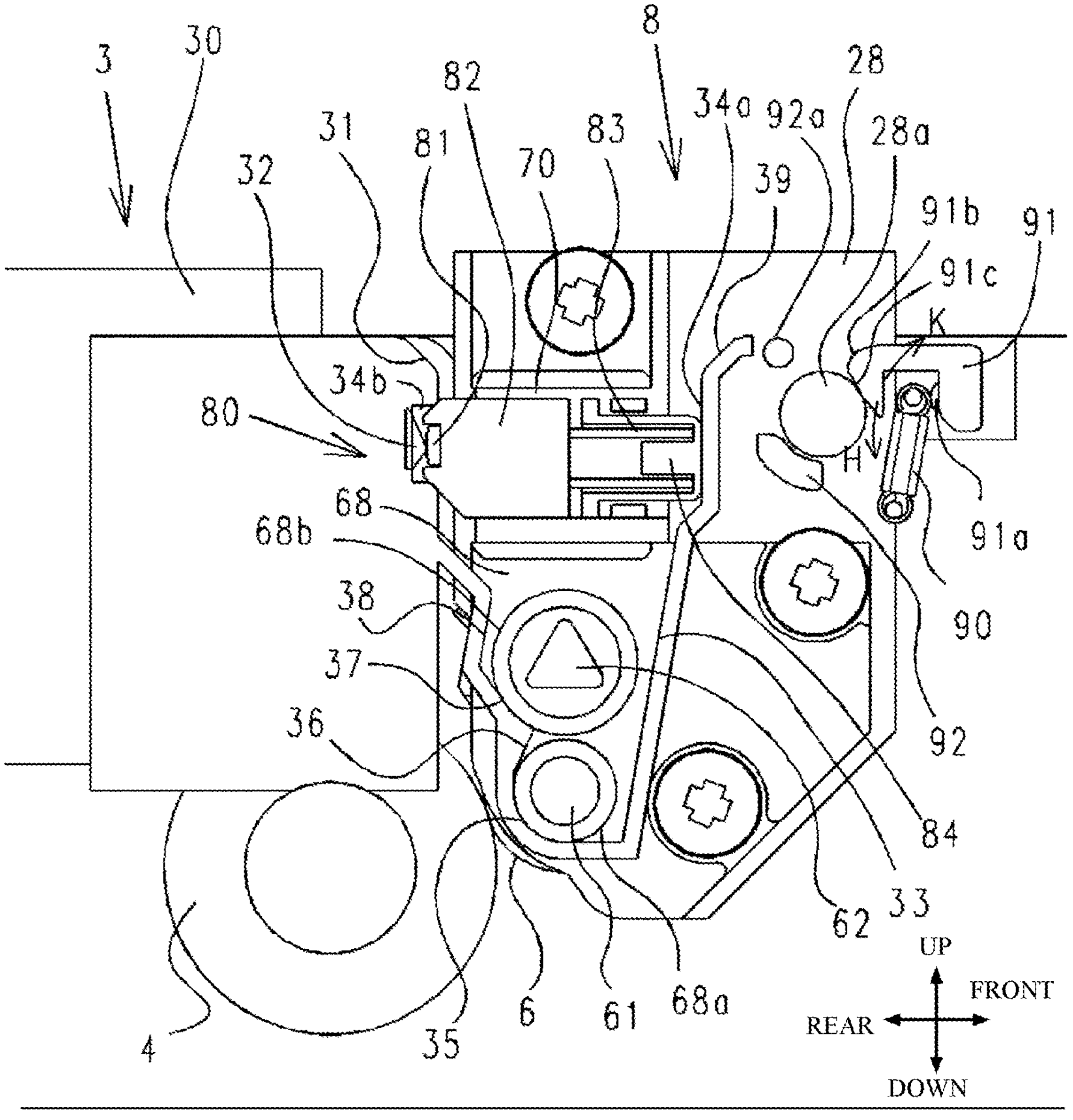
FIG. 10C is a schematic cross-sectional view illustrating a state in which a developing cartridge is completely mounted.

Further, even in the memory tag unit 80, when the memory tag pressing member 82 and the pressure spring receiving member 84 abut on the memory guide portion 31 and the receiving member guide portion 39, so that the memory tag unit 80 is compressed and guided to the state of FIG. 10C. The position of the memory tag unit is regulated and guided by the attitude regulation boss and the attitude regulation hole.

FIG. 10C is a schematic cross-sectional view when the mounting of the developing cartridge 8 on the cartridge tray 3 is completed. At this time, the developing roller cover positioning portion 68*a* and the drive input cover positioning portion 68*b* of the developing cartridge 8 abut on the developing roller positioning portion 35 and the drive input positioning portion 37 of the cartridge tray 3, respectively. As such, the cartridge side positioning portion provided in the developing cartridge 8 is smoothly guided to the abutting surface of the guide side positioning portion by the memory unit support portion 34*a* and the like. Further, since the memory unit support portion 34*a* serves as both the guide portion of the developing cartridge 8 and the positioning portion for the memory tag unit 80, the space can be saved as compared with the case in which they are provided separately.

It is noted that, when the developing cartridge 8 is mounted, the developing rotation stopper boss 28*a* first abuts on the arcuate surface of the rotation stopper boss guide portion 91*b* provided in the developing pressure member 91 of the cartridge tray 3. Subsequently, as the mounting of the developing cartridge 8 is in progress, the developing rotation stopper boss 28*a* rotates the developing pressure member 91 in the arrow K direction so that the developing pressure member 91 abuts on the cartridge pressure portion 91*c* and becomes the mounting state of FIG. 10C. In the mounted state, the developing rotation stopper boss 28*a* is pressurized in the arrow H direction by the spring force of the developing pressure spring 90. Therefore, since the developing cartridge 8 is pressurized in the arrow H direction, the developing roller cover positioning portion 68*a* and the drive input cover positioning portion 68*b* are stably positioned by the developing roller positioning portion 35 and the drive input positioning portion 37 of the guide member. As a result, the developing roller 6 and the photosensitive drum 4 abut on each other and the image can be formed. It is noted that, in the state of FIG. 10C, the developing rotation stopper boss 28*a* has a gap without abutting on the separation member 92.

Further, in the mounted state of FIG. 10C, the pressure spring receiving member 84 of the memory tag unit 80 and the memory unit support portion 34*a* abut on each other, and the memory unit support portion 34*a* functions as a backup portion. As a result, the memory tag 81 is pressurized toward the tray side contact portion 32 by the spring force of the memory tag pressure spring 83. This stabilizes the connection between the electrical contacts. Further, the position of the memory tag pressing member 82 for fixing the memory tag 81 is regulated by the memory unit support concave portion 34*b* provided to include the tray side contact portion 32.

That is, although the memory tag unit 80 has a gap as a clearance with respect to the developing cartridge 8, the memory tag unit 80 is fitted between the memory unit support portion 34*a* and the memory unit support concave portion 34*b*, so that the movement in the second direction and the third direction is regulated. It is noted that, in the longitudinal direction which is the first direction, the memory tag pressing member 82 is fitted to the memory unit support concave portion 34*b*, so that the movement of the memory tag unit 80 is regulated. With the above configuration, the electrical contact portion of the memory tag 81 is contacted and fixed to the tray side contact portion 32. The contact pressure of the contact portion of the memory tag 81 may be a pressure which allows stable positioning, and may be determined according to the shape of the concave portion provided in the tray side contact portion 32 or the shape of the memory tag pressing member 82. It is noted that the memory tag pressing member 82 may not abut on the concave portion, but the position may be determined by the contact between the memory tag 81 and the tray side contact portion 32.

Figure 10D:
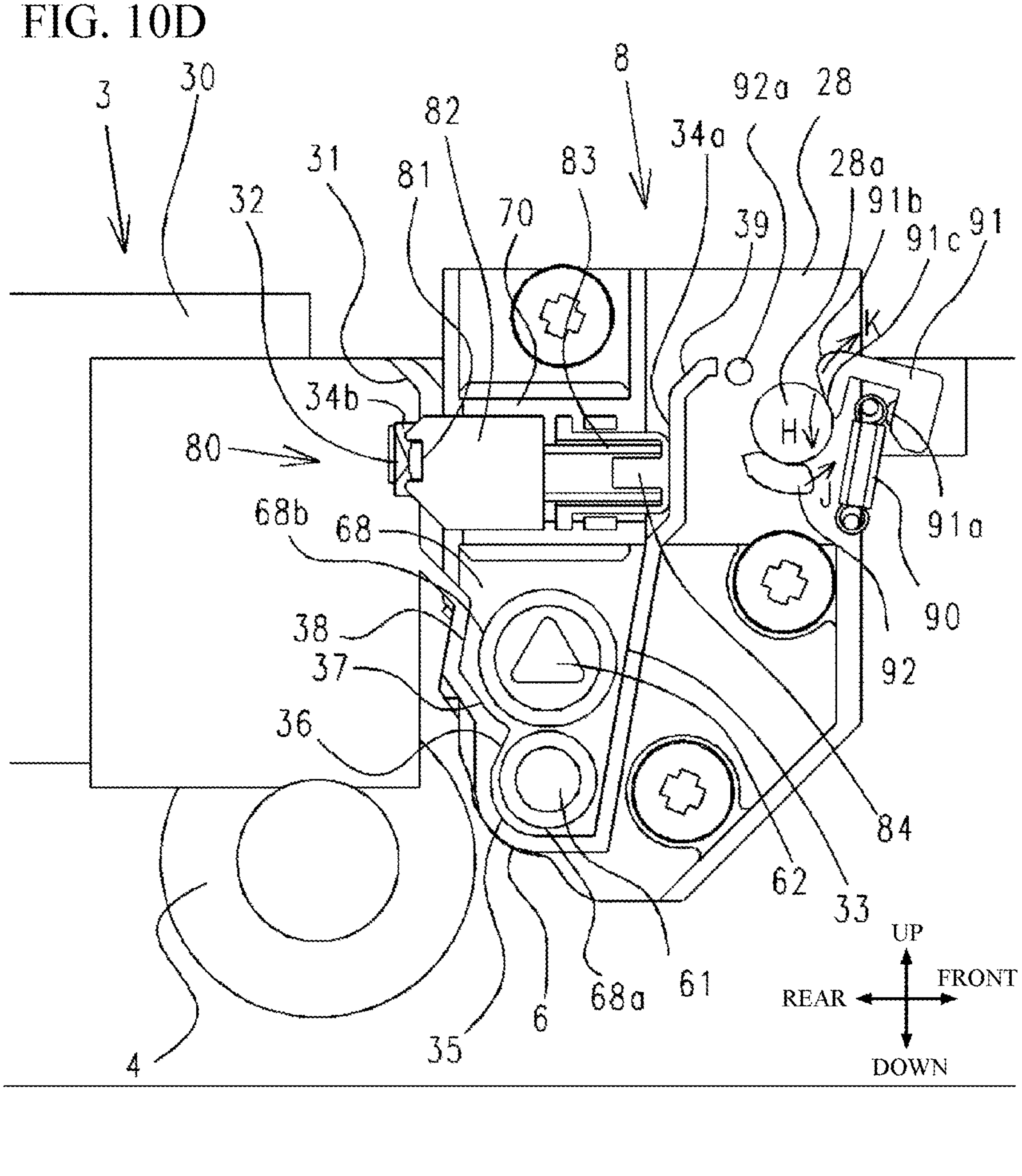
FIG. 10D is a schematic cross-sectional view illustrating a separated state of a developing cartridge.

FIG. 10D is a schematic cross-sectional view when the developing roller 6 of the developing cartridge 8 and the photosensitive drum 4 of the cartridge tray 3 are separated from each other. In the present embodiment, such a separated state is possible for the purpose of extending the service life of the developing roller 6 and the photosensitive drum 4. As illustrated in FIGS. 6A and 6B, in order to separate the developing cartridges 8, separation members 92 and 93 are provided on the driving side and the non-driving side of the cartridge tray 3. As illustrated in FIG. 6B, the separation member 92 on the driving side is attached rotatably about a separation member rotation center 92*a*. The separation member 93 on the non-driving side is also configured to have the rotation center at the symmetrical position, and a description of the same operations will be omitted. The separation member 92 receives the separation member pressure force F by pressurizing the separation member (not illustrated) of the image forming apparatus 1. This enables rotation in the arrow J direction.

FIG. 10D illustrates a state in which the separation member 92 receives the separation member pressure force F and rotates in the arrow J direction from the state of FIG. 10C. The developing rotation stopper boss (driving side) 28*a* of the developing cartridge 8 rotates the developing pressure member 91 in the arrow K direction and is moved and lifted according to the rotation of the separation member 92. Therefore, the developing roller 6 is separated from the photosensitive drum 4.

It is noted that, even in the separated state, as illustrated in FIG. 10D, the memory tag unit 80 is positioned in the cartridge guide portion 33 and has a gap as a clearance with respect to the developing cartridge 8. Therefore, the contact between the electrical contact portions is maintained even in the separated state. This is because the attitude regulation boss 85 (85*a*, 85*b*, 85*c*) of the memory tag unit 80 does not abut on the attitude regulation hole 86 (86*a*, 86*b*, 86*c*) of the developing cartridge 8 and the position of the memory tag unit 80 remains in the state of FIG. 10C.

<<Positional Relationship Between Memory Tag Unit and Cartridge Guide>>

The positional relationship between the cartridge guide portion and the memory tag unit portion of the cartridge tray 3 in the longitudinal direction will be described with reference to FIGS. 5, 6A, 6B, and 10A to 10D.

As described above, when the developing cartridge 8 is mounted on the cartridge tray 3, the developing roller cover positioning portion 68*a* and the drive input cover positioning portion 68*b*, which are the positioning portions on the side of the developing cartridge 8, pass through or abut on and pass through the memory guide portion 31, the receiving member guide portion 39, the memory unit support portion 34*a*, and the memory unit support concave portion 34*b* of the cartridge tray 3. After that, the positioning portion on the developing cartridge 8 side moves to the mounting completion position while abutting on the cartridge guide portion 33 or the drive input guide portion 38.

For example, in the example of FIGS. 10A and 10B, when the developing cartridge 8 is inserted into the cartridge tray 3, the developing roller cover positioning portion 68*a* may first abut on the memory unit support portion 34*a* according to the angle of the developing cartridge 8 at the time of insertion, and may be guided to reach the cartridge guide portion 33. Further, the developing roller cover positioning portion 68*a* may be abutted on and guided by the drive input guide portion 38 to move downward. However, in either case, the developing roller cover positioning portion 68*a* is guided downward while abutting on the cartridge guide portion 33 and the like and is housed in the developing roller positioning portion 35.

In the present embodiment, as illustrated in FIGS. 6A and 6B, the memory guide portion 31, the receiving member guide portion 39, the memory unit support portion 34*a*, and the memory unit support concave portion 34*b* are provided at substantially the same position as the cartridge guide portion 33 in the longitudinal direction. That is, a member for defining the positional relationship between each positioning portion of the developing cartridge 8 and the cartridge tray 3 and a member for defining the positional relationship between the memory tag unit 80 of the developing cartridge 8 and the cartridge tray 3 are provided at substantially the same position in the longitudinal direction. With this arrangement, even when the developing cartridge 8 is inserted at any angle, the developing roller cover positioning portion 68*a* and the drive input cover positioning portion 68*b* are guided while abutting on the memory guide portion 31, the memory unit support portion 34*a*, or the like. As a result, it is possible to prevent the user from making a mistake in the insertion position.

Further, the guide portion such as the cartridge guide portion 33, the developing roller positioning portion 35, or the developing roller positioning guide portion 36 of the cartridge tray 3, the fixing portion such as the memory unit support portion 34*a* and the memory unit support concave portion 34*b* for fixing the memory tag unit 80, and the tray side contact portion 32 contacting the memory tag 81 are provided at substantially the same position in the longitudinal direction. Therefore, when the developing cartridge is mounted, the cartridge guide portion 33 and the memory tag unit are arranged at substantially the same position in the longitudinal direction. With this configuration, the longitudinal positioning accuracy of the memory tag unit 80 is improved. Since the longitudinal positioning accuracy is improved, the engaging operation of the memory tag unit 80 can be stably performed. Therefore, the accuracy of alignment between the tray side contact portion 32 of the cartridge tray 3 and the electrical contact portion of the memory tag 81 of the developing cartridge 8 is improved. This can reduce the size of the memory tag contact. Further, the stability of electrical connection is improved.

Further, when the guide portion of the cartridge tray 3 and the fixing portion or the contact portion of the memory tag unit 80 are arranged at substantially the same position as the cartridge guide portion 33 in the longitudinal direction, the following favorable effects are obtained as compared with the case in which the fixing portion or the contact portion are arranged inside or outside the guide portion in the longitudinal direction.

First, consider the case in which the fixing portion or the electrical contact portion of the memory in the cartridge tray 3 is arranged outside the cartridge guide portion 33 in the longitudinal direction. In this case, the memory tag unit 80 is also arranged outside the cartridge tray 3 in the longitudinal direction, and it is necessary to secure a space therefor. As a result, the size of the cartridge tray 3 increases. Further, a space corresponding to the apparatus main body 2 is required. Therefore, the size of the main body increases. On the other hand, when the fixing portion or the electrical contact portion of the memory tag unit 80 is arranged at substantially the same position in the longitudinal direction, the increase in the size of the cartridge tray 3 or the size of the apparatus main body 2 can be suppressed, and the size of the apparatus can be reduced.

Next, consider the case in which the fixing portion or the electrical contact portion of the memory in the cartridge tray 3 is arranged inside the cartridge guide portion 33 in the longitudinal direction. In this case, the memory tag unit 80 is also arranged inside the developing cartridge 8 in the longitudinal direction, and the memory tag unit 80 and the developer storage frame 28 superimpose each other in the direction orthogonal to the longitudinal direction. As a result, in order to secure the space, it is necessary to shorten the developer storage frame 28 in the longitudinal direction or reduce the size of the developer storage frame 28. As a result, the developer capacity that can be stored decreases. On the other hand, when the fixing portion or the electrical contact portion of the memory tag unit 80 is arranged at substantially the same position in the longitudinal direction, it is unnecessary to reduce the size of the developer storage frame 28. Therefore, the developer capacity can be secured.

It is noted that, in the above description, the guide portion such as the cartridge guide portion 33 and the fixing portion or the contact portion of the memory tag unit 80 are arranged at substantially the same position in the longitudinal direction. However, when the guide portion and the fixing portion or the contact portion of the memory are arranged in the direction orthogonal to the longitudinal direction so that at least part thereof is superimposed, it is possible to obtain the effects such as prevention of the increase in apparatus size or the reduction in developer capacity.

Further, the cartridge guide portion 33 or the fixing portion or contact portion of the memory is made to fit within the width of one side wall of the cartridge tray frame 30 in the longitudinal direction, thereby preventing the increase in apparatus size. As illustrated in FIG. 6A, two side walls extending in the direction orthogonal to the longitudinal direction among the sides of the cartridge tray frame 30 are referred to as a first side wall 30*a* and a second side wall 30*b*, respectively. The first side wall 30*a* is a side wall on which the fixing portion or the contact portion of the memory are arranged, and is a side wall corresponding to the memory tag unit 80 when the developing cartridge is mounted. In this case, the cartridge guide portion 33, or the fixing portion or the contact portion of the memory is configured in the longitudinal direction so as to fit within the width of the first side wall 30*a*, thereby preventing the increase in apparatus size.

As described above, in the present embodiment, the guide portion of the cartridge tray 3 and the fixing portion or the contact portion of the memory tag unit 80 are provided in the direction orthogonal to the longitudinal direction so that at least part thereof is superimposed. More preferably, the guide portion of the cartridge tray 3 and the fixing portion or the contact portion of the memory tag unit 80 are provided at substantially the same position in the longitudinal direction. With this configuration, in the image forming apparatus 1 in which the developing cartridge 8 provided with the memory tag 81 which is the memory medium is attachable to and detachable from the cartridge tray 3, it is possible to prevent the increase in the size of the image forming apparatus 1 or the reduction in developer capacity. Further, the memory medium can be stably connected.

In the embodiment, since the memory tag unit 80 is arranged at one end portion on the driving side of the developing cartridge 8, the guide portion on the driving side and the fixing portion or the contact portion of the memory are provided at substantially the same position in the longitudinal direction. However, the present invention can also be applied to the case in which the memory tag unit 80 is arranged at the other end portion which is different from the driving side of the developing cartridge 8. In that case, the guide portion of the other end portion and the fixed portion or the contact portion of the memory may be provided at substantially the same position in the longitudinal direction. Alternatively, at least the guide portion of the other end portion and the fixed portion or the contact portion of the memory may be provided so that at least part thereof is superimposed in the direction orthogonal to the longitudinal direction.

[Modifications]

Next, different configuration examples of the image forming apparatus according to Embodiment 1 will be described with reference to the drawings. In the above, a guide member is continuously provided when seen in a cross-section in a direction orthogonal to a longitudinal direction. On the other hand, in the cross-sectional views of a guide member of a cartridge tray 3 illustrated in FIGS. 11A to 12B, the guide member is not continuous. However, such a cross-sectional shape is also considered to be a substantially U-shaped cross-section by including a virtual surface extending from a surface of a memory unit support portion 34*a* or a surface of a cartridge guide portion 33.

Figure 11A:
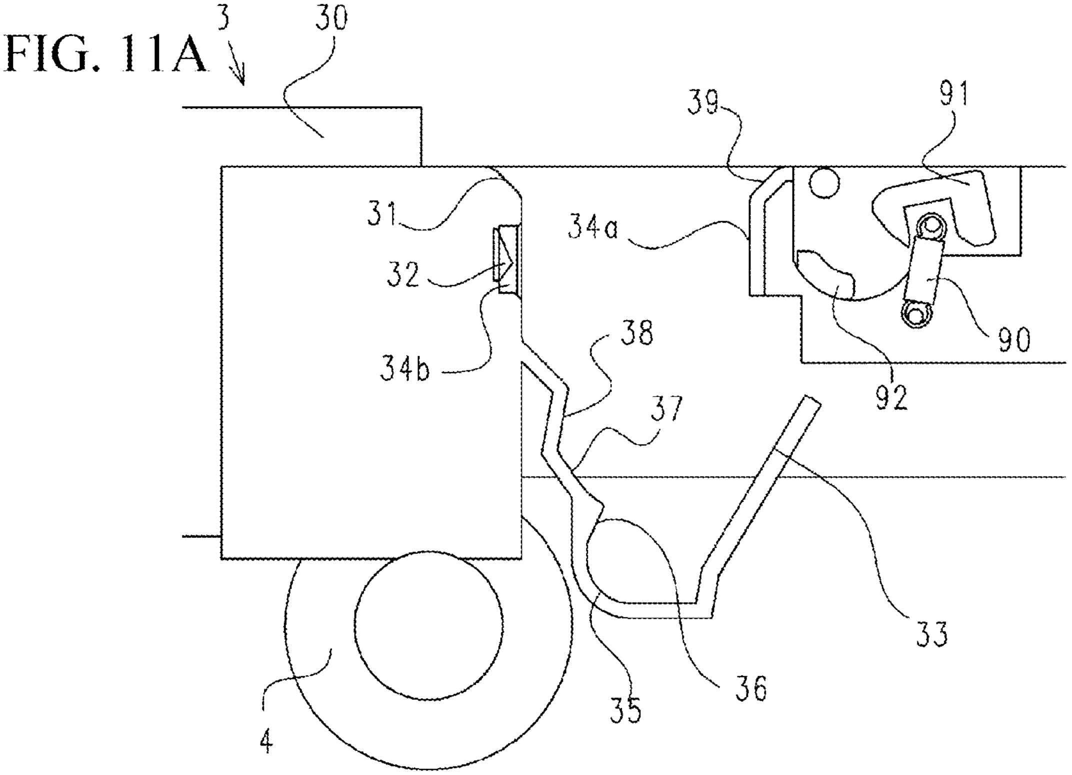
FIGS. 11A and 11B are schematic cross-sectional views illustrating a modification of a guide member provided in a cartridge tray, respectively.

FIG. 11A illustrates a cross-sectional structure of a guide member in a first modification. In the cross-section of the present modification, as illustrated, the memory unit support portion 34*a* and the cartridge guide portion 33 are not continuous. When a developing cartridge 8 is mounted in this configuration, a developing roller cover positioning portion 68*a* passes through a receiving member guide portion 39, advances to a downstream portion in a mounting direction along a virtual surface extending the memory unit support portion 34*a*, and reaches the surface of the cartridge guide portion 33. The developing roller cover positioning portion 68*a* is guided to the cartridge guide portion 33 and positioned and fixed. As such, even when the guide member is divided into a plurality of members in the cross-section and the member for backing up a memory tag unit 80 is independent, it is possible to guide and fix the developing cartridge 8 to the downstream portion.

Figure 11B:
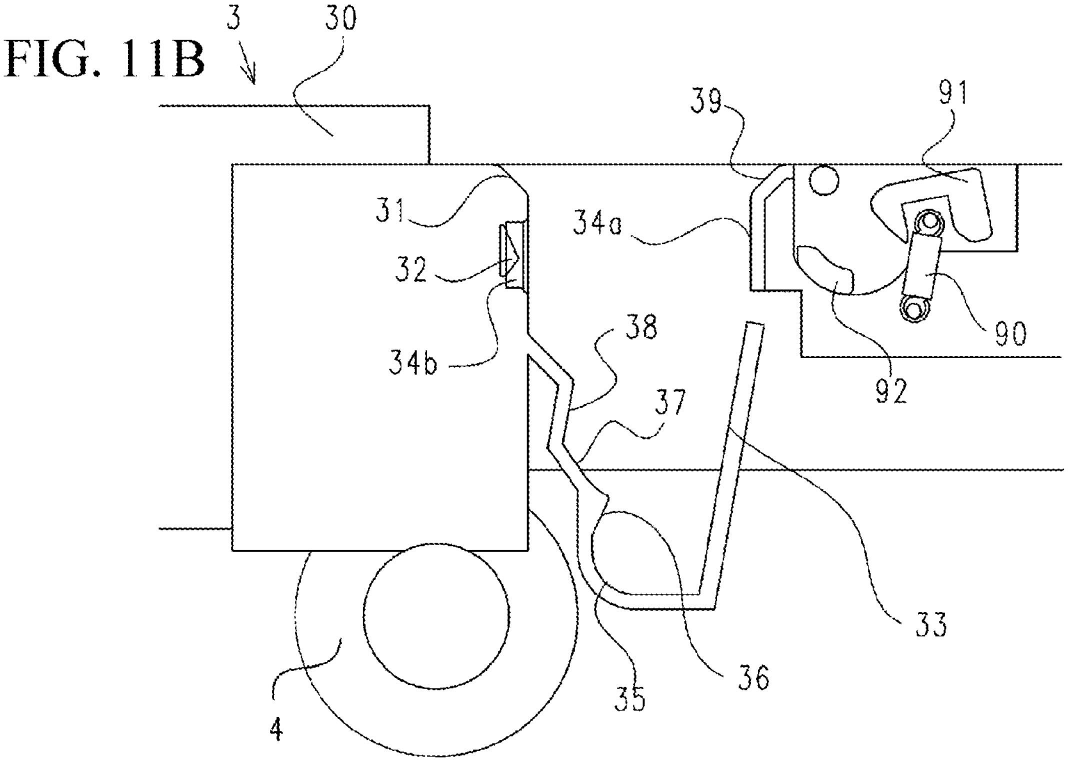

FIG. 11B is a cross-sectional structure of a guide member in a second modification. In the cross-section of the present modification as well, a memory unit support portion 34*a* and a cartridge guide portion 33 are not continuous. Further, in the present modification, a virtual surface obtained by extending the surface of the memory unit support portion 34*a* is substantially continuous with the surface of the cartridge guide portion 33. When a developing cartridge 8 is mounted in this configuration, a developing roller cover positioning portion 68*a* passes through a receiving member guide portion 39 and is continuously guided, positioned, and fixed by the memory unit support portion 34*a* and the cartridge guide portion 33.

Figure 12A:
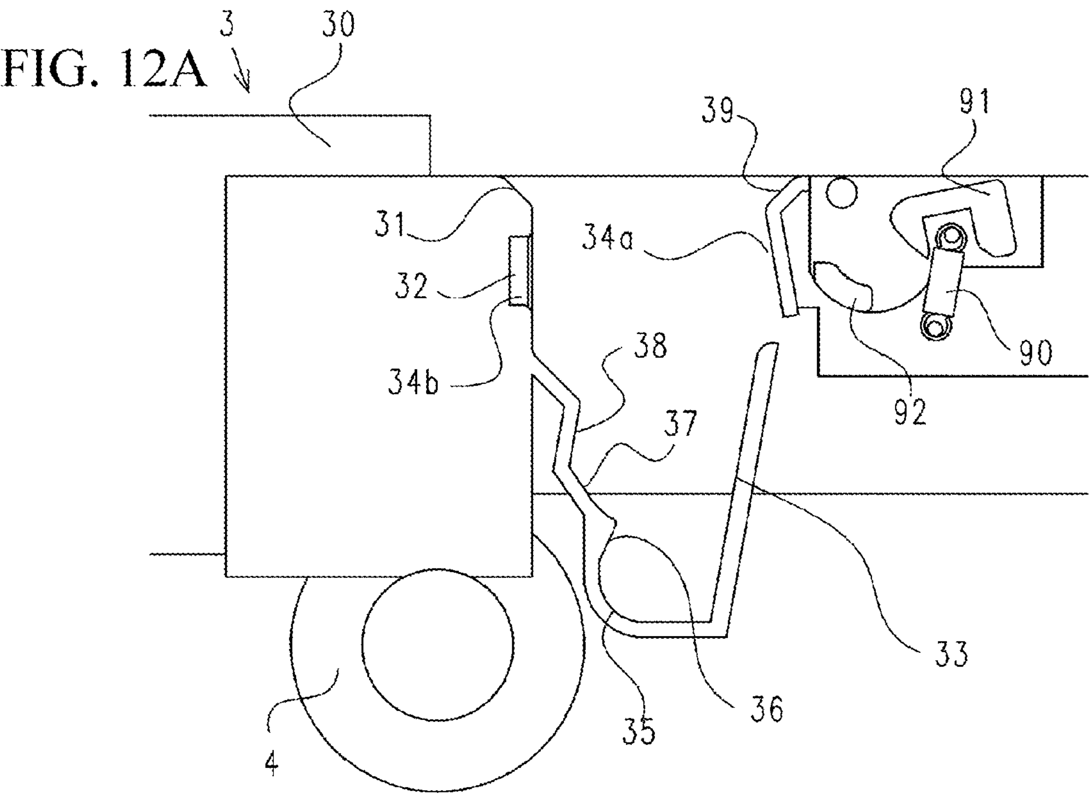
FIGS. 12A and 12B are other schematic cross-sectional views illustrating a configuration example of a guide member provided in a cartridge tray, respectively.

FIG. 12A illustrates a cross-sectional structure of a guide member in a third modification. In the cross-section of the present modification as well, a memory unit support portion 34*a* and a cartridge guide portion 33 are not continuous. Further, in the present modification, when a developing cartridge 8 is mounted, the developing roller cover positioning portion 68*a* is guided while abutting on a receiving member guide portion 39, moves downstream in the mounting direction, and is positioned and fixed via the surface of the cartridge guide portion 33.

Figure 12B:
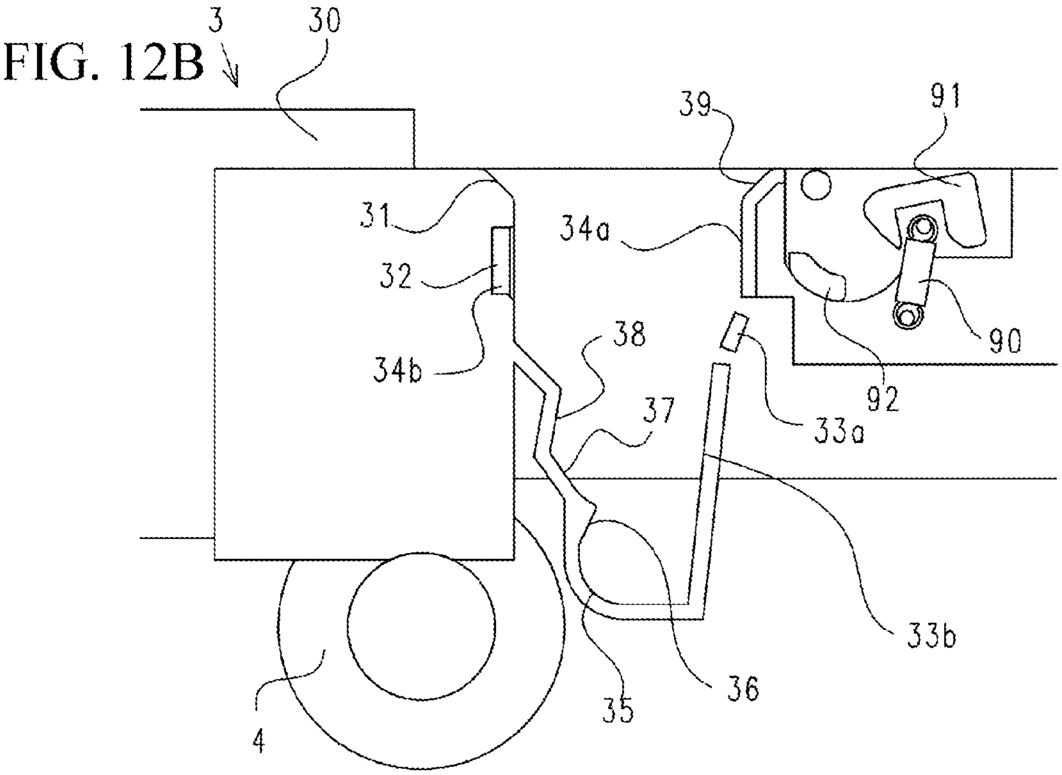

FIG. 12B is a cross-sectional structure of a guide member in a fourth modification. In the cross-section of the present modification as well, a memory unit support portion 34*a* and a cartridge guide portion 33 are not continuous, and the cartridge guide portion 33 further includes a plurality of members (upstream cartridge guide portion 33*a* and downstream cartridge guide portion 33*b*). When a developing cartridge 8 is mounted in this configuration, a developing roller cover positioning portion 68*a* passes through a receiving member guide portion 39, an upstream cartridge guide portion 33*a*, and a downstream cartridge guide portion 33*b* and is guided, positioned, and fixed by the cartridge guide portion 33.

Figure 13:
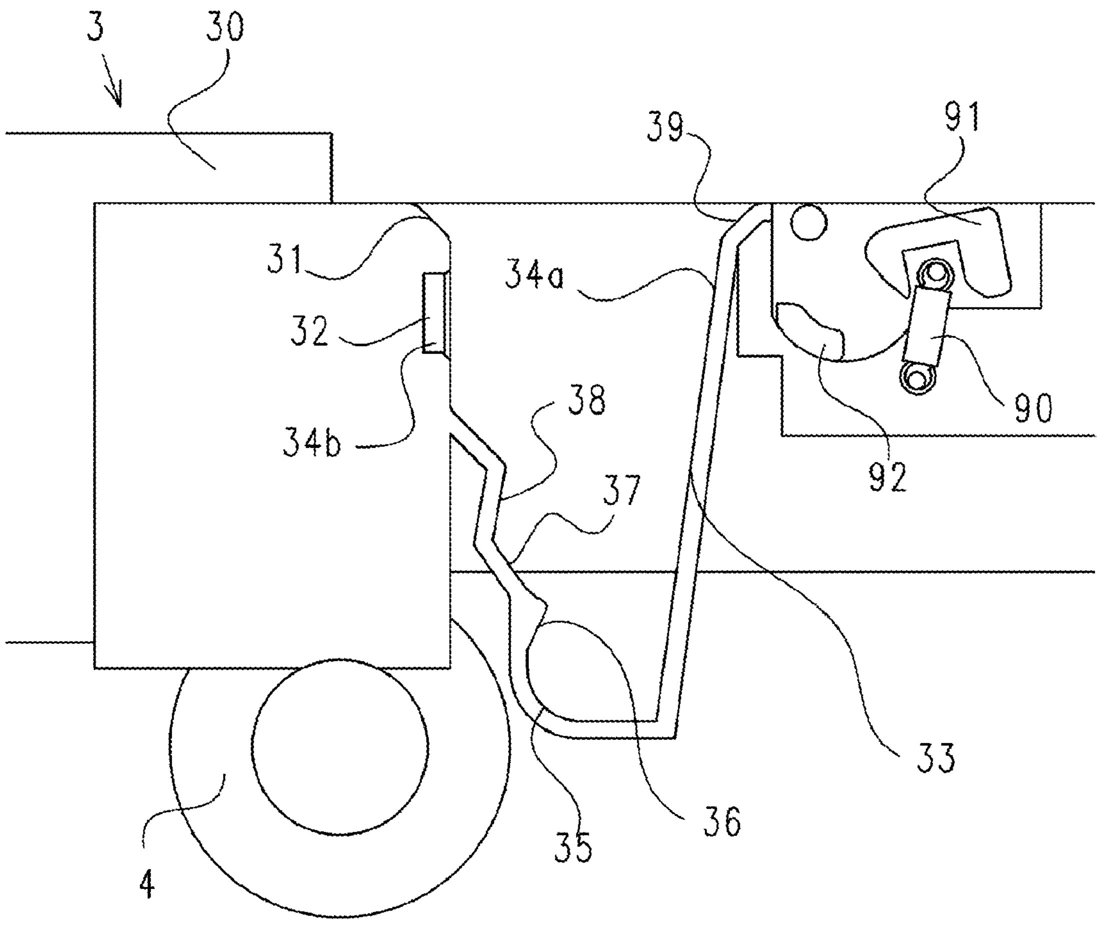
FIG. 13 is another schematic cross-sectional view illustrating a configuration example of a guide member provided in a cartridge tray.

FIG. 13 is a cross-sectional structure of a guide member in a fifth modification. In Embodiment 1, a support surface of a memory unit support portion 34*a* and a guide surface of a cartridge guide portion 33 have different angles in cross-section. On the other hand, in the cross-section of the present modification, as illustrated, the surface of the memory unit support portion 34*a* and the surface of the cartridge guide portion 33 are continuous and substantially the same surface. In this case, the upstream side among the substantially flat surfaces included in one side of the substantially U-shape functions as the backup of a memory tag unit 80. When a developing cartridge 8 is mounted in this configuration, a developing roller cover positioning portion 68*a* is guided, positioned, and fixed on the same surface via a receiving member guide portion 39.

As described above, even when guide members having various shapes are used, the developing cartridge 8 can be appropriately guided and positioned.

Embodiment 2

Next, Embodiment 2 will be described with reference to the drawings. Descriptions of portions overlapping the above-described embodiment may be simplified.

Basically, a configuration or an image forming operation of an image forming apparatus 1 of the present embodiment, a configuration of a cartridge tray 3 and a developing cartridge 8, and the like are the same as those described above with reference to FIGS. 1 to 9B. Further, a configuration of a memory tag unit 80, to which a memory tag 81 which is a memory medium (memory unit) is attached, is also the same as that described above. The mounting operation of the developing cartridge 8 is also the same as that performed using FIGS. 10A to 10D.

<Developing Roller Cover>

Next, a developing roller cover 100 as a cover member mounted on the developing cartridge 8 according to the present embodiment will be described.

FIG. 12A is a perspective view illustrating a state in which the developing cartridge 8 to which the developing roller cover 100 according to the present embodiment is attached, when seen from the non-driving side. FIG. 13 is a perspective view illustrating a state in which the developing cartridge 8 to which the developing roller cover 100 according to the present embodiment is attached, when seen from the driving side. Further, FIG. 12B is a perspective view when only the developing roller cover 100 is pulled out, when seen from the same direction as in FIG. 12A.

As illustrated in FIGS. 12A, 12B, and 13, the developing roller cover 100 includes a developing roller protection portion 101, a memory tag unit protection portion 102, a driving side fitting portion 103, a non-driving side fitting portion 104, and a grip portion 105. The developing roller protection portion 101 is a first cover portion which covers at least part of an exposed portion of the developing roller 6. In the present embodiment, the developing roller protection portion 101 covers the entire exposed portion of the developing roller 6, even when seen from both the second direction and the third direction which are perpendicular to the longitudinal direction. As illustrated in FIG. 12B, the memory tag unit protection portion 102 of the present embodiment is provided with an opening which opens upward. That is, when the developing roller cover 100 is moved downward (direction in which the developing roller cover 100 is separated from the developing roller 6), the memory tag unit protection portion 102 does not interfere with the memory tag unit 80. Further, the memory tag unit protection portion 102 opens toward the non-driving side in the longitudinal direction when seen from above and is formed as a □-shaped concave portion which accommodates the memory tag unit 80 inside (see FIG. 15A).

The position of the developing roller protection portion 101 with respect to the developing roller 6 is regulated by abutting on a developer storage frame 28 and s driving side positioning portion 68*a*. Due to this, a gap is formed between the developing roller 6 and the developing roller cover 100 to prevent impact on the developing roller 6 at the time of conveyance or handling during a replacement work.

The memory tag unit protection portion 102 is a second cover portion which covers at least part of the exposed portion (particularly the electrical contact portion (metal terminal)) of the memory tag 81 of the memory tag unit 80 on the driving side of the developing cartridge 8. In the present embodiment, at least the entire electrical contact portion (metal terminal) of the memory tag 81 when seen from the second direction is covered with the memory tag unit protection portion 102. In the present embodiment, for example, the developing roller cover 100 is configured as an integrated member in which the memory tag unit protection portion 102 and the developing roller protection portion 101 are connected to each other by a manufacturing method such as injection molding of a resin material.

The non-driving side fitting portion 104 which is a first engaging portion of the present embodiment is connected to one side (the non-driving side in the present embodiment) in the longitudinal direction with respect to the developing roller protection portion 101. The non-driving side fitting portion 104 is fitted to the outer periphery of the developing roller bearing positioning portion 71*a* which is a first positioning portion of the present embodiment, so that the developing roller cover 100 is regulated so as not to come off from the developing cartridge 8. The driving side fitting portion 103 which is a second engaging portion of the present embodiment is connected to the other side (the driving side in the present embodiment) in the longitudinal direction with respect to the developing roller protection portion 101. The driving side fitting portion 103 is fitted to the outer periphery of the driving side positioning portion 68*a* which is a second positioning portion of the present embodiment, so as to prevent the developing roller cover 100 from being released from the developing cartridge 8.

The grip portion 105 is connected to the non-driving side fitting portion 104 on the side opposite to the side where the non-driving side fitting portion 104 is connected to the developing roller protection portion 101. The grip portion 105 protrudes in the longitudinal direction from a cartridge bearing 71 which constitutes the side surface of the developing cartridge 8 in the longitudinal direction. A user unlocks the developing roller cover 100 by gripping the grip portion 105 and elastically deforming the developing roller cover 100 to disengage the non-driving side fitting portion 104 from the developing roller bearing positioning portion 71*a* in the longitudinal direction. The non-driving side fitting portion 104 also functions as a connecting portion which connects the grip portion 105 to the developing roller protection portion 101, and as described above, the non-driving side fitting portion 104 as the connecting portion needs to have a shape which is easily elastically deformed. That is, the grip portion 105 and the developing roller protection portion 101 are connected to each other by two pillar-shaped members, so that the space is formed on the side opposite to the grip portion with the developing roller bearing positioning portion 71*a* interposed therebetween. As will be described below, the user can remove the developing roller cover 100 from the developing cartridge 8 by operating the grip portion 105.

As such, the developing roller cover 100 according to the present embodiment is configured as an integrated member in which the developing roller protection portion 101, the memory tag unit protection portion 102, the driving side fitting portion 103, the non-driving side fitting portion 104, and the grip portion 105 are connected to each other.

<Method of Removing Developing Roller Cover from Developing Cartridge>

A method of removing the developing roller cover 100 from the developing cartridge 8 will be described with reference to FIGS. 14A to 14C.

Figure 14A:
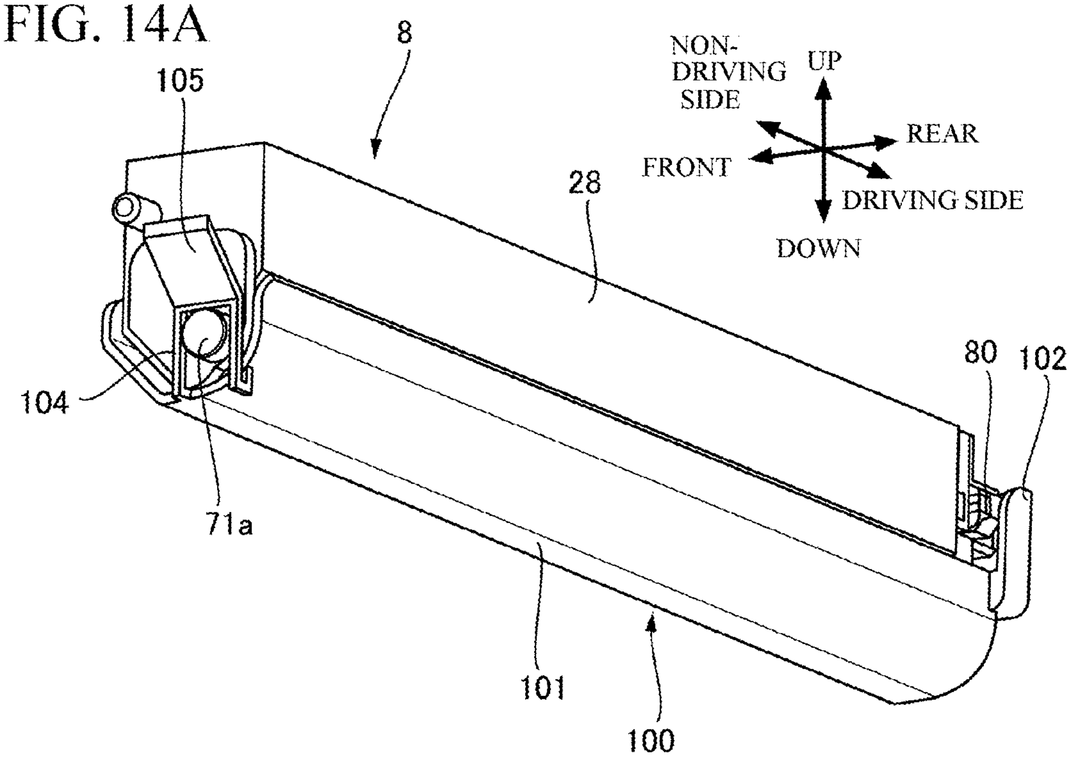
FIGS. 14A and 14B are a perspective view illustrating a state in which a developing roller cover of a developing cartridge of Embodiment 2 is attached and a perspective view of the developing roller cover of the developing cartridge of Embodiment 2, respectively.

FIG. 14A illustrates the developing cartridge 8 before the developing roller cover 100 is removed. In this state, the driving side fitting portion 103 of the developing roller cover 100 is fitted to the driving side positioning portion 68*a*, and the non-driving side fitting portion 104 is fitted to the developing roller bearing positioning portion 71*a*.

Figure 14B:
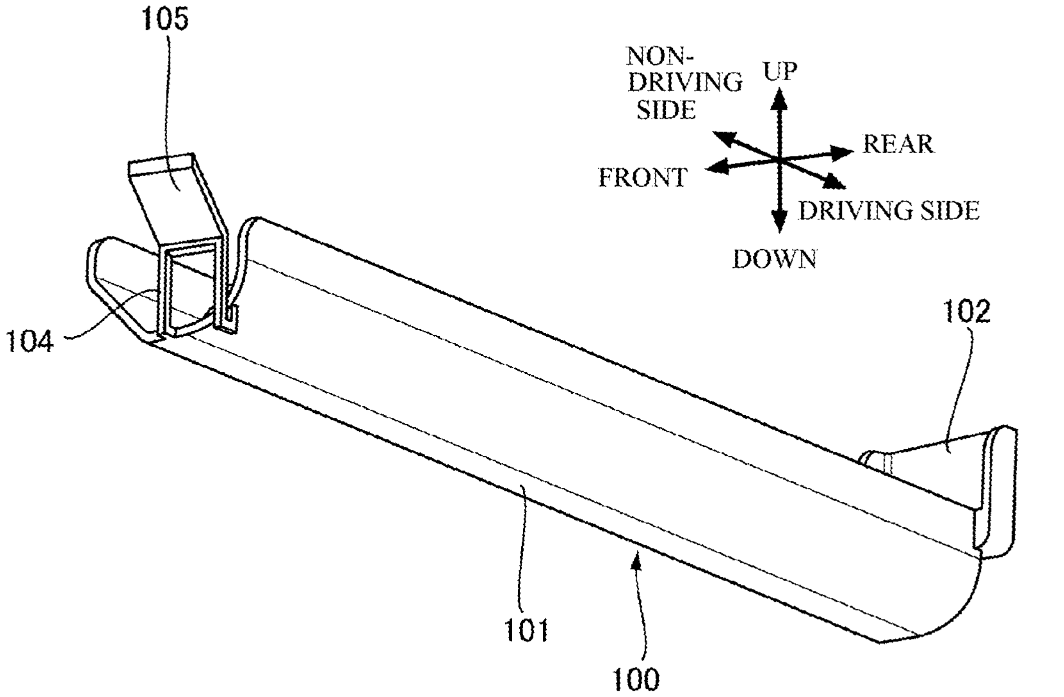

FIG. 14B illustrates a state in which the developing roller cover 100 is deformed by the operation of gripping the grip portion 105 and pulling the grip portion 105 toward the non-driving side in the longitudinal direction from the state of FIG. 14A. At this time, the fitting between the non-driving side fitting portion 104 and the developing roller bearing positioning portion 71*a* is released.

FIG. 14C illustrates a state in which the grip portion 105 is pulled substantially downward (second direction) from the state of FIG. 14B, with the grip portion 105 is being gripped. At this time, the developing roller cover 100 rotates in the second direction with the fitting portion between the driving side fitting portion 103 and the driving side positioning portion 68*a* as the rotation axis, and the developing roller protection portion 101 is separated from the developing roller 6. In this state, the user can remove the developing roller cover 100 from the developer storage frame 28 of the developing cartridge 8, for example, by sliding the developing roller cover 100 to the driving side in the longitudinal direction. At this time, since the memory tag unit protection portion 102 has a concave shape which opens toward the non-driving side in the longitudinal direction, it is possible to avoid the memory tag unit protection portion 102 from interfering with the memory tag unit 80.

It is noted that the operation of removing the developing roller cover 100 from the state illustrated in FIG. 14C is not limited to the above. For example, the driving side fitting portion 103 may be separated from the driving side positioning portion 68*a* by further rotating the developing roller cover 100 in the second direction from the state of FIG. 14C. In this case, the engaging amount between the driving side fitting portion 103 and the driving side positioning portion 68*a* illustrated in FIG. 13 is set so that the fitting between the driving side fitting portion 103 and the driving side positioning portion 68*a* is released by the rotation of the developing roller cover 100 by a certain angle. In this case as well, since the memory tag unit protection portion 102 has an opening which opens upward, it is possible to avoid the memory tag unit protection portion 102 from interfering with the memory tag unit 80.

<Positional Relationship Between Memory Tag Unit and Memory Tag Unit Protection Portion>

Figure 15:
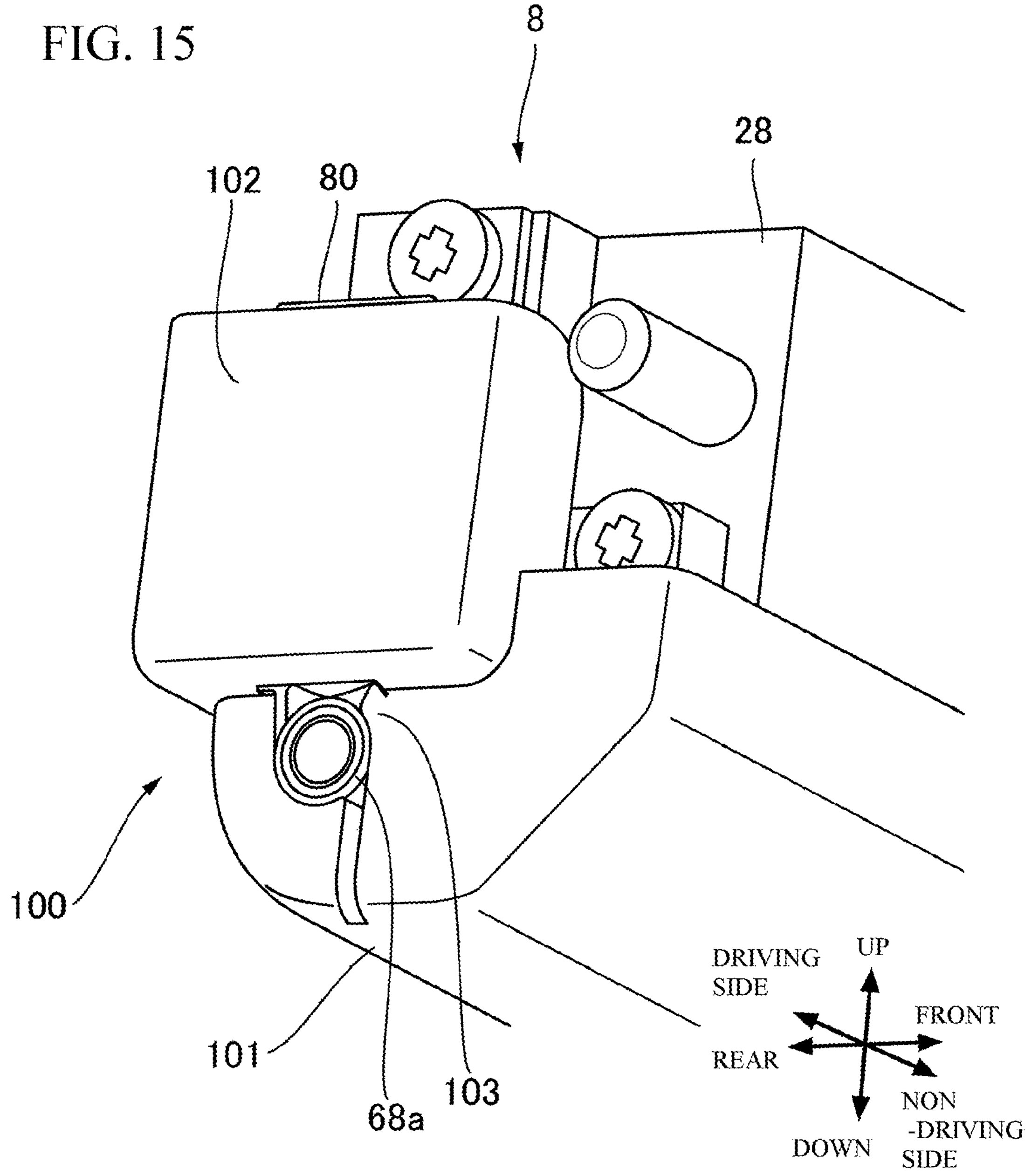
FIG. 15 is a perspective view illustrating a shape on the driving side of the developing roller cover of Embodiment 2.
Figure 16A:
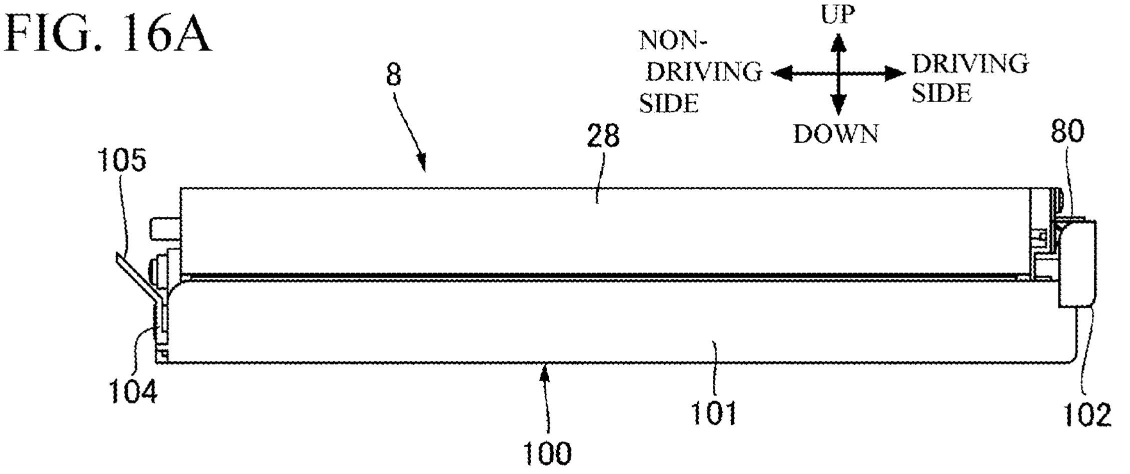
FIGS. 16A to 16C are views explaining the removal of the developing roller cover of Embodiment 2, respectively.
Figure 16B:
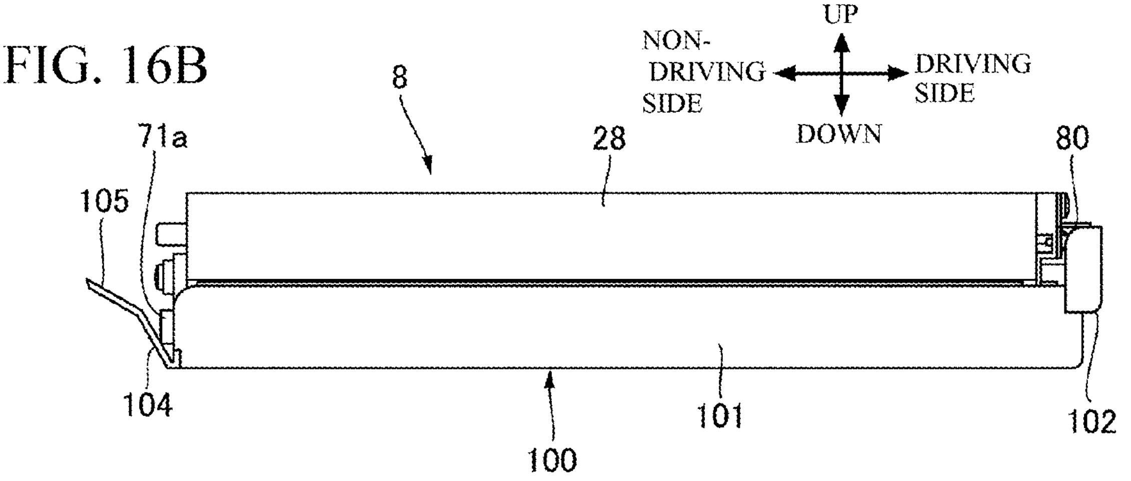
Figure 16C:
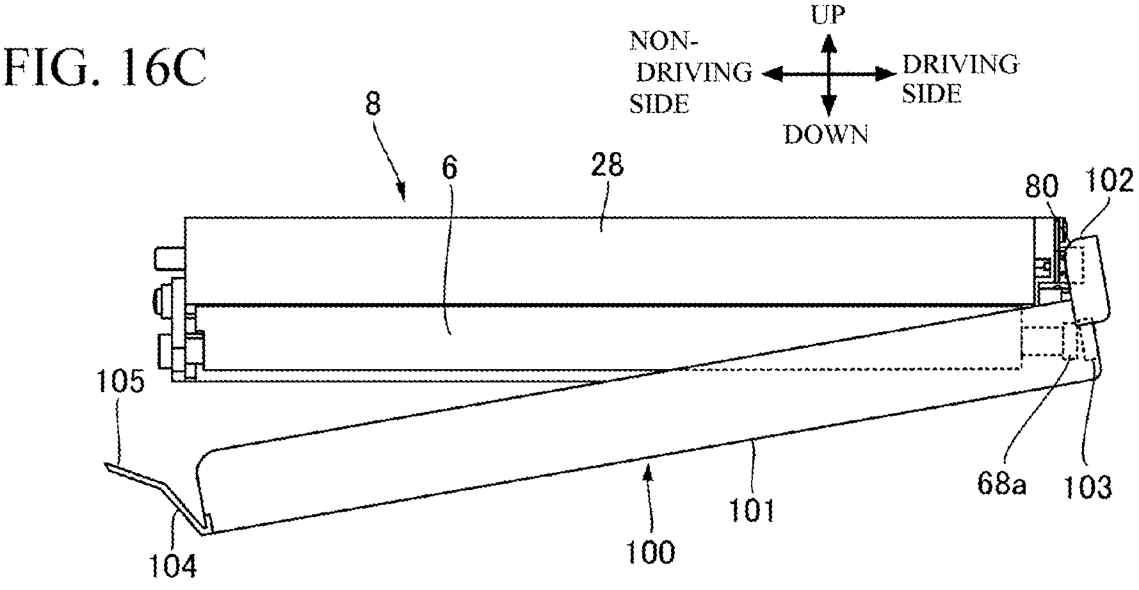
Figure 17A:
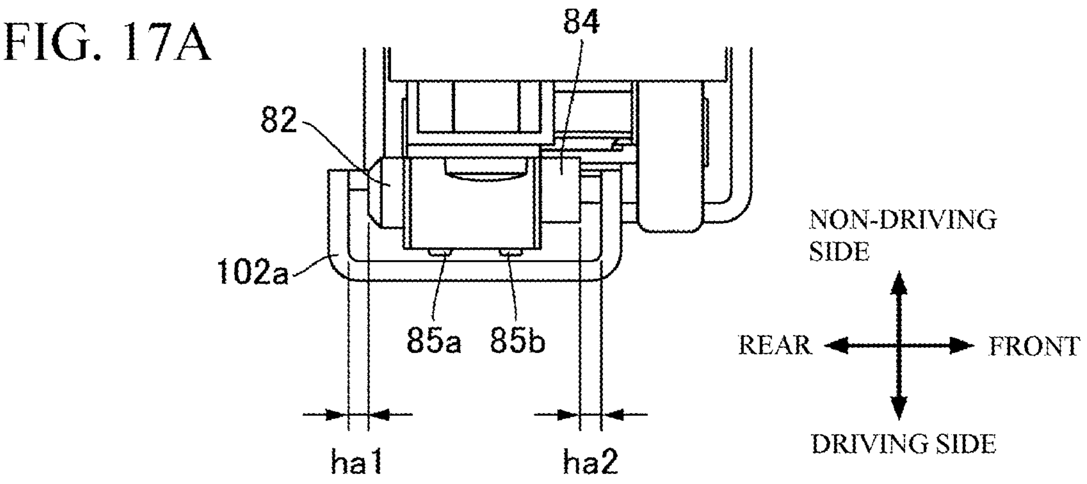
FIGS. 17A to 17C are views illustrating an example of a positional relationship between a memory tag unit and a memory tag protection portion of the developing roller cover in Embodiment 2.
Figure 17B:
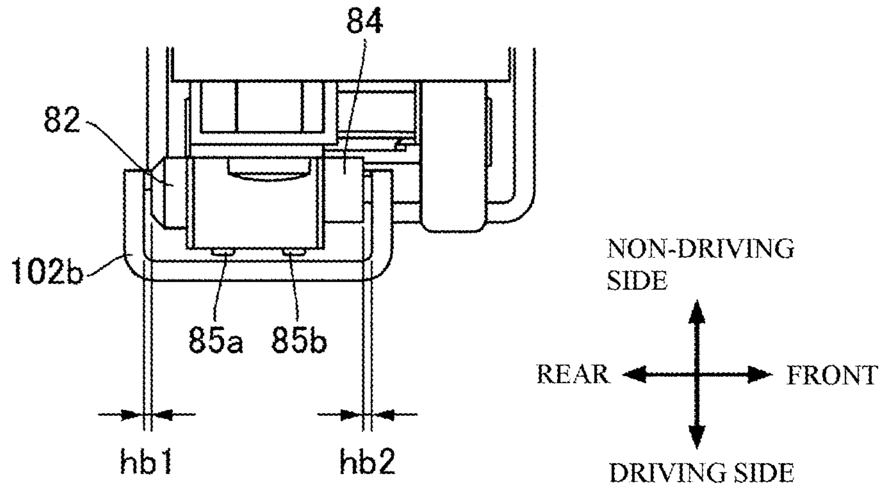
Figure 17C:
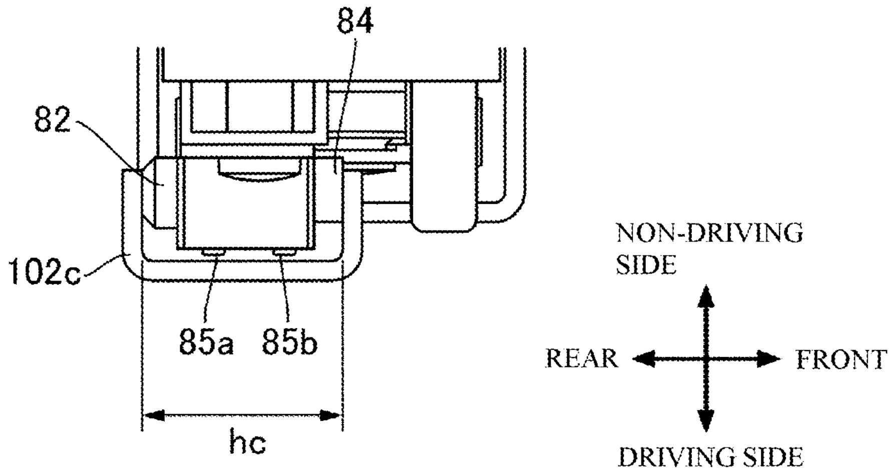

The positional relationship between the memory tag unit 80 and the memory tag unit protection portion 102 will be described. FIGS. 15A to 15C illustrate three configuration examples in which the memory tag unit 80 and the memory tag unit protection portions 102*a*, 102*b*, and 102*c* have different positional relationships. FIGS. 15A to 15C illustrate a state in which an end portion on the driving side of the developing cartridge 8 is seen from above in a state in which the developing roller cover 100 is not removed.

The first example illustrated in FIG. 15A is a configuration in which the spring receiving member regulated portion 84*a*, which is the regulated portion of the spring receiving member 84 of the memory tag unit 80, abuts on the front regulation portion 82*a* (see FIG. 9B). That is, in this example, the memory tag unit 80 protected by the memory tag unit protection portion 102*a* is in the expanded state. Regarding the expansion/contraction direction (second direction) of the memory tag unit 80, a gap ha1 is secured between the memory tag pressing member 82 and the memory tag unit protection portion 102*a*, and a gap ha2 is secured between the spring receiving member 84 and the memory tag unit protection portion 102*a*. The gaps ha1 and ha2 have a sufficient distance for the memory tag unit 80 to take the expanded state. That is, even when the attitude regulation bosses 85*a*, 85*b*, and 85*c* move inside the attitude regulation holes 86*a*, 86*b*, and 86*c*, the memory tag unit protection portion 102*a* and the memory tag unit 80 never abut on each other. Therefore, it is possible to prevent the memory tag pressing member 82 and the spring receiving member 84 from being abutted and damaged by impact or the like during conveyance.

In the second example illustrated in FIG. 15B, similar to the first example, the memory tag unit 80 is in the expanded state while being protected by the memory tag unit protection portion 102*a*. However, a gap hb1 between the memory tag pressing member 82 and the memory tag unit protection portion 102*b* and a gap hb2 between the spring receiving member 84 and the memory tag unit protection portion 102*b* are set to be narrower than in the first example. (hb1<ha1, hb2<ha2). The gaps hb1 and hb2 have such a size that the memory tag pressing member 82 or the spring receiving member 84 and the memory tag unit protection portion 102*b* can abut on each other when the attitude regulation bosses 85*a*, 85*b*, and 85*c* move inside the attitude regulation holes 86*a*, 86*b*, and 86*c*. However, the memory tag pressing member 82 and the spring receiving member 84 do not abut the memory tag unit protection portion 102*b* at the same time, and only one of the memory tag pressing member 82 and the spring receiving member 84 abuts the memory tag unit protection portion 102*b*. With this configuration, the movement of the memory tag pressing member 82 and the spring receiving member 84 is regulated more than in the first example. With this configuration, the amount of movement of the memory tag unit 80 when the memory tag unit 80 receives impact can be reduced, and the damage to the memory tag unit 80 can be prevented.

The third example illustrated in FIG. 15C illustrates a configuration in which the memory tag pressing member 82 and the spring receiving member 84 are always in a state of abutting on the memory tag unit protection portion 102*c*. In this configuration, the position of the memory tag unit 80 is fixed by the developing roller cover 100. An inner width hc of the memory tag unit protection portion 102*c* is set to be identical to or narrower than a natural length hm of the memory tag unit illustrated in FIG. 9B. Therefore, the memory tag pressing member 82 and the spring receiving member 84 are pressurized against the memory tag unit protection portion 102*c* by the biasing force of the memory tag pressure spring 83, and the positions of the memory tag pressing member 82 and the spring receiving member 84 are determined. It is noted that the inner width hc may be set so that the spring receiving member regulated portion 84*a* and the front regulation portion 82*a* or the rear regulation portion 82*b* of the memory tag pressing member 82 abut on each other, and the spring receiving member regulated portion 84*a* may be separated from both the front regulation portion 82*a* and the rear regulation portion 82*b*. In the present embodiment, the memory tag unit 80 is fixed in a state of being protected by the memory tag unit protection portion 102*c* and does not move even when impact or the like is applied during conveyance. Thus, the memory tag unit 80 can be protected.

(Modification)

In each embodiment described above and each embodiment described below, a full color image forming apparatus in which four developing cartridges are mounted on one cartridge tray is described. However, the present technology can also be applied to a developing cartridge (for example, a developing cartridge in a monochrome printer) which is directly attached to or detached from an apparatus main body of an image forming apparatus.

Further, the technology described in the present embodiment can also be applied to a cover member which protects an element member of a cartridge other than the developing cartridge. For example, in a cover member which is attached to a photosensitive cartridge having a photosensitive drum and a memory tag, it is conceivable to integrally form a first cover portion which covers the exposed portion of the photosensitive drum and a second cover portion which covers the electrical contact portion (metal terminal) of the memory tag.

Embodiment 3

An embodiment of an image forming apparatus 1 according to the present invention and a developing cartridge 8 and a cartridge tray 3 used in the image forming apparatus 1 will be described with reference to the drawings. Descriptions of portions overlapping the above-described embodiment may be simplified.

<<Configuration of Image Forming Apparatus>>

Figure 18:
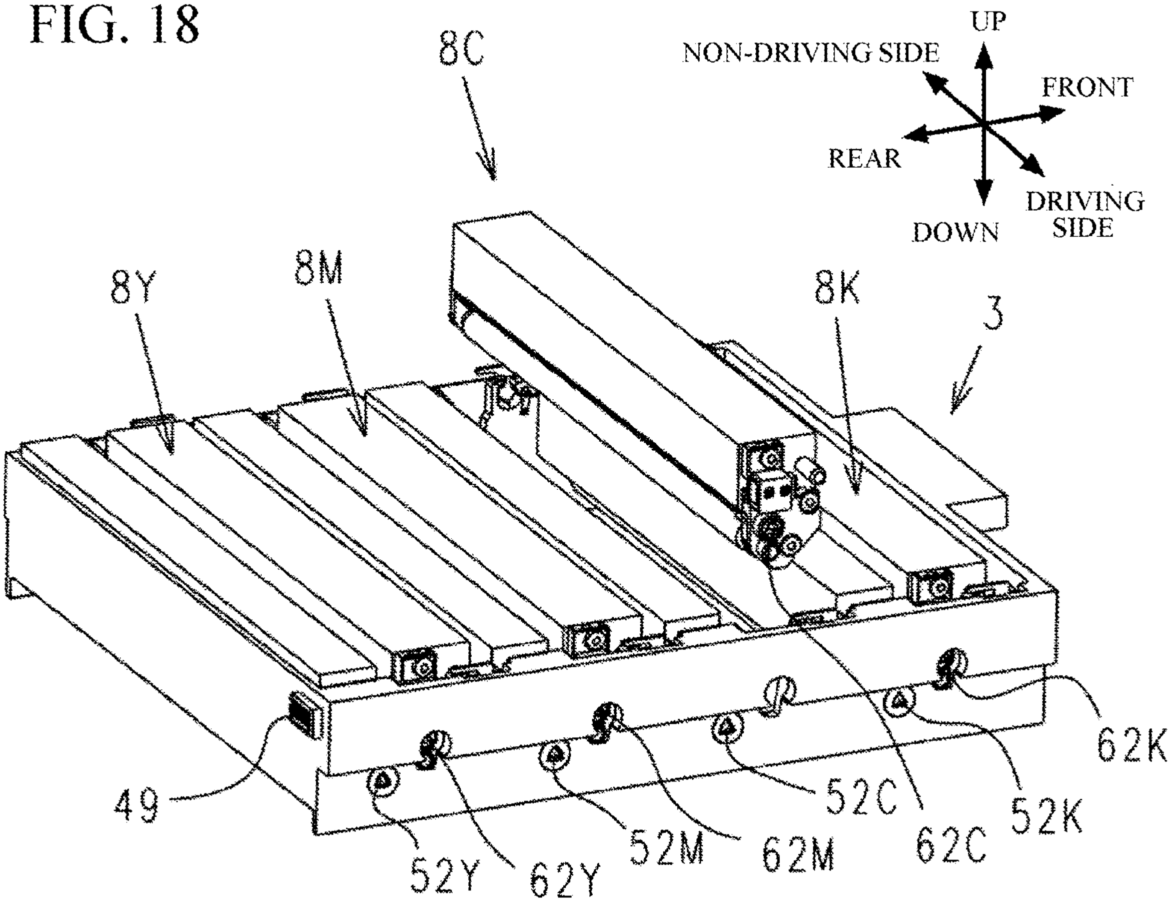
FIG. 18 is a perspective view of a cartridge tray and a developing cartridge of Embodiment 3.

The configuration of the image forming apparatus will be described. FIG. 1 is a schematic cross-sectional view of an image forming apparatus 1. FIGS. 2A and 2B are perspective views of the image forming apparatus 1, respectively. FIG. 18 is a perspective view of a cartridge tray 3 and a developing cartridge 8. Since the schematic diagrams of the image forming apparatus 1 illustrated in FIGS. 1 and 2 and the schematic cross-sectional views of the cartridge tray and the developing cartridge illustrated in FIG. 4 are common to the above-described embodiments, descriptions thereof will be omitted. Further, the perspective view of the cartridge tray and the developing cartridge illustrated in FIG. 18 is different in the position of the memory tag unit 80 when compared with FIG. 3, and in FIG. 18, it is not illustrated because it is on the opposite side of FIG. 3 in the tray insertion direction. Since the arrangement, functions, and reference numerals of other members are common, descriptions thereof will be omitted.

<<Image Forming Operation>>

Regarding the image forming operation, a series of operations in the present embodiment are common to the operations described in Embodiment 1 with reference to FIGS. 1 to 4.

<<Configuration of Cartridge Tray>>

Figure 19:
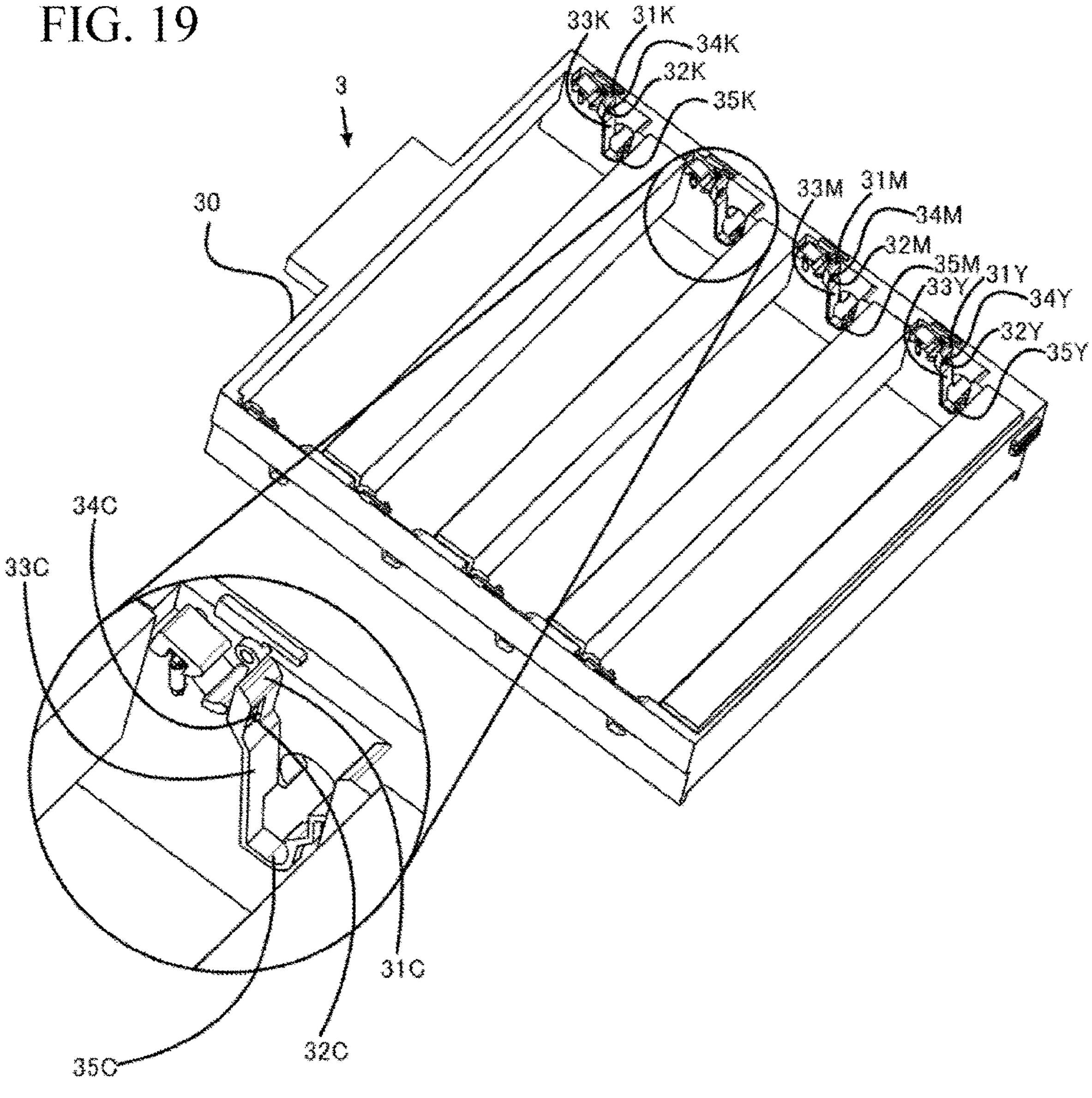
FIG. 19 is a view illustrating a positional relationship among a cartridge guide portion, a memory guide portion, and a memory unit support portion in Embodiment 3.
Figure 20A:
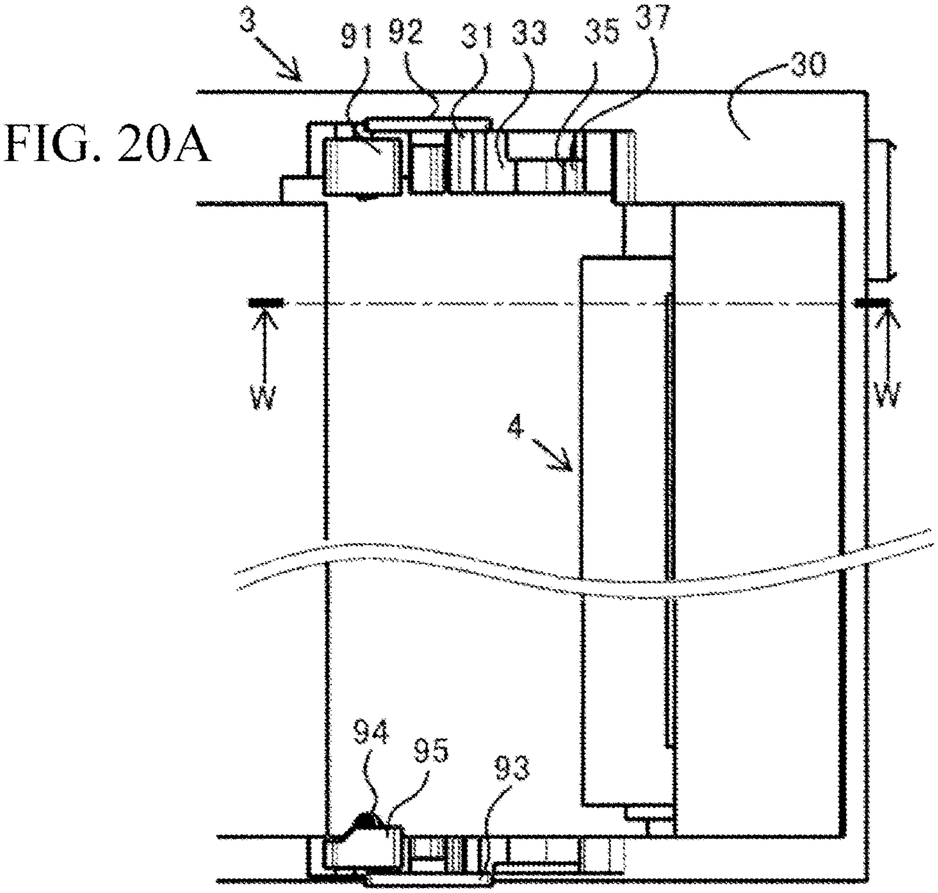
FIGS. 20A and 20B are a configuration diagram and a schematic cross-sectional view of the cartridge tray of Embodiment 3, respectively.
Figure 20B:
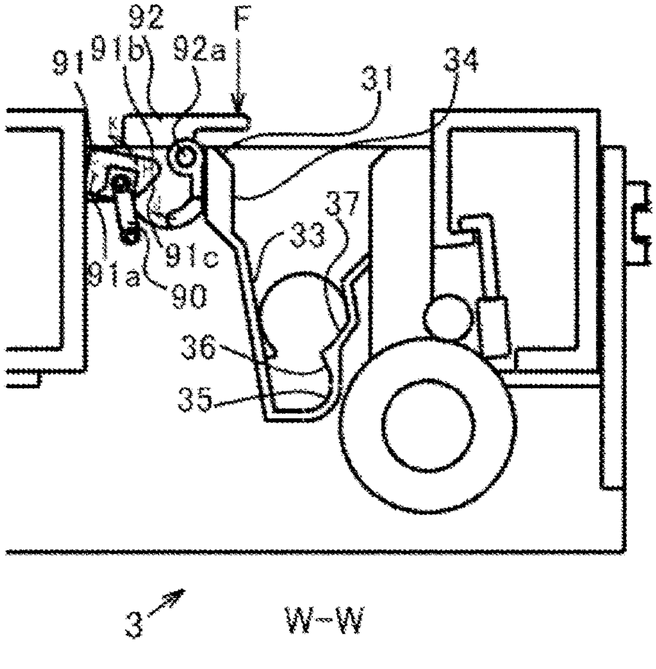
Figure 21A:
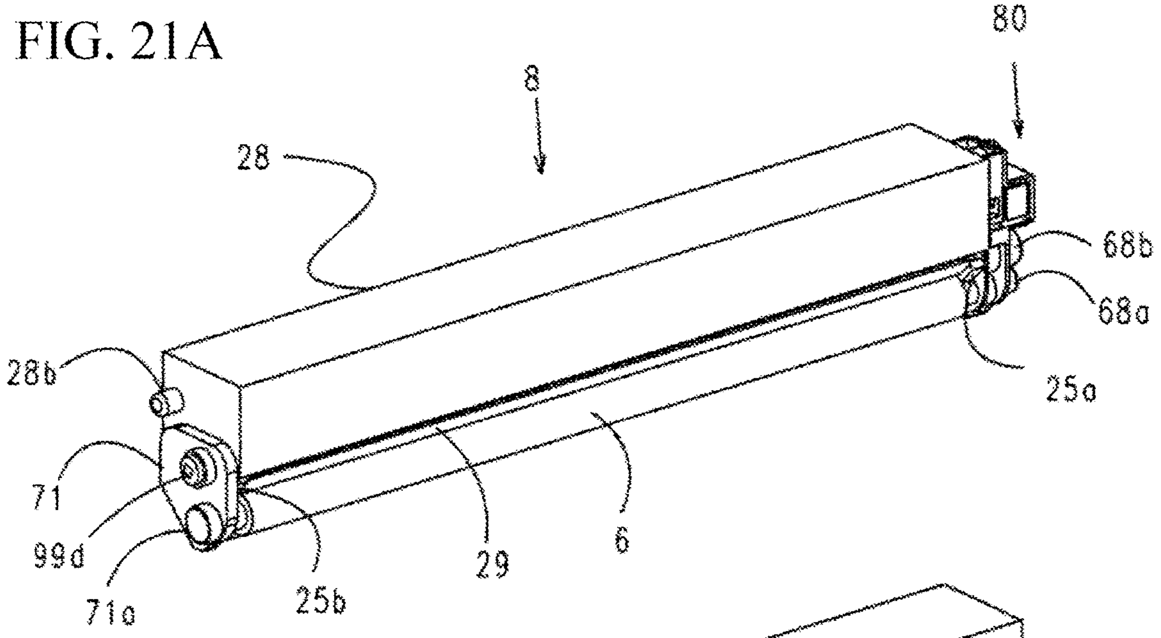
FIGS. 21A and 21B are perspective views seen from a developing cartridge non-driving side of Embodiment 3, respectively.
Figure 21B:
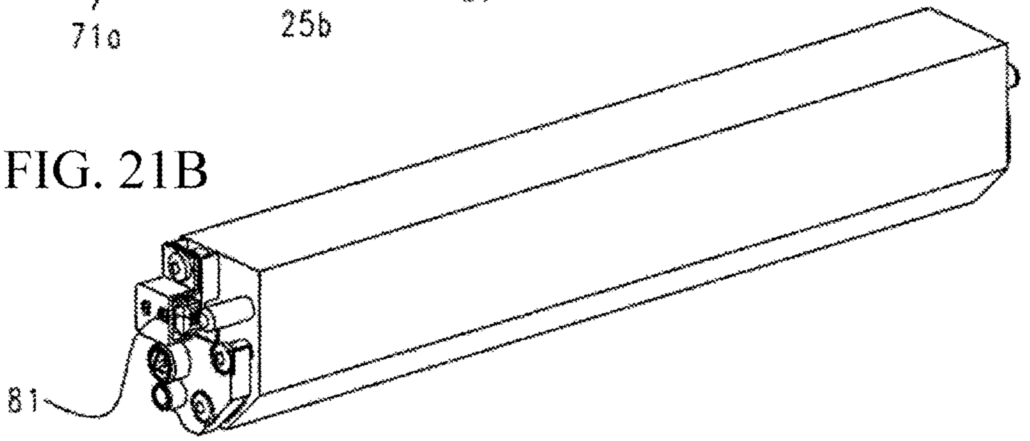
Figure 22A:
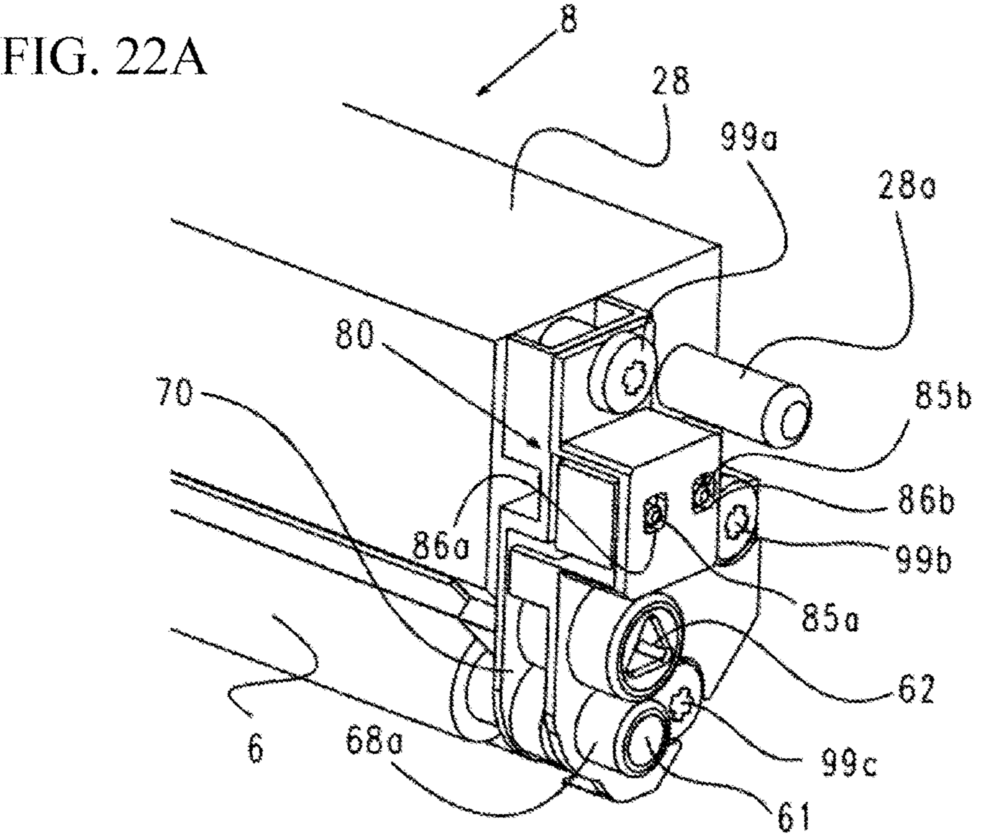
FIGS. 22A and 22B are a perspective view and a configuration diagram seen from a developing cartridge driving side of Embodiment 3.
Figure 22B:
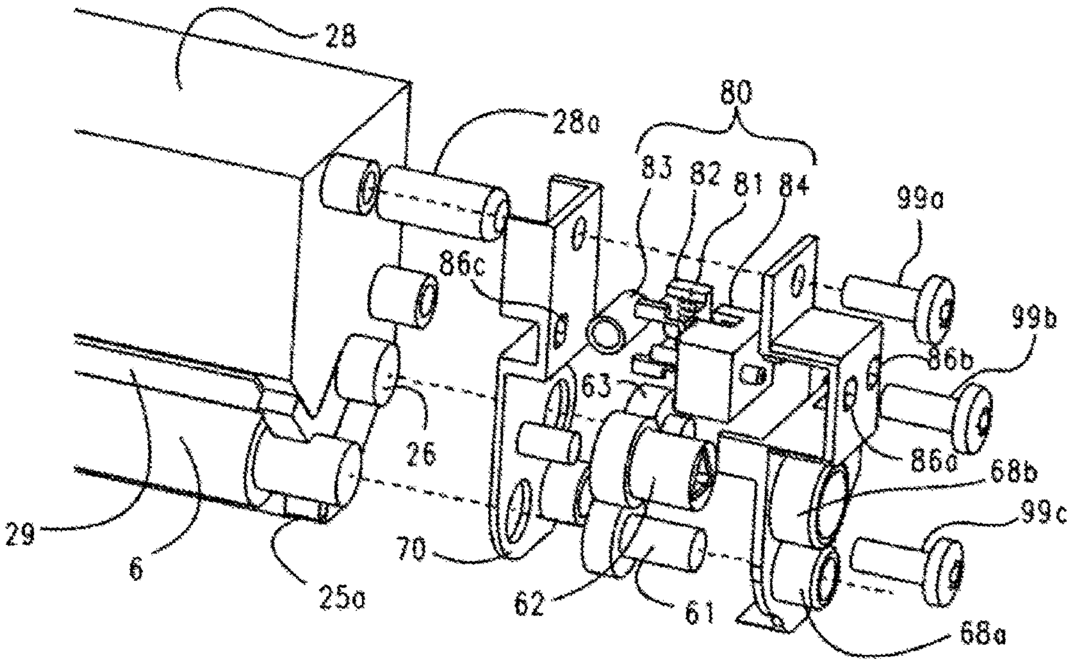

A detailed configuration of the cartridge tray 3 will be described with reference to FIGS. 4, 19, 20A, 20B, 21A, 21B, 22A, and 22B. FIG. 19 is a perspective view illustrating a positional relationship among a cartridge guide portion 33, a memory guide portion 31, and a memory unit support portion 34, and a part thereof is surrounded by a circular frame and enlarged. FIGS. 20A and 20B illustrate the cartridge tray 3 according to the present embodiment, respectively. FIG. 20A is a top view and FIG. 20B is a schematic cross-sectional view. FIGS. 21A and 21B are perspective views of the developing cartridge 8 according to the present embodiment, respectively. FIG. 21A is a perspective view when seen from the non-driving side and FIG. 21B is a perspective view when seen from the driving side. FIGS. 22A and 22B illustrate the driving side of the developing cartridge 8 according to the present embodiment. FIG. 22A is a perspective view and FIG. 22B is an exploded configuration diagram. As illustrated in FIGS. 4, 19, 20A, and 20B, a photosensitive drum 4 is attached to a cartridge tray frame 30 provided in the cartridge tray 3, so as to be rotatable about a rotational shaft extending in a first direction (arrow D direction).

(Mechanism Related to Image Formation)

A drum drive input coupling 54 for transmitting driving force to the photosensitive drum 4 is provided on the driving side of the photosensitive drum 4. The drum drive input coupling 54 is engaged with a drum drive coupling 52 of the image forming apparatus 1 (see FIG. 2B), and the driving force from the image forming apparatus 1 is transmitted to the photosensitive drum 4.

A charge roller 5 is rotatable about a rotational shaft extending in the first direction. The charge roller 5 is supported to the cartridge tray frame 30 so that the charge roller 5 comes into contact with the photosensitive drum 4 and is driven to rotate. The charge roller 5 is electrically connected to the image forming apparatus 1, so that the surface of the photosensitive drum 4 is uniformly charged to a certain polarity and potential. However, the charging means for charging the photosensitive drum 4 is not limited thereto.

Further, the cartridge tray frame 30 is provided with a cleaning blade 7 as a cleaning means and a cleaning frame 27. The cleaning blade 7 is fixed at a position which is in contact with the photosensitive drum 4, and removes the waste developer on the surface of the photosensitive drum 4 which remains untransferred during image formation. The cleaning frame 27 collects the removed waste developer.

(Mechanism Related to Guide and Fixing)

The cartridge tray frame 30 is provided with a guide member for guiding the developing cartridge 8 including the memory tag unit 80 until the developing cartridge 8 is in the mounted state at the mounting position. The guide member includes a portion which abuts on the memory tag unit 80 provided in the developing cartridge 8 or the cartridge side positioning portion and functions as a guide portion for assisting the mounting. The guide member also includes a portion which functions as a fixing portion (guide side positioning portion) for positioning and fixing the memory tag unit 80 or the cartridge side positioning portion. The cartridge tray 3 also has a developing pressure member 91 which functions as a rotation stopper or the like. It is noted that a part of the guide member may have both the guide function and the positioning function.

The guide members are arranged at both ends of the developing cartridge 8 in the longitudinal direction among the sides of the cartridge tray frame 30. As illustrated in FIGS. 24A to 24D, 19, 20A, and 20B, the cross-sectional shape of the guide member is substantially a U-shape including one side portion and the other side portion facing each other. As will be described below in detail, the memory tag unit 80 is supported between one side portion and the other side portion in the mounted state.

Each guide portion includes a member (cartridge guide portion 33, developing roller positioning guide portion 36, drive input guide portion 38) for guiding the developing roller cover positioning portion 68*a* and the developing roller bearing positioning portion 71*a* of the developing cartridge 8, and a second guide member (memory guide portion 31) for guiding the memory tag unit 80. The developing roller cover positioning portion 68*a* and the developing roller bearing positioning portion 71*a* are protrusion portions which protrude from the side wall of the cartridge in the first direction (longitudinal direction), as illustrated in FIGS. 21A, 21B, 22A, and 22B. It is noted that although FIGS. 21A, 21B, 22A, and 22B illustrate cylindrical protrusion portions, other shapes such as a polygonal column shape can be adopted as long as they can be guided by the guide portion and can be stably positioned.

However, which guide portion guides which part of the developing cartridge 8 or the memory tag unit 80 depends on an angle or a trajectory when the user inserts the developing cartridge. Therefore, a relationship between the guide portion and the guided portion is not limited to the fixed relationship. For example, the memory guide portion 31 may abut on a portion other than the memory tag unit 80.

Further, as each guide side positioning portion, there is a member (developing roller positioning portion 35, drive input positioning portion 37) for positioning and fixing the developing cartridge 8 or a member (memory unit support portion 34) for positioning and fixing the memory tag unit 80. It is noted that the drive input positioning portion 37 is also a guide portion for, when the developing cartridge 8 is mounted, abutting on the developing roller cover positioning portion 68*a* and guiding to the developing roller positioning portion 35.

Although details will be described below, in the guide member of the embodiment, the guide portion for guiding the mounting of the developing cartridge 8 and the guide side positioning portion for positioning and supporting the memory tag unit are provided at substantially the same position in the longitudinal direction. The state in which the guide portion and the guide side positioning portion are substantially at the same position in the longitudinal direction means a state in which the guide portion and the guide side positioning portion have substantially the same width in the longitudinal direction and both are substantially superimposed. However, the effect can be obtained when the guide portion and the guide side positioning portion are provided so that at least part thereof is superimposed in the direction orthogonal to the longitudinal direction. Further, in the embodiment, each guide portion and each guide side positioning portion provided on the side of the cartridge tray frame 30 have a longitudinal size that fits within the width of the side in the longitudinal direction.

The surface of the developing roller positioning portion 35 is fixed and positioned while abutting on the developing cartridge 8 in the mounted state. In the embodiment, the developing roller positioning portions 35 are provided on both the driving side and the non-driving side of the cartridge tray 3. It is necessary to provide the guide side positioning portion in at least one end portion. Although the W-W cross-section of FIGS. 20A and 20B illustrates the developing roller positioning portion 35 on the driving side, the non-driving side is also provided at a symmetrical position (not illustrated).

The developing cartridge 8 is inserted into the cartridge tray 3. The developing roller cover positioning portion 68*a* and the developing roller bearing positioning portion 71*a*, which are arranged coaxially with the developing roller 6 of the developing cartridge 8 illustrated in FIGS. 21A, 21B, 22A, and 22B, abut against the developing roller positioning portion 35. Due to this, the developing cartridge 8 is positioned.

The developing pressure member 91, which is a pressure member, functions to determine the rotation when the mounting of the developing cartridge 8 is completed. The developing pressure member 91 is provided on both the driving side and the non-driving side of the cartridge tray 3. Although the W-W cross-section of FIGS. 20A and 20B illustrates the developing pressure member 91 on the driving side, the non-driving side is also provided at a symmetrical position. The developing pressure member 91 is supported to the cartridge tray frame 30 so as to be rotatable about a pressure member rotation center 91*a* which is a longitudinal axis. When the developing cartridge 8 is not mounted, the developing pressure member 91 is pulled by a developing pressure spring 90 in an arrow H direction and is fixed while abutting on the cartridge tray frame 30. The developing pressure spring 90 is provided with, at both ends, with engaging portions which are engaged with bosses protruding outward in the longitudinal direction of the developing roller 6. The protruding bosses are pulled inward by the engaging portions at both ends, and counterclockwise rotational force is applied to the developing pressure member 91 in the drawing.

The developing pressure member 91 has a rotation stopper boss guide portion 91*b*. When the developing cartridge 8 is mounted, the rotation stopper boss guide portion 91*b* guides the mounting of developing rotation stopper bosses 28*a* and 28*b* provided in the developing cartridge 8. Further, the developing pressure member 91 has a cartridge pressure portion 91*c* for, when the mounting of the developing cartridge 8 is completed, stably positioning the developing roller cover positioning portion 68*a* and the developing roller bearing positioning portion 71*a* on the developing roller positioning portion 35.

For example, when the developing cartridge 8C is the first developing cartridge, the guide member corresponding to the first developing cartridge is the first guide member. Further, when the developing cartridge 8K adjacent thereto is the second developing cartridge, the guide member corresponding to the second developing cartridge is the second guide member. The developing pressure member 91C is the first pressure member, and the developing pressure member 91K is the second pressure member. At this time, with the configuration of the present embodiment, even when the developing pressure member 91C rotates in an arrow K direction or an arrow H direction, the developing pressure member 91C rotates in a space provided in the cartridge tray frame 30. Thus, the developing pressure member 91C does not come into contact with the second guide member.

It is noted that, in the embodiment, the memory tag unit 80 and the drive input cover positioning portion 68*b* do not exist on the non-driving side of the developing cartridge 8 as illustrated in FIGS. 21A, 21B, 22A, and 22B. Therefore, the guide portion of the cartridge tray frame 30 on the non-driving side may have a shape different from that on the driving side because it is sufficient to position the developing roller bearing positioning portion 71*a* on the developing roller positioning portion 35.

The cartridge guide portion 33 (33Y, 33M, 33C, 33K) and the developing roller positioning guide portion 36 illustrated in FIGS. 19, 20A, and 20B are guide portions for, when the developing cartridge 8 is mounted, abutting on the developing roller cover positioning portion 68*a* and guiding to the developing roller positioning portion 35.

The drive input positioning portion 37 is a mounting guide for, when the developing cartridge 8 is mounted, abutting on the developing roller cover positioning portion 68*a* and guiding to the developing roller positioning portion 35. Further, when the mounting is completed, the drive input positioning portion 37 is positioned while abutting on the drive input cover positioning portion 68*b*. That is, the drive input positioning portion 37 has a function as a guide portion and a function as a guide side positioning portion.

In the mounted state, the developing roller cover positioning portion 68*a* is pressurized and fixed to the developing roller positioning portion 35 by the developing pressure member 91. Similarly, the drive input cover positioning portion 68*b* is fixed to the drive input positioning portion 37. Therefore, the developing cartridge 8 is stably positioned by the developing roller positioning portion 35 and the drive input positioning portion 37 as the guide side positioning portion and the developing pressure member 91.

The drive input guide portion 38 is a mounting guide for, when the developing cartridge 8 is mounted, abutting on the developing roller cover positioning portion 68*a* and guiding to the developing roller positioning portion 35. The drive input guide portion 38 is also a mounting guide for abutting on the drive input cover positioning portion 68*b* and guiding to the drive input positioning portion 37.

When the developing cartridge 8 is mounted, the memory guide portion 31 and the memory unit support portion 34 abut on the developing roller cover positioning portion 68*a* and guide to the developing roller positioning portion 35. Further, the memory guide portion 31 and the memory unit support portion 34 are mounting guides for abutting on the drive input cover positioning portion 68*b* and guiding to the drive input positioning portion 37. Therefore, these members function not only as the memory guide portion or the memory positioning portion but also as the guide portion of the developing cartridge 8 itself. Where each portion of the developing cartridge 8 abuts on each guide portion or each guide side positioning portion at the time of mounting depends on the attitude of the developing cartridge 8 at the time of mounting. However, according to the configuration of the embodiment, the developing cartridge 8 is guided to the downstream portion in the mounting direction while abutting on any portion of the guide member and is finally positioned on an appropriate surface.

Further, the memory unit support portion 34 stably positions the electrical contact portion of the memory tag 81 provided in the memory tag unit 80 with respect to the tray side contact portion 32. Further, the memory guide portion

31 is a mounting guide for guiding the memory tag unit 80 to the memory unit support portion 34.

With this configuration, when the developing cartridge 8 is mounted, the memory tag unit 80 is guided by the memory guide portion 31 which is a guide portion provided in the cartridge tray 3. The electrical contact portion of the memory tag 81 is guided to a position which can come into contact with the tray side contact portion 32. The memory tag unit 80 is positioned by the memory unit support portion 34, so that stable electrical connection is made.

<<Configuration of Developer Cartridge>>

The developing cartridge 8 will be described with reference to FIGS. 4, 21A, 21B, 22A, 22B, and 23. The developing cartridge 8 is roughly provided with a developer storage frame 28, a developing roller 6, an end sealing member 25, a stirring roller 26, a developer regulation blade 29, a cartridge bearing (driving side) 70, a cartridge bearing (non-driving side) 71, a cartridge side cover 68, a developing roller gear 61, a drive input coupling gear 62, a stirring roller gear 63, and a memory tag unit 80.

(Configuration Related to Development and Driving)

The developer storage frame 28 is a housing which can store the developer and supplies the developer to the developing roller 6. The stirring roller 26 has a function of stirring the developer of the developer storage frame 28 and applying the developer to the developing roller 6. The developing roller 6 and the stirring roller 26 are rollers which are rotatable about the rotational shaft extending in the first direction and each include a roller main body and a roller shaft. As a material for the roller main body, for example, an elastic rubber or a sponge member is used. As a material for the roller shaft, a metal or a resin having conductivity is used.

As illustrated in FIGS. 21A, 21B, and 22A, the developing roller 6 and the stirring roller 26 are rotatably supported by the cartridge bearing (driving side) 70 and the cartridge bearing (non-driving side) 71. The cartridge bearing (driving side) 70 is fixed to the developer storage frame 28 together with the cartridge side cover 68 by screws 99*a* and 99*c*.

The cartridge bearing (non-driving side) 71 is fixed to the developer storage frame 28 by a screw 99*d*. As illustrated in FIG. 22B, the roller shafts of the developing roller 6 and the stirring roller 26 pass through the cartridge bearing (driving side) 70, and the roller shafts are connected to the developing roller gear 61 and the stirring roller gear 63. The developing roller gear 61 transmits the driving force from the main body to the developing roller 6, and the stirring roller gear 63 transmits the driving force from the main body to the stirring roller 26.

The drive input coupling gear 62 as a drive input unit is a gear which is rotatably supported to the cartridge bearing (driving side) 70 and the cartridge side cover 68. The drive input coupling gear 62 has an engagement coupling portion for receiving the driving force from the main body, and transmits the driving force from the main body to the developing roller gear 61 and the stirring roller gear 63. The shape of the engagement coupling may be any shape as long as the driving force can be transmitted. The developing cartridge side has a triangular concave hole. The shape of the engagement coupling portion on the one main body side has a convex triangular rib corresponding to the triangular concave shape.

The developer regulation blade 29 is a blade which abuts on the developing roller 6 and regulates the thickness of the developer carried on the developing roller 6. The developer regulation blade 29 is fixed to the developer storage frame 28 by a screw or the like, and controls the abutting angle with the developing roller 6 or the amount of intrusion to constantly regulate the thickness of the developer on the developing roller. As a material for the developer regulation blade 29, a SUS plate or a rubber material is generally used. The cartridge side cover 68 rotatably supports one end of each of the developing roller gear 61 and the drive input coupling gear 62.

(Configuration Related to Guide and Fixing)

Further, the cartridge side cover 68 has a cartridge side positioning portion (developing roller cover positioning portion 68*a* and drive input cover positioning portion 68*b*). When the developing cartridge 8 is mounted on the cartridge tray 3, the cartridge side positioning portion (developing roller cover positioning portion 68*a* and drive input cover positioning portion 68*b*) slidably abuts on guide portions (memory guide portion 31, cartridge guide portion 33, developing roller positioning guide portion 36, drive input guide portion 38) and fixing portions (memory unit support portion 34, developing roller positioning portion 35, drive input positioning portion 37) provided in the cartridge tray 3. The developing roller cover positioning portion 68*a* is coaxial with the developing roller 6 and the developing roller gear 61 and has a cylindrical shape. The drive input cover positioning portion 68*b* is coaxial with the drive input coupling gear 62 and has a cylindrical shape. As can be seen from FIGS. 22A and 22B, the end portion (outermost shell portion) of the pressure spring receiving member 84 in the first direction (longitudinal direction) is arranged outside the developing roller cover positioning portion 68*a* which is the protrusion portion. In other words, it is possible to obtain the effect that can make the developing cartridge 8 larger than in the case in which the memory tag unit 80 is arranged inside the developing roller cover positioning portion 68*a* in the longitudinal direction. That is, the developer storage frame 28 can form a space for storing a larger amount of toner.

As described above, after the developing cartridge 8 is mounted on the cartridge tray 3, the developing cartridge 8 is positioned and fixed by the developing roller cover positioning portion 68*a*, the drive input cover positioning portion 68*b*, and the development rotation stopper boss (driving side) 28*a* provided in the developer storage frame 28.

As illustrated in FIGS. 21A and 21B, on the non-driving side, the developing cartridge 8 is completely mounted by slidably abutting on the cartridge guide provided in the cartridge tray 3 by the cartridge bearing (non-driving side) 71 and the developing rotation stopper boss (non-driving side) 28*b* of the developer storage frame 28. Similar to the driving side, each boss has a cylindrical shape and is thus smoothly guided. The developing roller bearing positioning portion 71*a* is coaxial with the developing roller 6 and is arranged coaxially with the developing roller gear 61 and the developing roller cover positioning portion 68*a* on the driving side. The developing rotation stopper boss (non-driving side) 28*b* is coaxial with the developing rotation stopper boss (driving side) 28*a*.

(Configuration Related to Memory)

Figure 23:
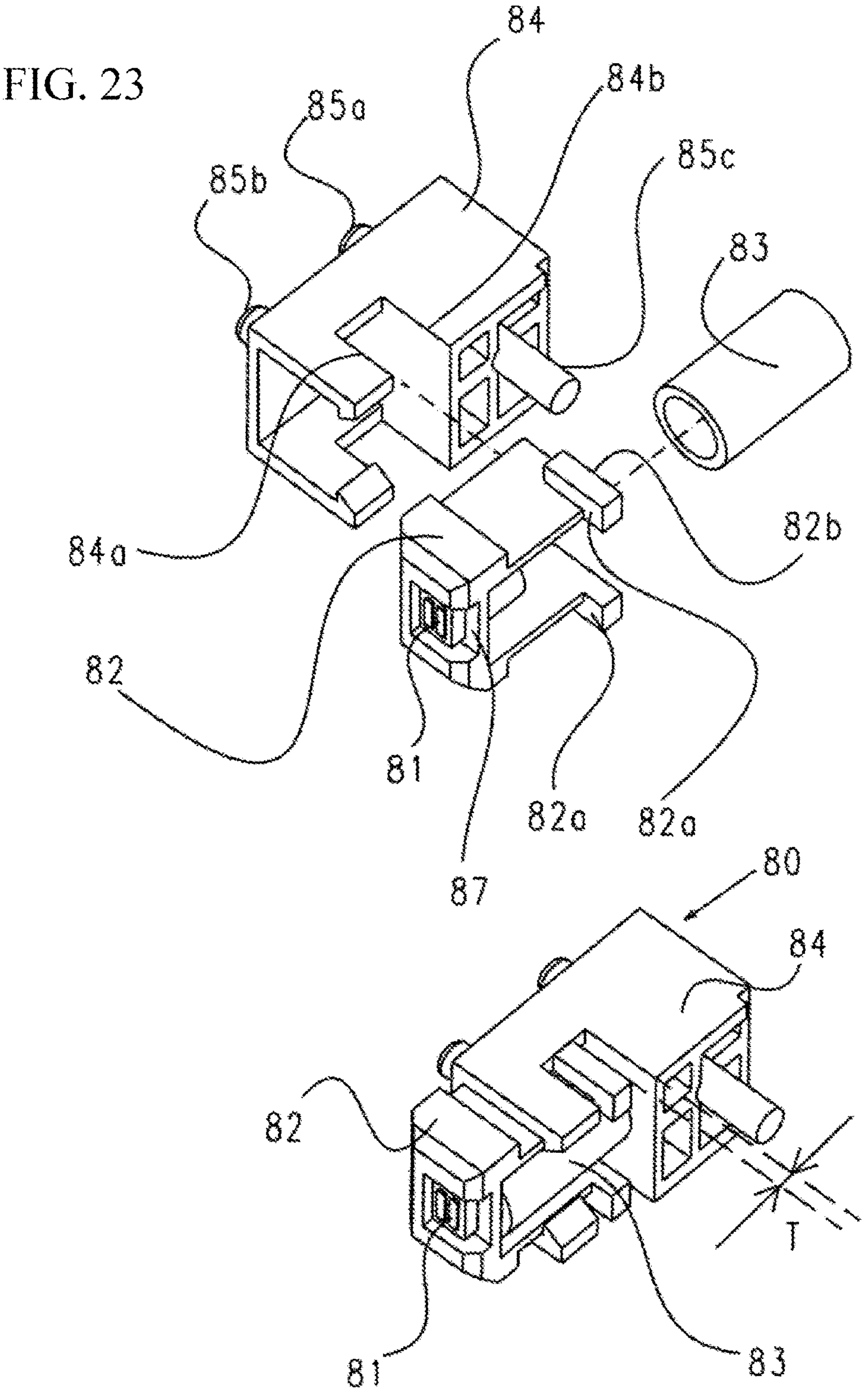
FIG. 23 is a configuration diagram of a memory tag unit of the developing cartridge of Embodiment 3.

FIG. 23 is a configuration diagram of the memory tag unit 80 of the developing cartridge 8 according to the present embodiment. The memory tag unit 80 includes a memory tag 81, a memory tag pressing member 82, a memory tag pressure spring 83, and a pressure spring receiving member 84. The memory tag pressing member 82 functions as a memory holding member which holds the memory tag 81. The pressure spring receiving member 84 functions as a moving member which is movable relative to the memory tag pressing member 82 (memory holding member). The pressure spring receiving member 84 (moving member) is allowed to move within a certain range in a direction substantially parallel to the pressing direction in which the memory tag 81 is pressurized against the tray side contact portion 32. The memory tag pressing member 82 has a memory installation groove 87 for installing and fixing the memory tag 81. The memory tag 81 is fixed by an arbitrary method such as adhesive, a double-sided tape, or thermal caulking. As illustrated in FIG. 23, the memory tag pressing member 82, the memory tag pressure spring 83, and the pressure spring receiving member 84 are configured as an integrated unit. Further, the memory tag pressing member 82 and the memory tag pressure spring 83 are relatively movable in the substantially third direction.

The memory tag pressure spring 83 is a compression spring as an elastic member. The memory tag pressure spring 83 abuts on each of the spring receiving surface (not illustrated) of the memory tag pressing member 82 and the spring receiving surface (not illustrated) of the pressure spring receiving member 84 and is in a compressed state from a natural state. Therefore, the memory tag pressure spring 83 generates biasing force to the memory tag pressing member 82 and the pressure spring receiving member 84 in the direction in which the compression is released. Due to the spring force of the memory tag pressure spring 83, the front regulation portion 82a (spring receiving member regulation member) of the memory tag pressing member 82 and the spring receiving member regulated portion 84a of the pressure spring receiving member 84 abut on each other, and the memory tag unit is held as an integrated unit. Further, the memory tag unit 80 can further expand and contract in the compression direction of the memory tag pressure spring 83 as compared with the assembled state of FIG. 23. That is, it is possible to compress to the position at which the rear regulation portion 82b of the memory tag pressing member 82 and the spring receiving member regulated portion 84d of the pressure spring receiving member 84 abut on each other. However, depending on the shape of the compression spring, the rear regulation portion 82b and the spring receiving member regulated portion 84d cannot be compressed to a position at which they abut on each other. Further, a gap T is defined between the rear regulation portion 82b and the spring receiving member regulated portion 84d, that is, a certain range in which the memory tag pressing member 82 is movable with respect to the pressure spring receiving member 84. In particular, a gap Ta is defined between the rear regulation portion 82b and the spring receiving member regulated portion 84d when the front regulation portion 82a and the spring receiving member regulated portion 84a abut on each other. That is, the gap T can take a value between Ta T 0.

The pressure spring receiving member 84 has an attitude regulation boss 85 (85a, 85b, 85c). When the memory tag unit 80 is assembled with the developing cartridge 8 as illustrated in FIGS. 22A and 22B, the memory tag unit 80 is assembled to be sandwiched between the cartridge bearing (driving side) 70 and the cartridge side cover 68 in the longitudinal direction, and the movement in the first direction which is the longitudinal direction is regulated. At this time, the attitude regulation bosses 85a and 85b are fitted to the attitude regulation holes 86a and 86b of the cartridge side cover 68, and the attitude regulation boss 85c is fitted to the attitude regulation hole 86c of the cartridge bearing (driving side) 70.

The hole diameter of the attitude regulation hole 86 is set to be larger than the boss diameter of the attitude regulation boss 85. For example, in the case of a cylinder having a boss diameter of φ3 mm and a hole diameter of φ8 mm, the cylindrical boss has a gap of φ5 mm and can be moved. Due to this, the memory tag unit 80 regulates the movement in the second direction and the third direction by the attitude regulation boss 85 (85a, 85b, 85c) and the attitude regulation hole 86 (86a, 86b, 86c) with a certain degree of clearance.

Further, the method of making the gap in the first, second, and third directions which regulates the movement of the memory tag unit 80 or the relationship between the attitude regulation boss 85 and the attitude regulation hole 86 may be adjusted so that the engagement between the cartridge tray 3 and the memory tag unit 80, which will be described below, can be operated smoothly. The method of making the gap in the third direction which regulates the movement of the memory tag unit 80 or the relationship between the attitude regulation boss 85 and the attitude regulation hole 86 will be described below.

Further, the memory tag unit 80 is configured to regulate the positions in the first, second, and third directions by the cartridge bearing (driving side) 70 and the cartridge side cover 68 with a certain degree of clearance. However, the configuration of the present embodiment is not limited as long as the memory tag unit is movable in an arbitrary direction in the developing cartridge state. Further, although the memory tag unit 80 is configured on the driving side of the developing cartridge 8 in the present embodiment, the memory tag unit 80 may be configured on the non-driving side.

<<Developing Cartridge Mounting Operation>>

The operation of mounting the developing cartridge 8 on the cartridge tray 3 will be described. FIGS. 24A to 24D are schematic cross-sectional views illustrating the behavior when the developing cartridge 8 is mounted on the cartridge tray 3 according to the present embodiment, and are schematic cross-sectional views of the side surfaces of the developing cartridge 8 on the driving side and the corresponding cartridge tray 3.

Figure 24A:
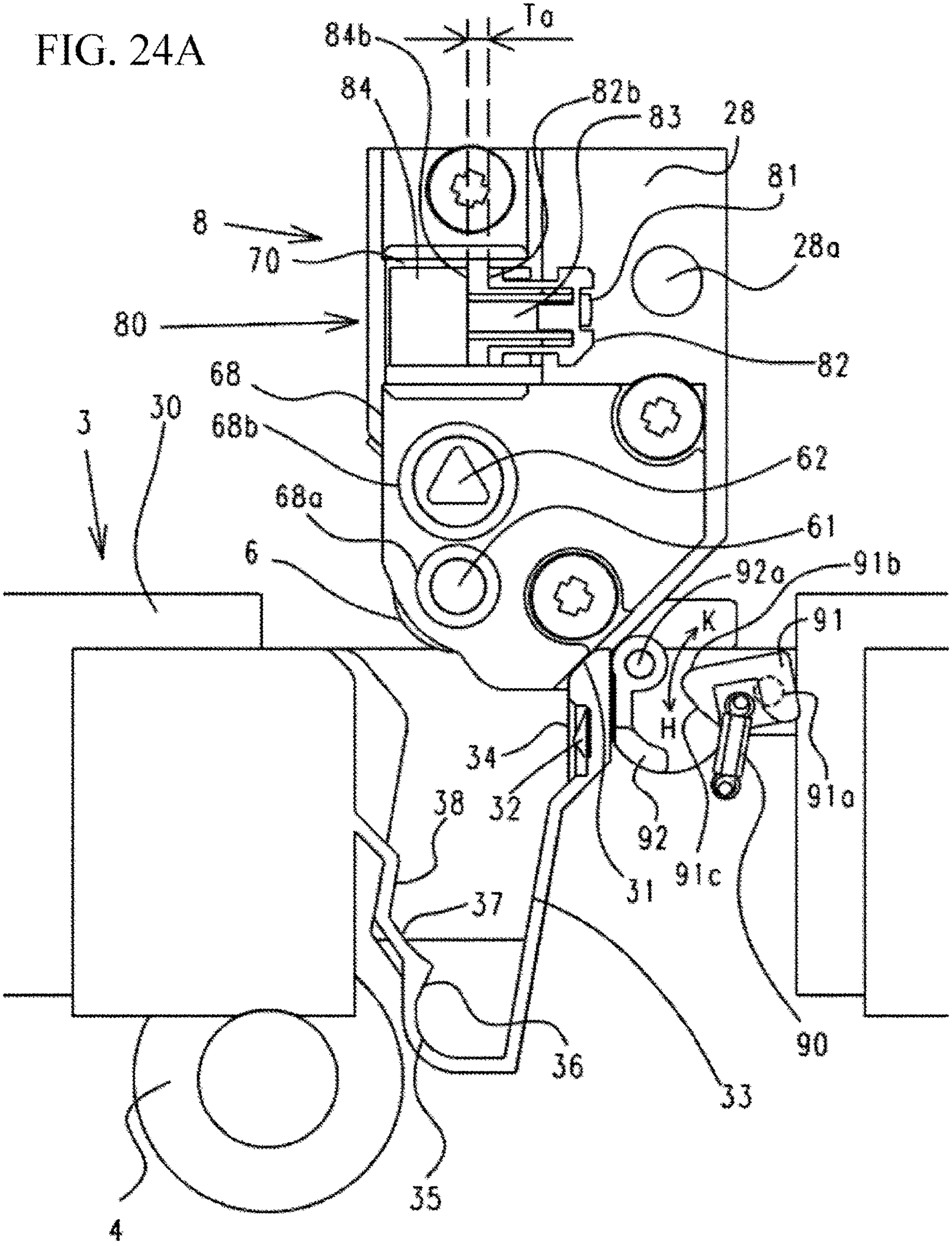
FIG. 24A is a schematic cross-sectional view illustrating a state before the developing cartridge of Embodiment 3 is mounted.

FIG. 24A is a schematic cross-sectional view immediately before the developing cartridge 8 is inserted into an arbitrary slot of the cartridge tray 3. At this time, the cartridge tray 3 is the same as the state in which the developing cartridge 8 is not provided (see the W-W cross-sectional view of FIGS. 20A and 20B). The developing pressure member 91 is pulled by the developing pressure spring 90 and its position is regulated by the cartridge tray 3. Further, the developing cartridge 8 is the same as in FIGS. 21A, 21B, and 22A. At this time, the position of the memory tag unit 80 is regulated within the clearance ranges of the attitude regulation hole 86 (86a, 86b, 86c) of the developing cartridge 8 and the attitude regulation boss 85 (85a, 85b, 85c) of the memory tag unit 80.

Figure 24B:
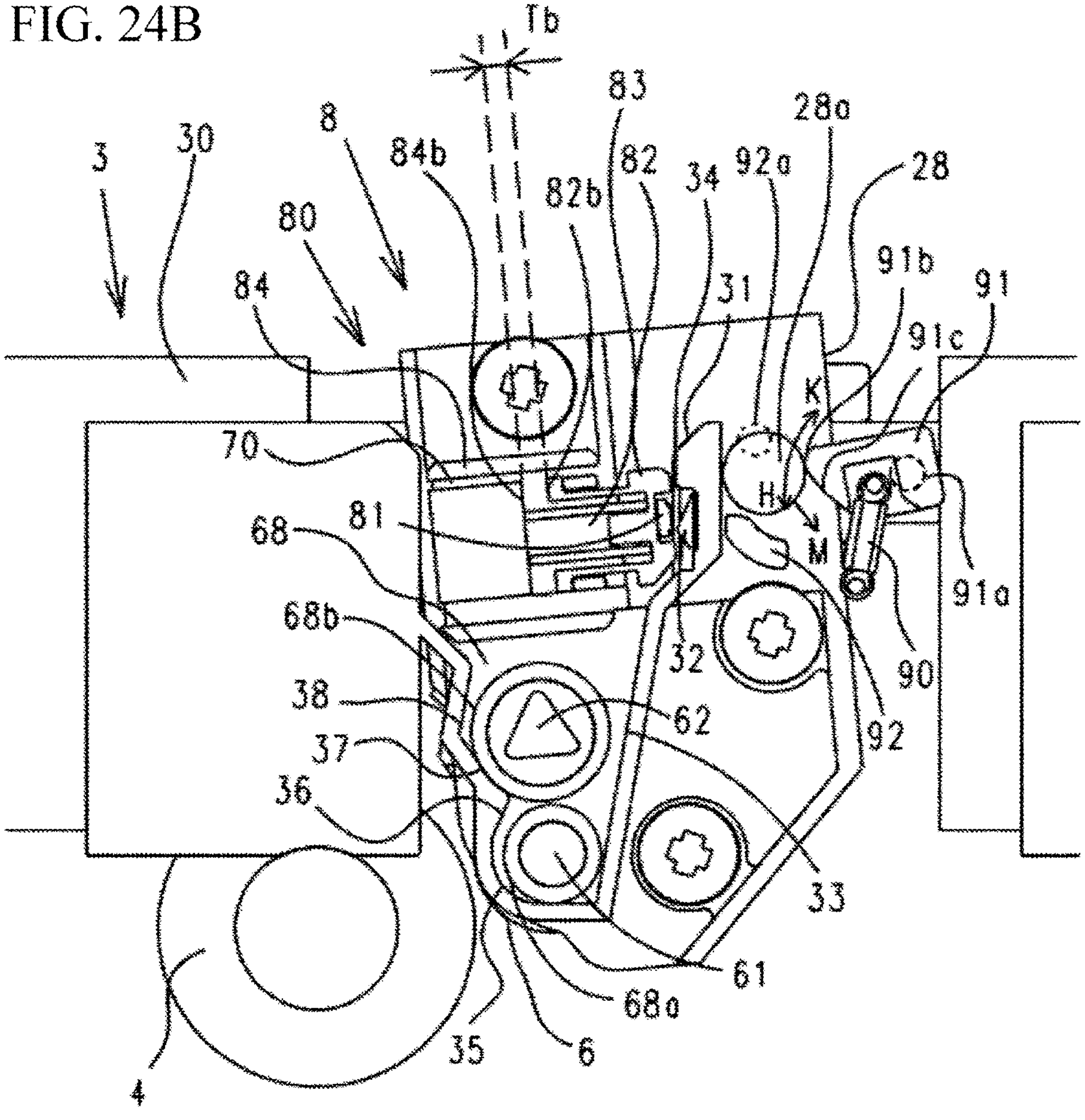
FIG. 24B is a schematic cross-sectional view illustrating a state when the developing cartridge of Embodiment 3 is being mounted.

FIG. 24B is a schematic cross-sectional view of the developing cartridge 8 in which the developing cartridge 8 is mounted on the cartridge tray 3 and is in the insertion position with respect to the cartridge tray 3. When the state becomes the mounting state of FIG. 24B from FIG. 24A, the drive input cover positioning portion 68b of the developing cartridge 8 is guided to the drive input positioning portion 37 of the cartridge tray 3. In that case, each guide portion (memory guide portion 31, cartridge guide portion 33, drive input guide portion 38) of the cartridge tray 3 functions as a guide portion up to the drive input positioning portion 37 of the cartridge tray 3. At this time, the developing rotation determination boss (driving side) 28a of the cartridge tray 3 abuts on the rotation stopper boss guide portion 91*b* of the developing pressure member 91, and its position is determined.

It is noted that the mounting attitude or the insertion trajectory of the developing cartridge 8 is different according to each user's gripping angle or inserting operation of the developing cartridge 8. Therefore, each portion of the guide member of the cartridge tray 3 (memory guide portion 31, cartridge guide portion 33, drive input guide portion 38) can guide the developing roller cover positioning portion 68*a* to the developing roller positioning portion 35. Further, each of these portions can guide the drive input cover positioning portion 68*b* to the drive input positioning portion 37. However, the developing cartridge 8 is smoothly guided by each guide portion regardless of the mounting attitude.

Figure 24C:
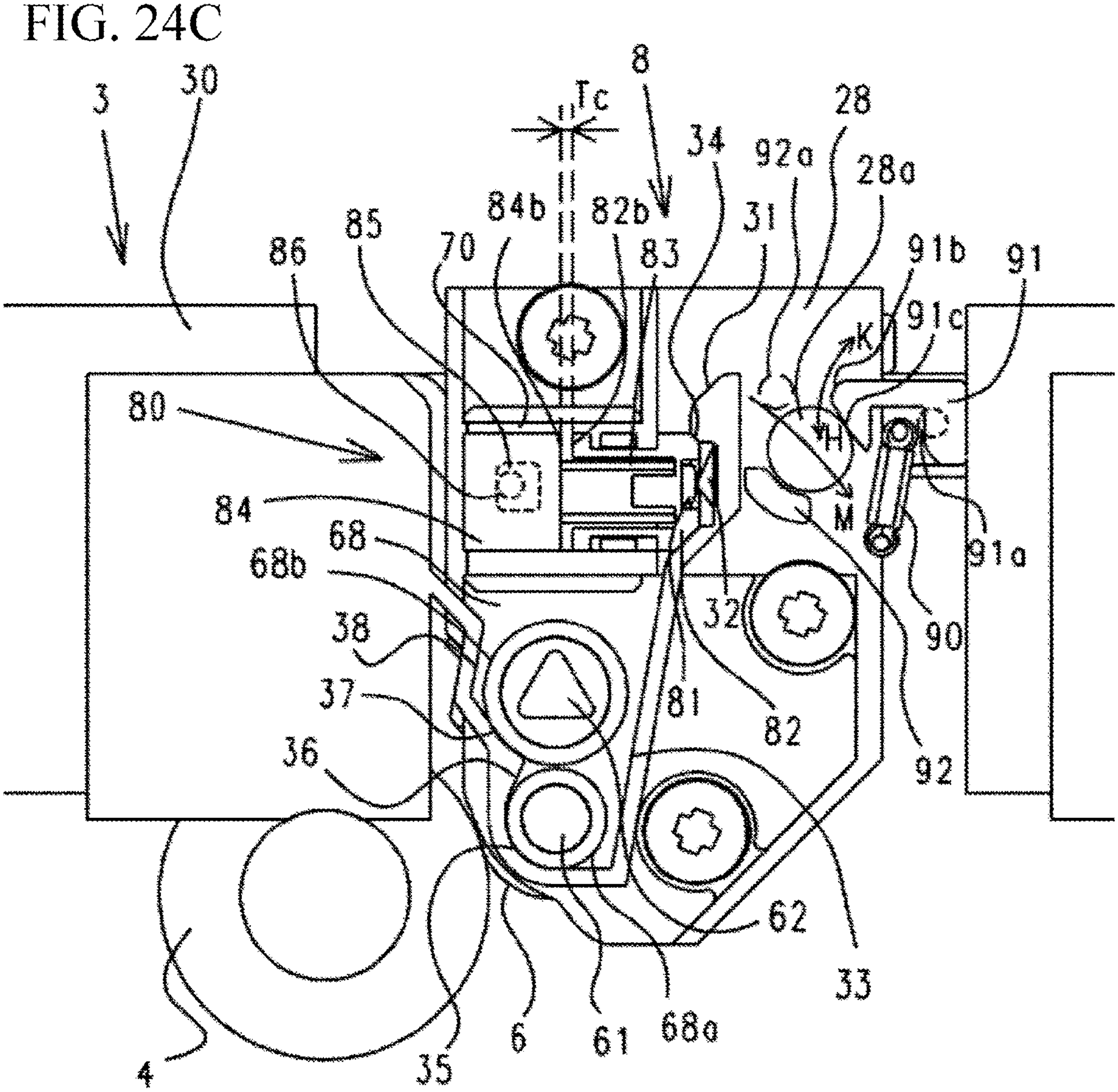
FIG. 24C is a schematic cross-sectional view illustrating a state in which the developing cartridge of Embodiment 3 is completely mounted.

FIG. 24C is a schematic cross-sectional view illustrating a state in which the developing cartridge 8 is mounted on the cartridge tray 3 and the developing roller 6 is in a first mounting position at which the developing roller 6 abuts on the photosensitive drum, that is, when the mounting of the developing cartridge 8 on the cartridge tray 3 is completed. At this time, the developing roller cover positioning portion 68*a* and the drive input cover positioning portion 68*b* of the developing cartridge 8 abut on the developing roller positioning portion 35 and the drive input positioning portion 37 of the cartridge tray 3, respectively. As such, the cartridge side positioning portion provided in the developing cartridge 8 is smoothly guided to the abutting surface of the guide side positioning portion. Further, as described above, since the memory guide portion 31 and the memory unit support portion 34 serves as both the guide portion of the developing cartridge 8 and the positioning portion for the memory tag unit 80, the space can be saved as compared with the case in which they are provided separately.

It is noted that, when the developing cartridge 8 is mounted, the developing rotation stopper boss 28*a* first abuts on the rotation stopper boss guide portion 91*b* provided in the developing pressure member 91 of the cartridge tray 3. Subsequently, the developing cartridge 8 is moved in the arrow M direction which is the developing cartridge mounting direction. As the mounting of the developing cartridge 8 is in progress, the developing rotation stopper boss 28*a* rotates the developing pressure member 91 about the pressure member rotation center 91*a* in the arrow K direction, so that the developing pressure member 91 abuts on the cartridge pressure portion 91*c* and becomes the mounting state of FIG. 24C. In the mounted state, the developing rotation stopper boss 28*a* is pressurized in the arrow H direction by the spring force of the developing pressure spring 90. Therefore, since the developing cartridge 8 is pressurized in the arrow H direction, the developing roller cover positioning portion 68*a* and the drive input cover positioning portion 68*b* are stably positioned by the developing roller positioning portion 35 and the drive input positioning portion 37 of the guide member. As a result, the developing roller 6 and the photosensitive drum 4 abut on each other and the image can be formed. It is noted that, in the state of FIG. 24C, the developing rotation stopper boss 28*a* has a gap without abutting on the separation member 92.

Further, in the state of FIG. 24C, the developing cartridge 8 is moved in the arrow M direction. Therefore, the attitude regulation boss 85 of the pressure spring receiving member 84 and the attitude regulation hole 86 of the cartridge side cover 68 abut on each other, and the memory tag 81 is pressurized toward the tray side contact portion 32 by the spring force of the memory tag pressure spring 83 (see FIG. 24C). Further, the position of the memory tag pressing member 82 for fixing the memory tag 81 is regulated by the memory unit support portion 34 provided to include the tray side contact portion 32 of the cartridge guide portion 33.

That is, although the memory tag unit 80 has a clearance with respect to the developing cartridge 8, the memory unit support portion 34 and the memory tag pressing member 82 abut on each other, and the attitude regulation boss 85 and the attitude regulation hole 86 abut on each other. Due to this, the memory tag unit 80 is fitted to the memory unit support portion 34, the memory tag pressure spring 83 is compressed, and a gap Tc (Ta>Tc) is formed between the rear regulation portion 82*b* and the spring receiving member regulated portion 84*d*. Therefore, the movement of the memory tag unit 80 in the second direction and the third direction is regulated. It is noted that, in the longitudinal direction which is the first direction, since the memory tag pressing member 82 is fitted to the memory unit support portion 34, the movement of the memory tag unit 80 is regulated. With the above configuration, the electrical contact portion of the memory tag 81 is abutted and fixed to the tray side contact portion 32. The contact pressure of the contact portion of the memory tag 81 may be a pressure which allows stable positioning and may be determined by the shape of the memory unit support portion 34 or the memory tag pressing member 82 provided on the tray side contact portion 32.

Figure 24D:
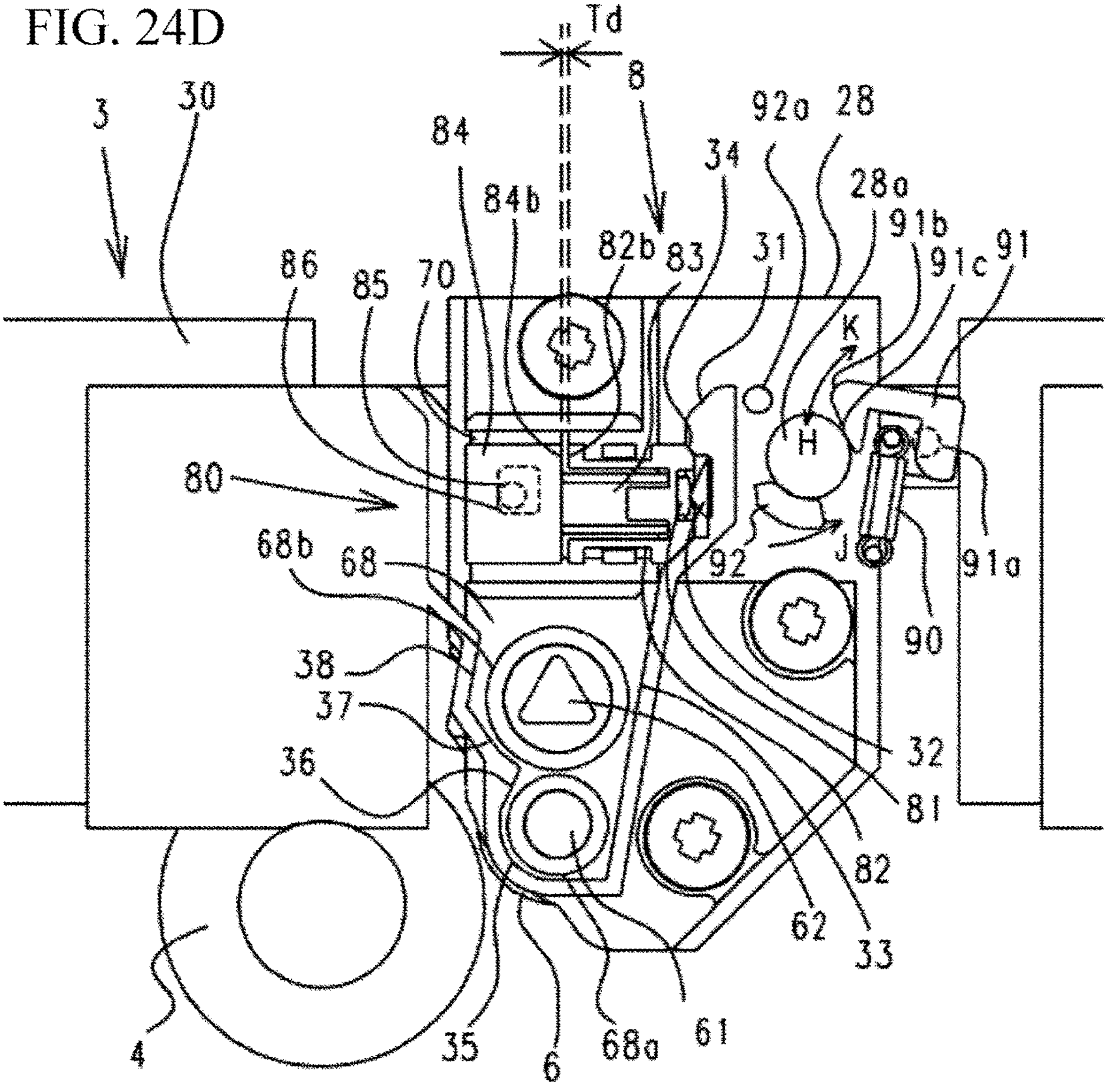
FIG. 24D is a schematic cross-sectional view illustrating a separated state of the developing cartridge of Embodiment 3.

FIG. 24D is a schematic cross-sectional view of the developing cartridge 8 in which the developing roller 6 of the developing cartridge 8 is separated from the photosensitive drum 4 of the cartridge tray 3 and is in the separation position (second mounting position) with respect to the cartridge tray 3. In the present embodiment, such a separated state is possible for the purpose of extending the service life of the developing roller 6 and the photosensitive drum 4. Therefore, even when the developing roller 6 is separated from the photosensitive drum 4, it is necessary to maintain the electrically connected state between the memory tag 81 and the tray side contact portion. As illustrated in FIGS. 20A and 20B, in order to separate the developing cartridges 8, separation members 92 and 93 are provided on the driving side and the non-driving side of the cartridge tray 3. As illustrated in the W-W cross-section of FIGS. 20A and 20B, the separation member 92 on the driving side is attached rotatably about a separation member rotation center 92*a*. The separation member 93 on the non-driving side is also configured to have the rotation center at the symmetrical position, and a description of the same operations will be omitted. The separation member 92 receives the separation member pressure force F by pressurizing the separation member (not illustrated) of the image forming apparatus 1. This enables rotation in the arrow J direction.

FIG. 24D illustrates a state in which the separation member 92 receives the separation member pressure force F and rotates in the arrow J direction from the state of FIG. 24C. The developing rotation stopper boss (driving side) 28*a* of the developing cartridge 8 causes the developing pressure member 91 to rotate in the arrow K direction with the pressure member rotation center 91*a* as the rotation center so as to be moved and lifted according to the rotation of the separation member 92 (see FIGS. 20A and 20B). Therefore, the developing roller 6 moves from the above-described first mounting position to the second mounting position and is separated from the photosensitive drum 4.

At this time, the attitude regulation holes 86*a* and 86*b* (see FIGS. 22A and 22B) of the cartridge side cover 68 are also moved and lifted according to the rotation in the arrow K direction. The direction in which the memory tag 81 pressurizes the tray side contact portion 32 is substantially the same as the horizontal direction perpendicular to the direction of gravity when the cartridge side cover 68 is lifted. Further, the memory tag pressing member 82 of the memory tag unit 80 and the memory unit support portion 34 are already fitted to each other, and the relative positional relationship does not change in the first direction, the second direction, and the third direction. Therefore, the pressure spring receiving member 84 which is movable in the third direction with respect to the memory tag pressing member 82 moves in the third direction when the attitude regulation boss 85 is pushed into the attitude regulation hole 86. As a result, the memory tag pressure spring 83 is further compressed from the state of FIG. 24C, and a gap Td (Ta>Tc>Td) is formed between the rear regulation portion 82*b* and the spring receiving member regulated portion 84*d*, which is further narrowed. That is, as illustrated in FIGS. 24C and 24D, the developing roller 6 moves from the abutting position (first mounting position) to the separation position (second mounting position) with respect to the photosensitive drum 4. In that case, the pressure spring receiving member 84 as the moving member comes closer to the memory tag pressing member 82 which is the memory holding member, and further compresses the memory tag pressure spring 83. Therefore, the electrical and mechanical contact of the memory tag 81 with the tray side contact portion 32 is maintained.

<<Longitudinal Relationship between Memory Tag and Cartridge Guide>>

The longitudinal relationship between the memory tag unit portion and the cartridge guide portion of the cartridge tray 3 will be described with reference to FIGS. 24A to 24D, FIG. 19, and FIGS. 20A and 20B.

As described above, when the developing cartridge 8 is mounted on the cartridge tray 3, the developing roller cover positioning portion 68*a* and the drive input cover positioning portion 68*b*, which are the positioning portions of the developing cartridge 8, pass through or abut on and pass through the memory guide portion 31 and the memory unit support portion 34 of the cartridge tray 3. After that, the positioning portion on the developing cartridge 8 side moves to the mounting completion position while abutting on the cartridge guide portion 33 or the drive input guide portion 38.

For example, in the example of FIGS. 24A and 24B, when the developing cartridge 8 is inserted into the cartridge tray 3, the following cases may be considered depending on the angle of the developing cartridge 8 at the time of insertion. That is, the developing roller cover positioning portion 68*a* is first abutted and guided on the side opposite to the side on which the memory guide portion 31 or the memory unit support portion 34 are provided. Further, it is also conceivable that the developing roller cover positioning portion 68*a* abuts on the drive input guide portion 38 and is guided and then moves downward. However, in either case, the developing roller cover positioning portion 68*a* is guided downward while abutting on the cartridge guide portion 33 and the like and is housed in the developing roller positioning portion 35.

In the present embodiment, as illustrated in FIGS. 20A and 20B, the memory guide portion 31 and the memory unit support portion 34 are provided at substantially the same position as the cartridge guide portion 33 in the longitudinal direction. That is, a member for defining the positional relationship between each positioning portion of the developing cartridge 8 and the cartridge tray 3 and a member for defining the positional relationship between the memory tag unit 80 of the developing cartridge 8 and the cartridge tray 3 are provided at substantially the same position in the longitudinal direction. With this arrangement, even when the developing cartridge 8 is inserted at any angle, the developing roller cover positioning portion 68*a* and the drive input cover positioning portion 68*b* are guided while abutting on the memory guide portion 31, the memory unit support portion 34, or the like. As a result, it is possible to prevent the user from making a mistake in the insertion position.

Further, the guide portion such as the cartridge guide portion 33, the developing roller positioning portion 35, or the developing roller positioning guide portion 36 of the cartridge tray 3, the fixing portion such as the memory unit support portion 34 for fixing the memory tag unit 80, and the tray side contact portion 32 contacting the memory tag 81 are provided at substantially the same positions in the longitudinal direction. Therefore, when the developing cartridge is mounted, the cartridge guide portion 33 and the memory tag unit 80 are arranged at substantially the same position in the longitudinal direction. With such a configuration, the longitudinal positioning accuracy of the memory tag unit 80 is improved. Since the longitudinal positioning accuracy is improved, the engaging operation of the memory tag unit 80 can be stably performed. Therefore, the accuracy of alignment between the tray side contact portion 32 of the cartridge tray 3 and the electrical contact portion of the memory tag 81 of the developing cartridge 8 is improved.

This can reduce the size of the memory tag contact. Further, the stability of electrical connection is improved.

Further, when the guide portion of the cartridge tray 3 and the fixing portion or the contact portion of the memory tag unit 80 are arranged at substantially the same position as the cartridge guide portion 33 in the longitudinal direction, the following favorable effects are obtained as compared with the case in which the fixing portion or the contact portion are arranged inside or outside the guide portion in the longitudinal direction.

First, consider the case in which the fixing portion or the electrical contact portion of the memory tag 81 in the cartridge tray 3 are arranged outside the cartridge guide portion 33 in the longitudinal direction. In this case, the memory tag unit 80 is also arranged outside the cartridge tray 3 in the longitudinal direction, and it is necessary to secure a space therefor. As a result, the size of the cartridge tray 3 increases. Further, a space corresponding to the apparatus main body 2 is required. Therefore, the size of the main body increases. On the other hand, when the fixing portion or the electrical contact portion of the memory tag 81 is arranged at substantially the same position in the longitudinal direction, the increase in the size of the cartridge tray 3 or the size of the apparatus main body 2 can be suppressed, and the size of the apparatus can be reduced.

Next, consider the case in which the fixing portion or the electrical contact portion of the memory tag 81 in the cartridge tray 3 are arranged inside the cartridge guide portion 33 in the longitudinal direction. In this case, the memory tag unit 80 is also arranged inside the developing cartridge 8 in the longitudinal direction, and the memory tag unit 80 and the developer storage frame 28 superimpose each other in the direction orthogonal to the longitudinal direction. As a result, in order to secure the space, it is necessary to shorten the developer storage frame 28 in the longitudinal direction or reduce the size of the developer storage frame 28. As a result, the developer capacity that can be stored decreases. On the other hand, when the fixing portion or the electrical contact portion of the memory tag 81 is arranged at substantially the same position in the longitudinal direction, it is unnecessary to reduce the size of the developer storage frame 28. Therefore, the developer capacity can be secured.

It is noted that, in the above description, the guide portion such as the cartridge guide portion 33 and the fixing portion or the contact portion of the memory tag unit 80 are arranged at substantially the same position in the longitudinal direction. However, when the guide portion and the fixing portion or the contact portion of the memory are arranged in the direction orthogonal to the longitudinal direction so that at least part thereof is superimposed, it is possible to obtain the effects such as prevention of the increase in apparatus size or the reduction in developer capacity.

Further, the cartridge guide portion 33 or the fixing portion or contact portion of the memory is made to fit within the width of one side of the cartridge tray frame 30, thereby preventing the increase in apparatus size. As illustrated in FIG. 20A, side walls extending in the direction orthogonal to the longitudinal direction among the side walls of the cartridge tray frame 30 are referred to as a first side wall 30*a* and a second side wall 30*b*, respectively. The first side wall 30*a* is a side on which the fixing portion or the contact portion of the memory are arranged, and is a side corresponding to the memory tag unit 80 when the developing cartridge is mounted. In this case, the cartridge guide portion 33, or the fixing portion or the contact portion of the memory is configured in the longitudinal direction so as to fit within the width of the first side wall 30*a*, thereby preventing the increase in apparatus size.

In the embodiment, the guide portion of the cartridge tray 3 and the fixing portion or the contact portion of the memory tag unit 80 are provided in the direction orthogonal to the longitudinal direction so that at least part thereof is superimposed. More preferably, the guide portion of the cartridge tray 3 and the fixing portion or the contact portion of the memory tag unit 80 are provided at substantially the same position in the longitudinal direction. With this configuration, in the image forming apparatus 1 in which the developing cartridge 8 provided with the memory tag 81 which is the memory medium is attachable to and detachable from the cartridge tray 3, it is possible to prevent the increase in the size of the image forming apparatus 1 or the reduction in developer capacity. Further, the memory tag 81 which is the memory medium can be stably connected.

Further, in the present embodiment, the pressure spring receiving member 84 is movable in the third direction when the attitude regulation boss 85 is pushed into the attitude regulation hole 86. Further, when the developing roller 6 is separated from the photosensitive drum 4, the direction in which the memory tag 81 is pressurized toward the tray side contact portion 32 is substantially the same as the direction in which the developing cartridge 8 is moves with respect to the cartridge tray 3. For example, it is assumed that the direction in which the memory tag 81 pressurizes the tray side contact portion 32 is opposite to the direction in which the developing cartridge 8 moves with respect to the cartridge tray 3. In order to move the memory tag 81 and the tray side contact portion 32 while maintaining the electrically connected state, it is necessary to secure a wide gap between the rear regulation portion 82*b* and the spring receiving member regulated portion 84*d*. The movable range of the memory tag pressing member 82 with respect to the pressure spring receiving member 84 increases, and the memory tag unit 80 or the memory tag pressure spring 83 cannot be made smaller. However, with the above-described configuration, the positions of the memory tag 81 and the tray side contact portion 32 are arranged so as to approach each other from the insertion position to the abutting position and from the abutting position to the separation position. Therefore, the movable range of the memory tag pressing member 82 with respect to the pressure spring receiving member 84 can be reduced. The memory tag unit 80 can be downsized by reducing the movable range of the memory tag pressing member 82 with respect to the pressure spring receiving member 84. Further, since the memory tag pressure spring 83 can be made smaller and the holding force for fitting the memory unit support portion 34 and the memory tag pressing member 82 can be reduced, the load applied to the memory tag 81 and the tray side contact portion 32 can be reduced.

Embodiment 4

<<Configuration of Image Forming Apparatus>>

An image forming apparatus 501 according to an embodiment of the present invention and a developing cartridge 502 used in the image forming apparatus 501 will be described.

Figure 25A:
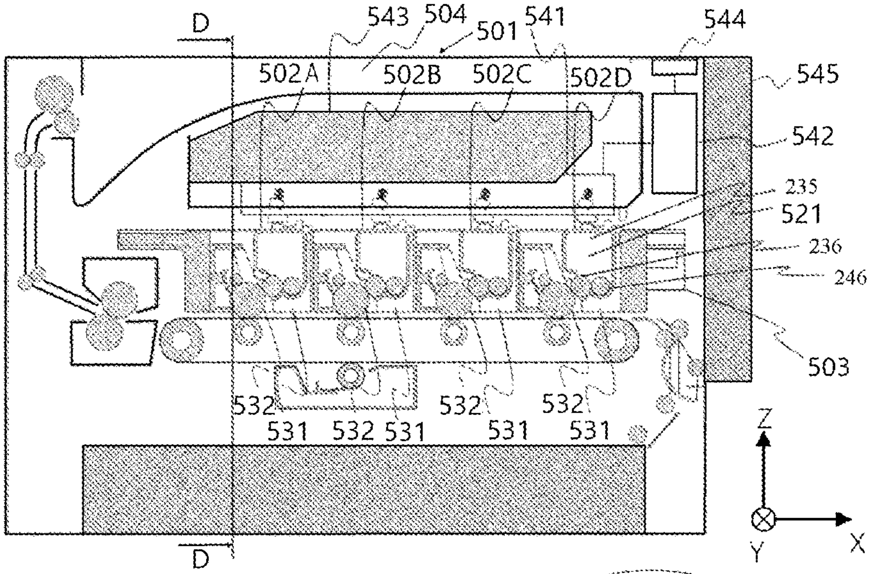
FIGS. 25A to 25D are views explaining an image forming apparatus and a developing cartridge according to Embodiment 4, respectively.
Figure 25B:
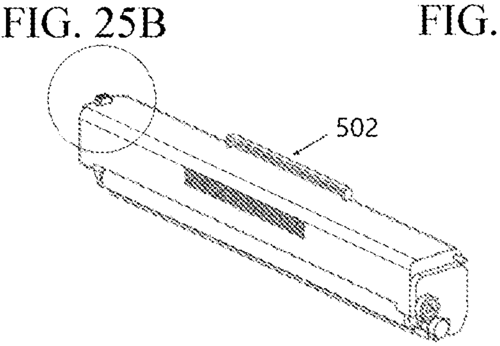
Figure 25C:
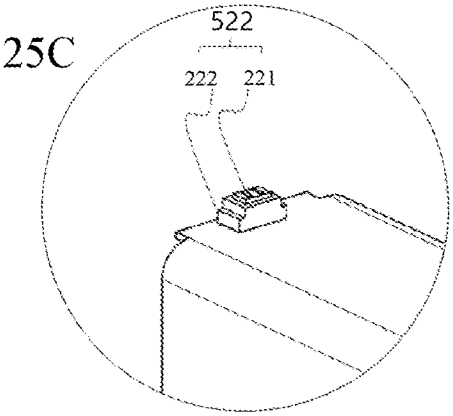
Figure 25D:
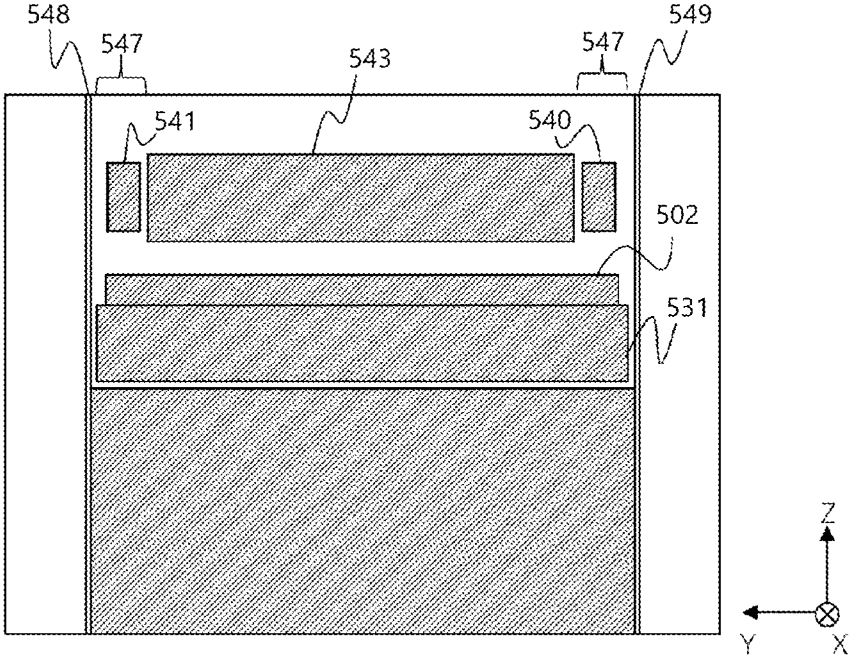

FIG. 25A is a conceptual diagram illustrating a cross-section of the image forming apparatus 501. FIG. 25B is a perspective view of the developing cartridge 502. FIG. 25C is a partial enlarged view of the developing cartridge 502 and corresponds to a part surrounded by a circle in FIG. 25B. FIG. 25D is a conceptual diagram when FIG. 25A is seen from a cross-section DD.

The image forming apparatus 501 is an electrophotographic printer such as a laser printer or an LED printer. The image forming apparatus 501 includes an image forming apparatus main body 504 (also simply referred to as "main body"), the developing cartridge 502, and the cartridge tray 503 as main constituent elements. In the present embodiment, for example, the number of developing cartridges 502 is four, that is, 502A to 502D, and the cartridge tray 503 includes a frame capable of holding all the four developing cartridges 502. The image forming apparatus 501 forms an image on a recording surface of a printing paper by a developer 521 (for example, toner) supplied from the developing cartridge 502. A more detailed configuration will be described below. It is noted that, when there is no particular need to distinguish them, they are simply described as the developing cartridge 502.

Figure 26:
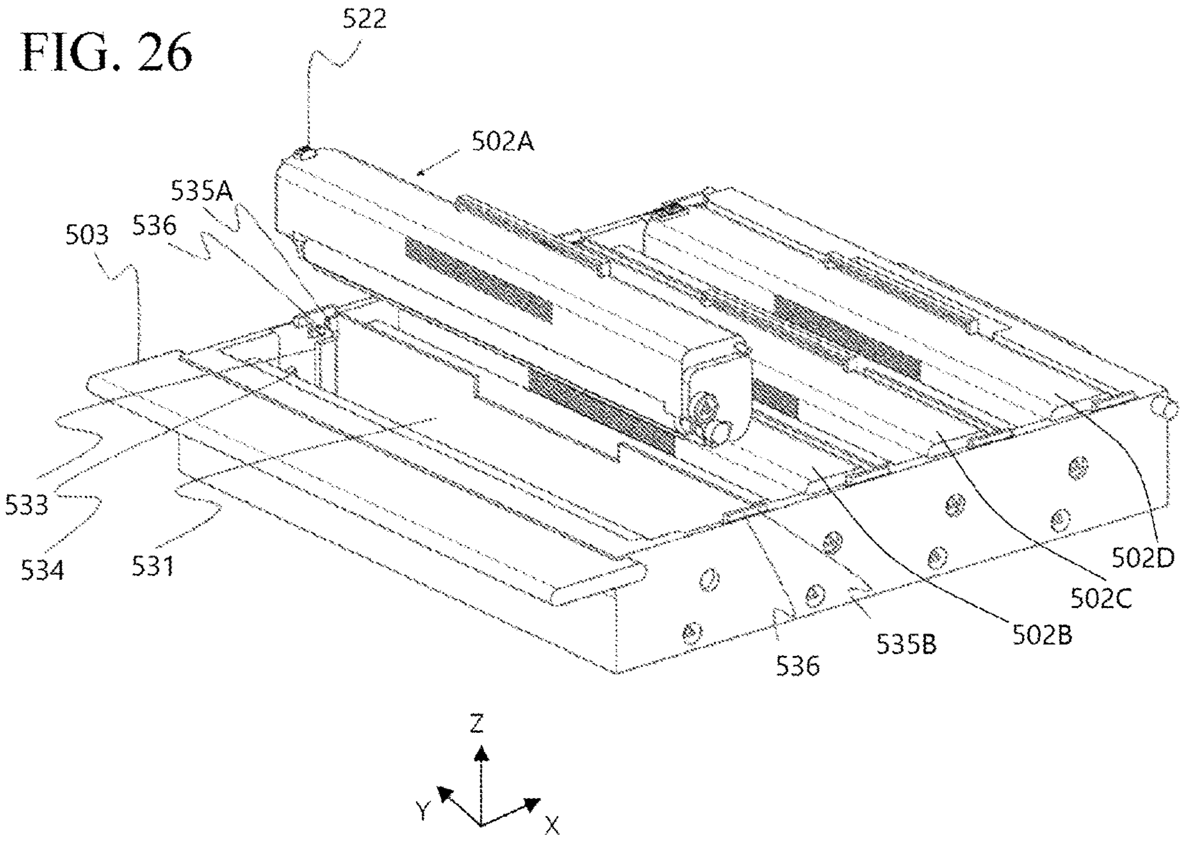
FIG. 26 is a perspective view of a cartridge tray and the developing cartridge according to Embodiment 4.

FIG. 26 is a perspective view of the cartridge tray 503 and the developing cartridge 502. The four developing cartridges 502A to 502D are arranged in four slots 531 provided in the cartridge tray 503, respectively. The respective developing cartridges 502 can be replaced individually. At the time of replacement, the cartridge tray 503 is drawn out from the front surface of the image forming apparatus 501, the developing cartridges 502 attached to the slots 531 are removed, and new developing cartridges 502 are attached. A photosensitive drum 532 as an image bearing member is provided near the bottom of each of the four slots 531.

The four developing cartridges 502 in the present embodiment store developers 521 of different colors (for example, cyan, magenta, yellow, and black colors). However, the number of developing cartridges 502 mounted on the cartridge tray 503 is not limited to four, and may be three or less, or five or more.

As illustrated in FIG. 25C, the four developing cartridges 502 each have a memory tag unit 522. The memory tag unit 522 includes a memory tag 221 and a memory tag holding portion 222. The memory tag 221 further includes an electrical contact surface which physically contacts an electrical contact 416, and a storage element electrically connected to the electrical contact surface. That is, the memory tag 221 is an IC chip which can read and write information and can store information. The memory tag 221 stores information about the developing cartridges. The information about the developing cartridges can be, for example, remaining amount information of the developer 521, cumulative consumed developer amount information, cumulative rotation number of the developing roller 525, and use start date information. The information is not limited thereto. The plurality of developing cartridges 502 are arranged in the slots so as to be aligned in the same direction. Therefore, the plurality of memory tags 221 are arranged in series in the insertion direction of the cartridge tray 503, and a plurality of connector portions 411 of a memory tag connector unit 541 described below are also arranged in series so as to face the memory tag 221.

Further, as illustrated in FIGS. 25A to 25D, the image forming apparatus main body 504 includes an electrical control unit 540, a memory tag connector unit 541 as a memory connecting unit, a control unit 542, an optical unit 543, and a display 544.

The control unit 542 is electrically connected to the memory tag connector unit 541 and has a processor such as a CPU and various memories. The control unit 542 is provided with, for example, a circuit board. The processor of the control unit 542 operates according to a program stored in the memory or the like or an instruction input from a user and performs various processes in the image forming apparatus 501. The electrical control unit 540 is a control unit which controls a driving electrical system. The electrical control unit 540 is configured by a circuit in which elements such as capacitors are arranged, and functions as a motor driver and the like. The control unit 542 may perform the functions of the electrical control unit.

The optical unit 543 is arranged above the cartridge tray 503, in which the four developing cartridges 502 are mounted, in the second direction (upper side in the Z direction on the plane of paper). The optical unit 543 irradiates the charged photosensitive drum 532 with a laser beam according to image information to form an electrostatic latent image on the surface of the photosensitive drum.

As illustrated in FIG. 25D, the memory tag connector unit 541 is provided adjacent to the optical unit 543 in the first direction on the apparatus main body side. In a conventional image forming apparatus, an area 547 adjacent to the optical unit 543 among side plates 548 and 49 supporting the cartridge tray 503 and the like is an empty space. Therefore, in the present embodiment, the area 547 adjacent to the optical unit 543 can be used to arrange the memory tag connector unit 541 without increasing the size of the image forming apparatus 501.

In the present embodiment, the memory tag connector unit 541 is provided above the developing cartridge 502 in the second direction. The memory tag connector unit 541 is arranged so as to face the memory unit when the cartridge tray 503 is inserted into the main body in a state in which the developing cartridge 502 is housed in the slot 531. The memory tag connector unit 541 moves in conjunction with the operation of closing the front door 545 of the image forming apparatus main body 504, and is engaged with the memory tag unit 522 of each developing cartridge 502. As a result, the control unit 542 and each memory tag 221 are electrically connected to each other. The behavior of the memory tag connector unit 541 will be described below in detail.

The display 544 displays a variety of information about the operation of the image forming apparatus 501 on the screen according to a command from the control unit 542. The information on the display can be used for, for example, inputting a user's instruction. It is noted that the four developing cartridges 502 inserted into the cartridge tray 503 have the same configuration and perform the same operation. Therefore, in the following description, one slot 531 will be described as a representative.

<<Configuration of Developer Cartridge>>

Figure 27:
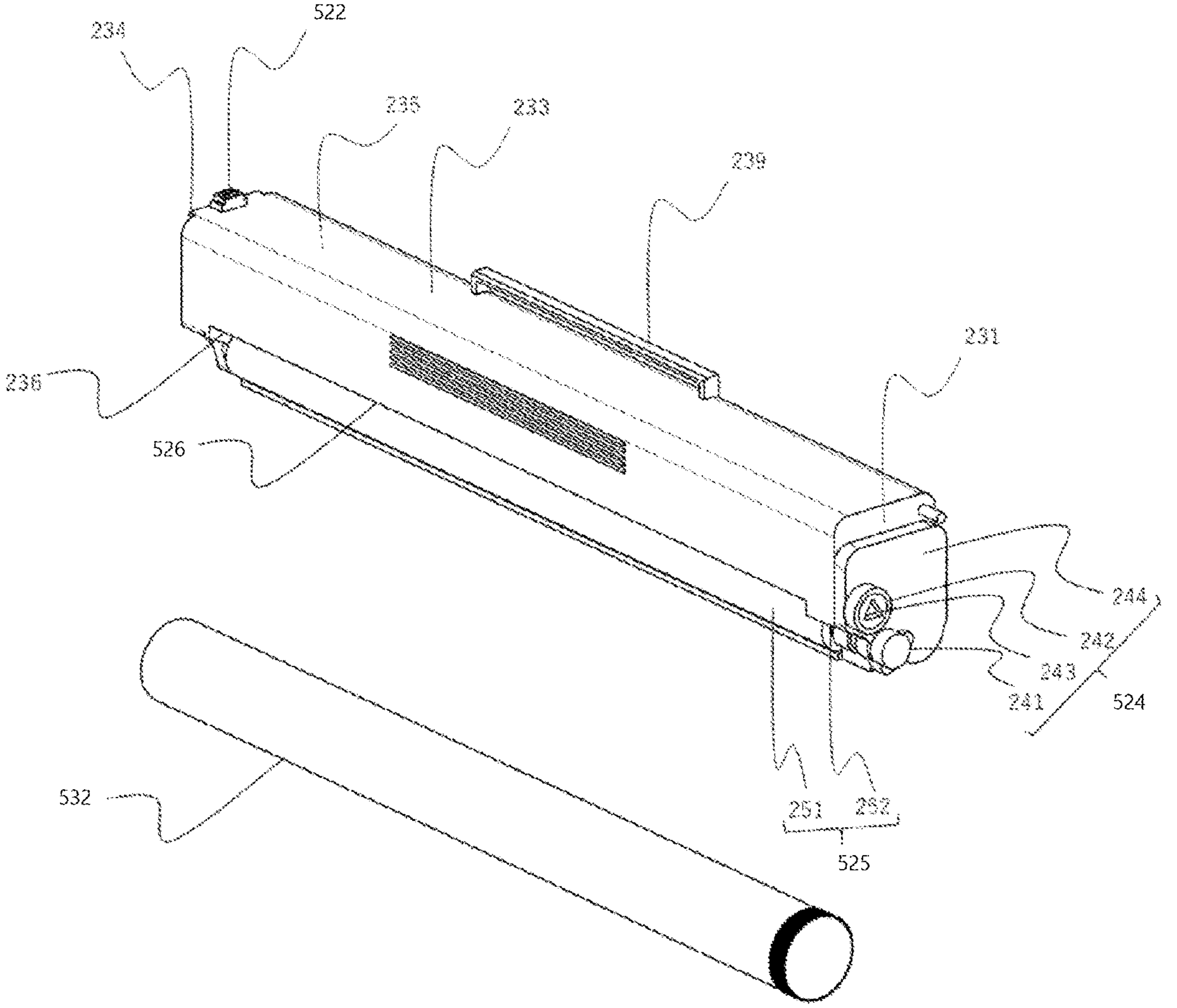
FIG. 27 is a perspective view of the developing cartridge according to Embodiment 4.
Figure 28:
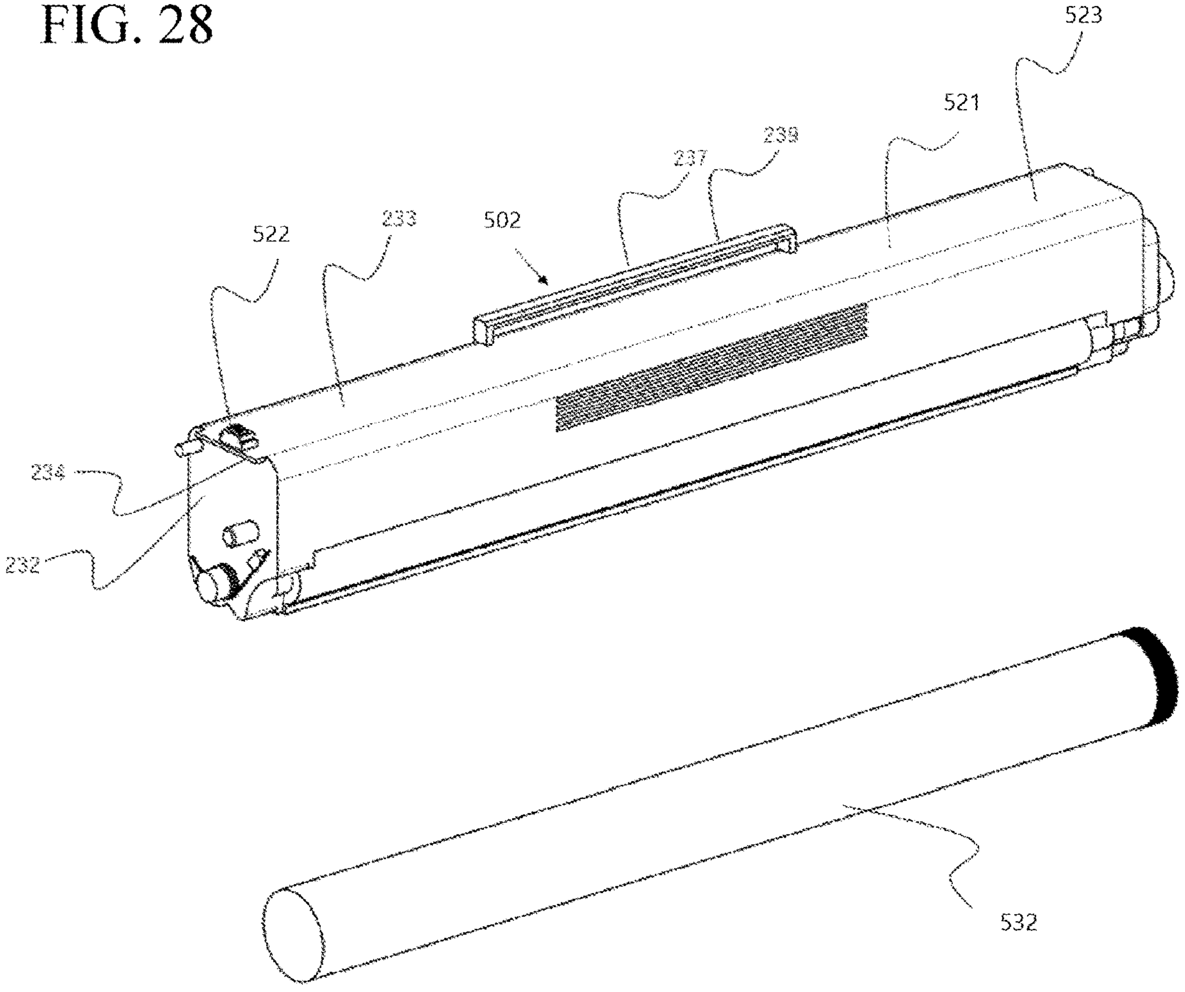
FIG. 28 is another perspective view of the developing cartridge according to Embodiment 4.

FIGS. 27 and 28 are perspective views of the developing cartridge 502 when seen from different directions, respectively. Further, in order to show the positional relationship between the developing cartridge 502 and the photosensitive drum 532, the photosensitive drum 532 installed in the cartridge tray 503 is extracted and shown. The developing cartridge 502 of the present embodiment has a memory tag unit 522, a developing container 523, a gear portion 524, and a developing roller 525 as main constituent elements. The memory tag unit 522 is arranged on the upper surface of the developing cartridge 502. The upper surface is a surface which constitutes a portion on the downstream side in the insertion direction of the developing cartridge 502.

The developing container 523 is a housing which can store the developer 521. The housing is provided with a resin frame or the like. A storage chamber 235 for storing the developer 521 is provided inside the developing container 523. The developing container 523 has a first surface 231 provided at an end on one direction side in the first direction and a second surface 232 provided at an end opposite to the first surface 231 in the first direction. The developing container 523 has a third surface 233 which is an upper surface portion in the second direction. Further, the developing container 523 has an eaves portion 234 located on an extension of the third surface 233 in the first direction. The gear portion 524 is located on the first surface 231. The developing container 523 has a grip portion 237 located on the third surface 233. The grip portion 237 has a protrusion portion 239 which protrudes in the second direction.

Further, in the present embodiment, the memory tag unit 522 is located so as to straddle the eaves portion 234 and the third surface 233. At least one direction of the cartridge tray 503 needs to be opened to the main body side. Therefore, since the developing cartridge 502 can be housed in the cartridge tray and the cartridge tray 503 does not cover the memory unit even when the developing cartridge is housed, the third surface 233 of the developing cartridge 502 after accommodation can be opposed to the memory connection unit on the main body side. However, the memory tag unit 522 may be located at the end of the third surface 233 in the first direction or the eaves portion 234. Therefore, since the space of the storage chamber 235 in which the developer 521 is stored is not damaged, or the loss of space can be minimized, the developer 521 can be efficiently stored in the storage chamber 235.

The developing container 523 has a developing roller 525 as a developer carrier and an opening 236 for supplying the developer 521 to the developing roller 525. The opening 236 is located on the surface opposite to the third surface 233 with the storage chamber 235 interposed therebetween. The developing roller 525 is a roller which is rotatable around the rotational shaft extending in the first direction. The developing roller 525 is arranged to face the opening 236 of the developing container 523. That is, the third surface 233 is a surface located on the opposite side of the developing roller 525 with the storage chamber 235 interposed therebetween. The developing roller 525 of the present embodiment has a developing roller main body 251 and a developing roller shaft 252. The developing roller main body 251 is a cylindrical member extending in the first direction. As a material for the developing roller main body 251, for example, a rubber having elasticity is used.

The developing roller shaft 252 is a cylindrical member which passes through the developing roller main body 251 in the first direction. As a material for the developing roller shaft 252, a metal or a resin having conductivity is used. The developing roller main body 251 is fixed to the developing roller shaft 252 so as not to rotate with respect to the developing roller shaft 252. One end of the developing roller shaft 252 in the first direction is fixed so as not to rotate with respect to a developing roller gear 241 described below. Therefore, when the developing roller gear 241 rotates, the developing roller shaft 252 also rotates, and the developing roller main body 251 also rotates together with the developing roller shaft 252. It is noted that the developing roller shaft 252 does not have to pass through the developing roller main body 251 in the first direction. For example, the pair of developing roller shafts 252 may extend in the first direction from both ends of the developing roller main body 251 in the first direction.

Further, as illustrated in FIG. 25A, the developing cartridge 502 has a supply roller 246. The supply roller 246 is located between the developing roller 525 and the storage chamber 235. The supply roller 246 is rotatable about the rotational shaft extending in the first direction. When the developing cartridge 502 receives the driving force, the developer 521 is supplied from the storage chamber 235 in the developing container 523 to the outer peripheral surface of the developing roller main body 251 via the supply roller 246. At that time, the developer 521 is frictionally charged between the supply roller 246 and the developing roller 525. On the other hand, a bias voltage is applied to the developing roller shaft 252 of the developing roller 525. Therefore, the developer 521 is attracted to the outer peripheral surface of the developing roller main body 251 by the electrostatic force between the developing roller shaft 252 and the developer 521.

Further, the developing cartridge 502 has a developing blade 526. The developing blade 526 molds the developer 521 supplied to the outer peripheral surface of the developing roller main body 251 to have a constant thickness. After that, the developer 521 on the outer peripheral surface of the developing roller main body 251 is supplied to the photosensitive drum 532 provided on the drawer tray 3. At this time, the developer 521 moves from the developing roller main body 251 to the photosensitive drum 532 according to the electrostatic latent image formed on the outer peripheral surface of the photosensitive drum 532. Therefore, the electrostatic latent image is visualized on the outer peripheral surface of the photosensitive drum 532.

The gear portion 524 is located on the first surface 231 of the developing container 523. The gear portion 524 has a developing roller gear 241, a coupling 242, and a side cover 244. It is noted that the illustration of a plurality of gear teeth of each gear is omitted in FIGS. 27 and 28. The coupling 242 is a gear which first receives the driving force supplied from the image forming apparatus 501. The coupling 242 can rotate around the rotational shaft extending in the first direction. The coupling 242 is provided with a fastening hole 243 which is recessed in the first direction. Further, a plurality of gear teeth (not illustrated) are provided on the outer peripheral portion of the coupling 242 at equal intervals over the entire periphery.

When the cartridge tray 503 in which the developing cartridge 502 is mounted is housed in the image forming apparatus main body 504, the driving shaft (not illustrated) of the image forming apparatus main body 504 is inserted into the fastening hole 243 of the coupling 242. Therefore, the driving shaft and the coupling 242 are connected so that they cannot rotate with respect to each other. Therefore, when the driving shaft rotates, the coupling 242 rotates. The developing roller gear 241 is a gear for rotating the developing roller 525. The developing roller gear 241 can rotate around the rotational shaft extending in the first direction. On the outer peripheral portion of the developing roller gear 241, a plurality of gear teeth (not illustrated) are provided at equal intervals over the entire periphery. Some of the plurality of gear teeth of the coupling 242 and some of the plurality of gear teeth of the developing roller gear 241 mesh with each other. Further, the developing roller gear 241 is mounted on the end portion of the developing roller shaft 252 of the developing roller 525 in the first direction so as not to rotate with respect to each other. Therefore, when the coupling 242 rotates, the developing roller gear 241 rotates and the developing roller 525 also rotates together with the developing roller gear 241.

<<Operation of Inserting Developer Cartridge into Cartridge Tray>>

Figure 29:
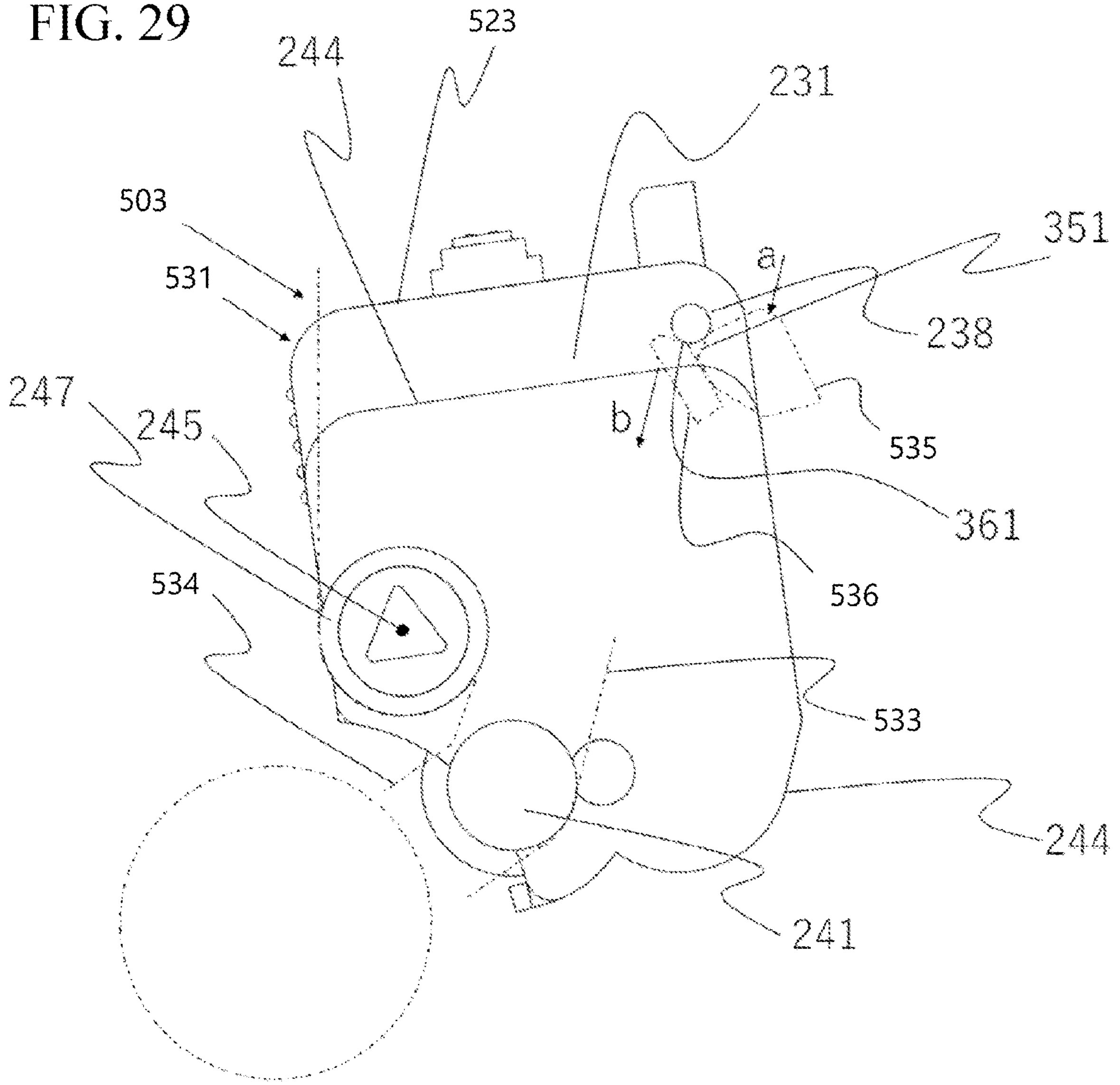
FIG. 29 is a behavior diagram when the developing cartridge is inserted into the cartridge tray according to Embodiment 4.
Figure 30:
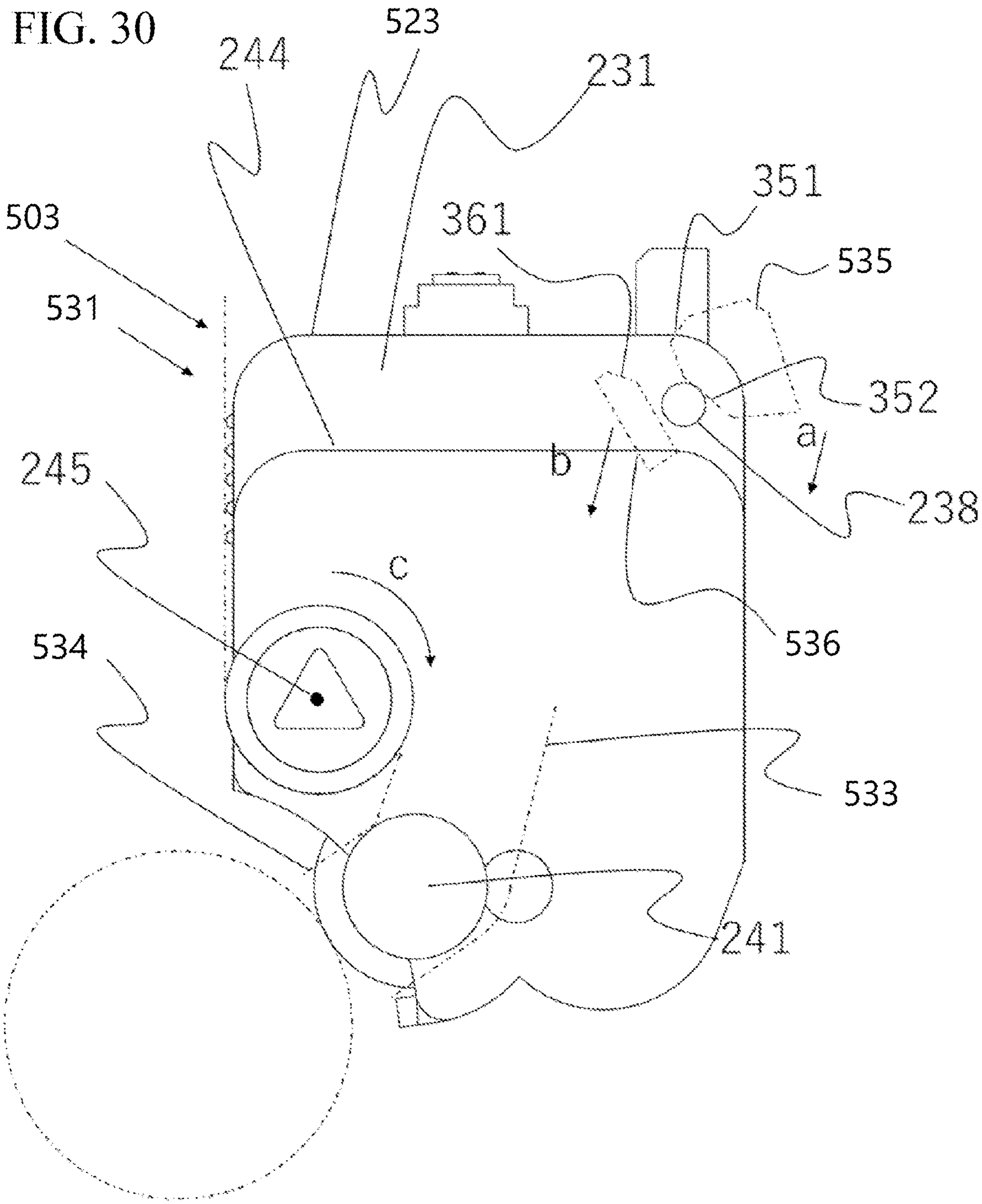
FIG. 30 is another behavior diagram when the developing cartridge is inserted into the cartridge tray according to Embodiment 4.

Next, the operation of inserting the developing cartridge 502 into the cartridge tray 503 will be described. FIGS. 29 and 30 are diagrams illustrating the behavior when the developing cartridge 502 is inserted into the cartridge tray 503. As illustrated in FIGS. 26, 29 and 30, the cartridge tray 503 has a first guide plate 533, a second guide plate 534, a pair of pressure members 535 (535A, 535B) provided at both ends, and a separation member 536. As illustrated in FIG. 26, the pressure members 535A and 535B are arranged at the ends of the four slots 531 in the cartridge tray 503 in the first direction. The pressure member 535A is arranged on the side, on which the memory tag unit 522 is located, in the end of the cartridge tray 503 in the first direction. The pressure member 535B is arranged on the side on which the memory tag unit 522 is not located among the ends of the cartridge tray 503 in the first direction.

The pressure member 535 provided in the cartridge tray 503 has a pressure elastic body (not illustrated). The pressure elastic body is provided with, for example, a coil spring. As illustrated in FIG. 29, the pressure member 535 is biased in the arrow a direction. The separation members 536 are provided in the four slots 531 in the cartridge tray 503 and at both ends of the cartridge tray 503 in the first direction. Further, the separation member 536 provided in the cartridge tray 503 has a separation elastic body (not illustrated) and is biased in the arrow b direction of FIG. 29. The separation elastic body can also be provided with, for example, a coil spring.

In contrast, the developing container 523 provided in the developing cartridge 502 has a developing protrusion 238 as a protrusion member. The developing protrusion 238 is a pillar-shaped member extending from the first surface 231 of the developing container 523 in the first direction. It is noted that the developing protrusion 238 is exposed to the outside without being covered with the side cover 244.

A first guide plate 533 and a second guide plate 534 are provided at the respective ends of the cartridge tray 503 in the first direction and are members for introducing the developing cartridge 502 into the respective slots 531. The first guide plate 533 and the second guide plate 534 face each other with a gap in the third direction.

When the developing cartridge 502 is mounted on the cartridge tray 503, first, as illustrated in FIG. 29, the developing cartridge 502 is guided so that the developing roller gear 241 of the developing cartridge 502, part of the side cover 244, and the like are located between the first guide plate 533 and the second guide plate 534. The guided developing cartridge 502 is inserted into the cartridge tray 503 in the second direction (downward) (first position). At this time, the developing protrusion 238 of the developing container 523 contacts the side surface 351 of the pressure member 535 and the upper surface 361 of the separation member 536. At this point, the photosensitive drum 532 and the developing roller 525 do not abut on each other.

Next, the rotating operation of the developing container 523 after the developing cartridge 502 is inserted into the cartridge tray 503 will be described with reference to FIG. 30. After the developing cartridge 502 is inserted into the cartridge tray 503, the developing container 523 rotates about the center 245 of the coupling 242 with respect to the cartridge tray 503. Specifically, the developing cartridge 502 is tilted in the arrow c direction with respect to the cartridge tray 503 with the center 245 of the coupling 242 as the center of rotation. Due to the force at the time of this rotation, the developing protrusion 238 of the developing container 523 moves against the pressurizing force of the pressure member 535 to the position which contacts the lower surface 352 of the pressure member 535 (second position). The user may push the developing cartridge 502 while sliding the developing cartridge between the first guide plate 533 and the second guide plate 534 during the rotating operation.

The second position is a position at which an image can be formed and is a certain position of the developing cartridge 502 in the cartridge tray 503. Further, the second position has a positional relationship in which the developing protrusion 238 and the separation member 536 do not contact each other. Even in the second position, the pressure member 535 pressurizes the developing protrusion 238 in the arrow a direction. Therefore, the developing roller 525 is pressurized against the photosensitive drum 532. It is noted that, when the user inserts the developing cartridge 502 into the cartridge tray 503, the user is in either of the first position and the second position. That is, the user may leave the developing cartridge 502 in the first position or push the developing cartridge 502 to the second position.

The developing roller 525 is preferably pressurized against the photosensitive drum 532 with a uniform force. Therefore, in the present embodiment, when the pressures of the pressure member 535A and the pressure member 535B are pressure A and pressure B, respectively, pressurizing force B>pressurizing force A considering the engaging force with which the memory tag connector unit 541 described below is engaged with the memory tag unit 522. However, the appropriate pressures A and B may be set considering the influence of other factors. Therefore, the abutting pressure of the developing roller 525 toward the photosensitive drum 532 can be kept optimum and a good image can be formed.

<<Operation of Inserting Cartridge Tray to Image Forming Apparatus>>

Figure 31A:
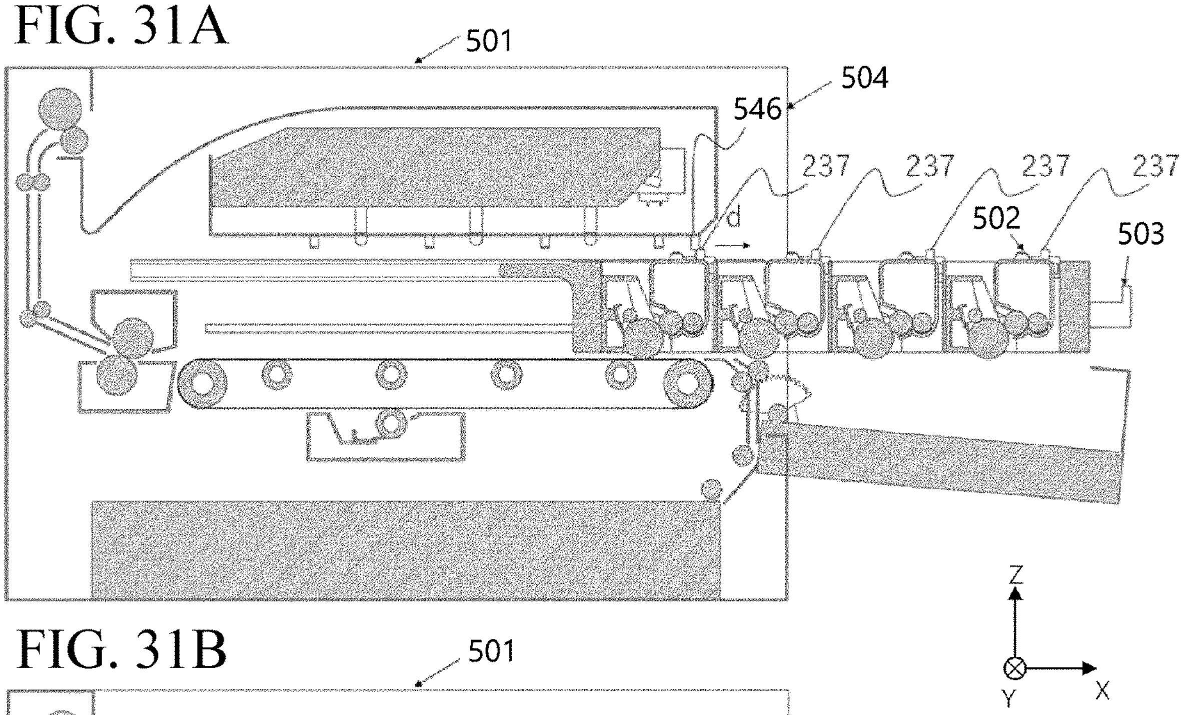
FIGS. 31A and 31B are behavior diagrams of the developing cartridge mounted on the cartridge tray according to Embodiment 4.
Figure 31B:
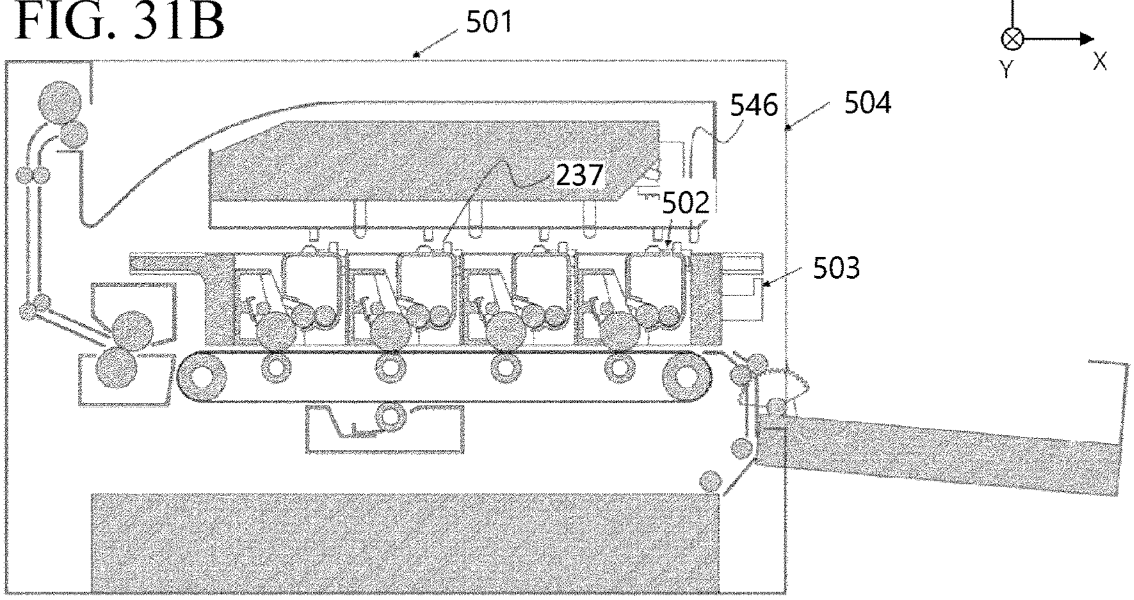

The behavior of the developing cartridge 502 when the cartridge tray 503 is inserted into the main body will be described with reference to FIGS. 31A and 31B. FIGS. 31A and 31B illustrate a state in which the cartridge tray 503 is inserted when the front door 545 of the image forming apparatus main body 504 is in an opened state. The front door 545 is a door portion provided in the main body and is a door portion which is provided at the insertion opening of the cartridge tray 503 and can be opened and closed by the user. The image forming apparatus main body 504 has an abutting protrusion 546 which is a member protruding downward from above. FIG. 31A is a cross-sectional view illustrating a state in which the cartridge tray 503 having the developing cartridge 502 mounted thereon is pulled out from the image forming apparatus main body 504. FIG. 31B is a cross-sectional view illustrating a state in which the cartridge tray 503 having the developing cartridge 502 mounted thereon is inserted into the image forming apparatus main body 504.

At the point of FIG. 31A, as described above, the relative positions of the developing cartridge 502 and the cartridge tray 503 may be either the first position before being pushed in all the way or the second position after being pushed in. However, the developing cartridge 502 in the first position moves to the second position while the cartridge tray 503 is inserted into the image forming apparatus main body 504 in the third direction. Specifically, the grip portion 237 of the developing cartridge 502 interferes with the abutting protrusion 546 of the image forming apparatus main body 504, so that the grip portion 237 receives the force in the arrow d direction. As a result, the developing cartridge 502 rotates about the center 245 of the coupling 242 and moves to the second position. As a result, as illustrated in FIG. 31B, when the cartridge tray 503 is inside the image forming apparatus main body 504, the developing cartridge 502 is mounted on the cartridge tray 503 at the second position. It is noted that since the grip portion 237 of the developing cartridge 502 in the second position at the point of FIG. 31A does not interfere with the abutting protrusion 546 even when the cartridge tray 503 is inserted into the image forming apparatus main body 504 in the third direction, the developing cartridge 502 maintains the second position. It is noted that the portion of the developing cartridge 502 interfering with the abutting protrusion 546 is not limited to the grip portion 237.

Figure 32A:
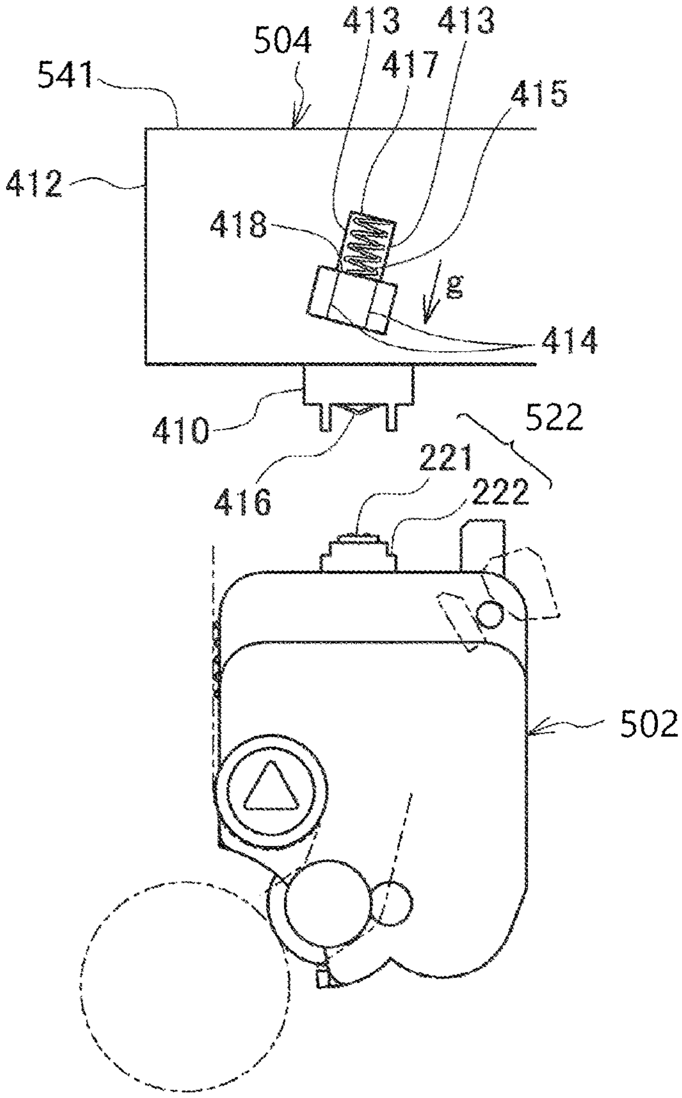
FIGS. 32A and 32B are behavior diagrams of a memory tag connector unit according to Embodiment 4.
Figure 32B:
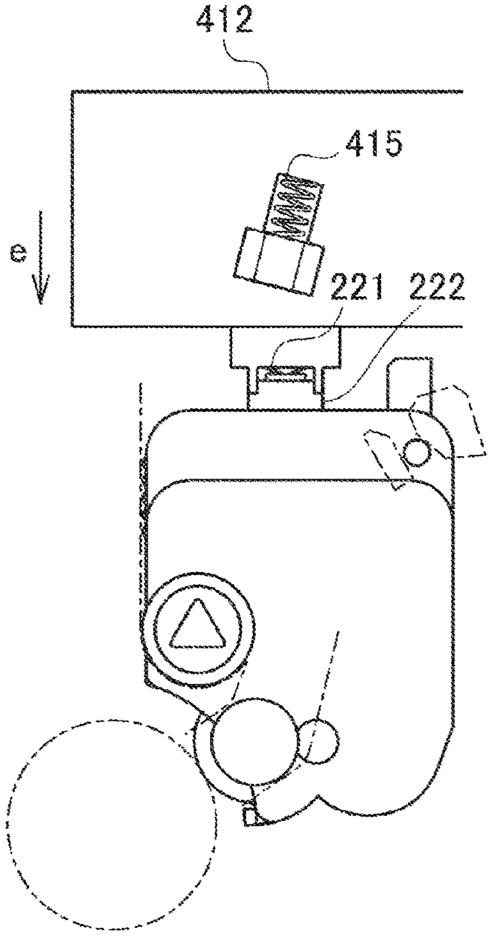

FIGS. 32A and 32B illustrate the behavior of the memory tag connector unit 541 of the image forming apparatus main body 504. The memory tag connector unit 541 has a connector portion 411, a connector holding portion 412, and an elastic member 415 as main constituent elements. The connector portion 411 has an electrical contact 416, a connector guided portion 414, and a pressure receiving surface 418. The connector holding portion 412 as a holding unit has a pair of connector guide portions 413 and a pressure receiving surface 417.

FIG. 32A is a cross-sectional view orthogonal to the first direction when the cartridge tray 503 is inserted into the image forming apparatus main body 504 and the front door 545 is opened. FIG. 32B is a cross-sectional view orthogonal to the first direction when the memory tag connector unit 541 moves in the arrow e direction of FIG. 32A in conjunction with the operation of closing the front door 545 and is engaged with the memory tag unit 522. When the front door 545 is opened, the memory tag connector unit 541 is in the upper retracted position, and even when the cartridge tray 503 is inserted into or drawn out from the main body, the memory tag connector unit 541 does not abut on the memory tag holding portion 222. That is, when the front door 545 is opened, the friction of the memory tag does not occur even when the cartridge tray 503 is in the first tray position stored in the main body or in the second tray position drawn out from the main body. When the front door 545 is closed, the memory tag connector unit 541 moves downward from the retracted position and is placed at a connectable position which can be connected to the memory tag.

Due to this movement, the memory tag connector unit 541 is engaged with the memory tag holding portion 222 of the developing cartridge 502 in the second position. Therefore, the memory tag connector unit 541 and the memory tag holding portion 222 are positioned and the memory tag 221 and the electrical contact 416 are in contact with each other at a certain pressure. As a result, the memory tag connector unit 541 and the memory tag unit 522 are positioned. Further, the control unit 542 and the memory tag 221 are electrically connected to each other.

<<Separating Operation>>

Figure 33A:
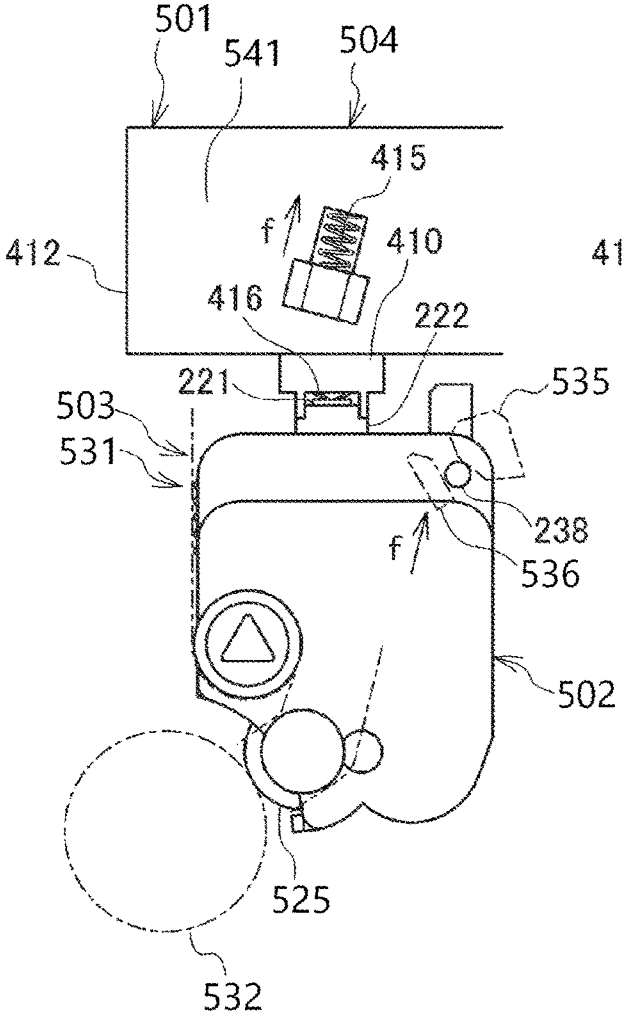
FIGS. 33A and 33B are behavior diagrams when a separating operation according to Embodiment 4 is performed.
Figure 33B:
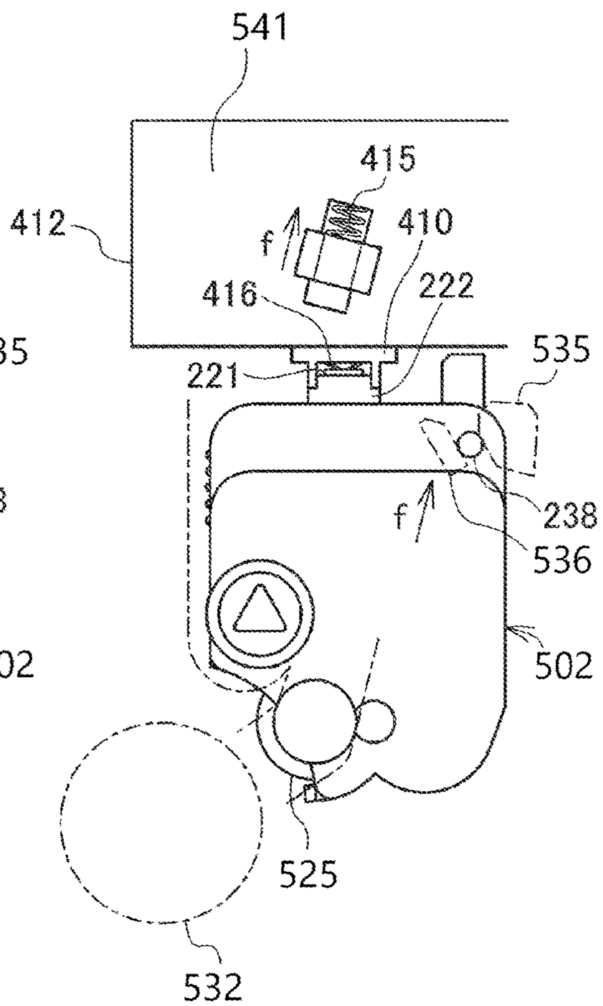

When the insertion of the cartridge tray 503 in which the developing cartridge 502 is arranged into the image forming apparatus main body 504 is completed, the developing cartridge 502 is in the rotated second position, and the photosensitive drum 532 and the developing roller 525 are in the abutting position at which the photosensitive drum 532 and the developing roller 525 abut on each other. In this state, the image forming apparatus main body 504 can perform the separating operation of separating the developing roller 525 from the photosensitive drum 532 at a certain timing. FIGS. 33A and 33B are diagrams illustrating the separating operation.

The image forming apparatus 501 has a separation lever. For example, the separation lever is provided near the side plate of the cartridge tray 503. When the driving force from the image forming apparatus 501 causes the separation lever to press the separation member 536 of the cartridge tray 503, the separation member 536 moves toward the pressure member 535 in the arrow f direction of FIGS. 33A and 33B. Therefore, the separation member 536 comes into contact with the developing protrusion 238, and the developing protrusion 238 is pressurized against the pressure of the pressure member 535 in the direction away from the photosensitive drum 532 (state of FIG. 33A). As a result, the developing container 523 and the developing roller 525 of the developing cartridge 502 move in the arrow f direction (separating direction) of FIG. 33 (the third position, the state of FIG. 33B).

Therefore, the developing roller 525 and the photosensitive drum 532 are separated from each other. This series of operations is referred to as the separating operation, and the positional relationship between the developing roller 525 and the photosensitive drum 532 in the separation state is referred to as the separation position. The separating direction (arrow f direction) is a direction intersecting with the first direction.

<<Configuration of Memory Tag Connector Unit>>

In the present embodiment, even when the positional relationship between the abutting position and the separation position changes, the engagement between the connector portion 411 of the memory tag connector unit 541 and the memory tag holding portion 222 of the memory tag unit 522 is maintained. Therefore, the electrical connection between the control unit 542 and the memory tag as the memory unit is maintained in any positional relationship. It is possible to maintain such an engagement state between the connector portion 411 and the memory tag holding portion 222 due to the configuration of the connector portion 411 described below.

Figure 34A:
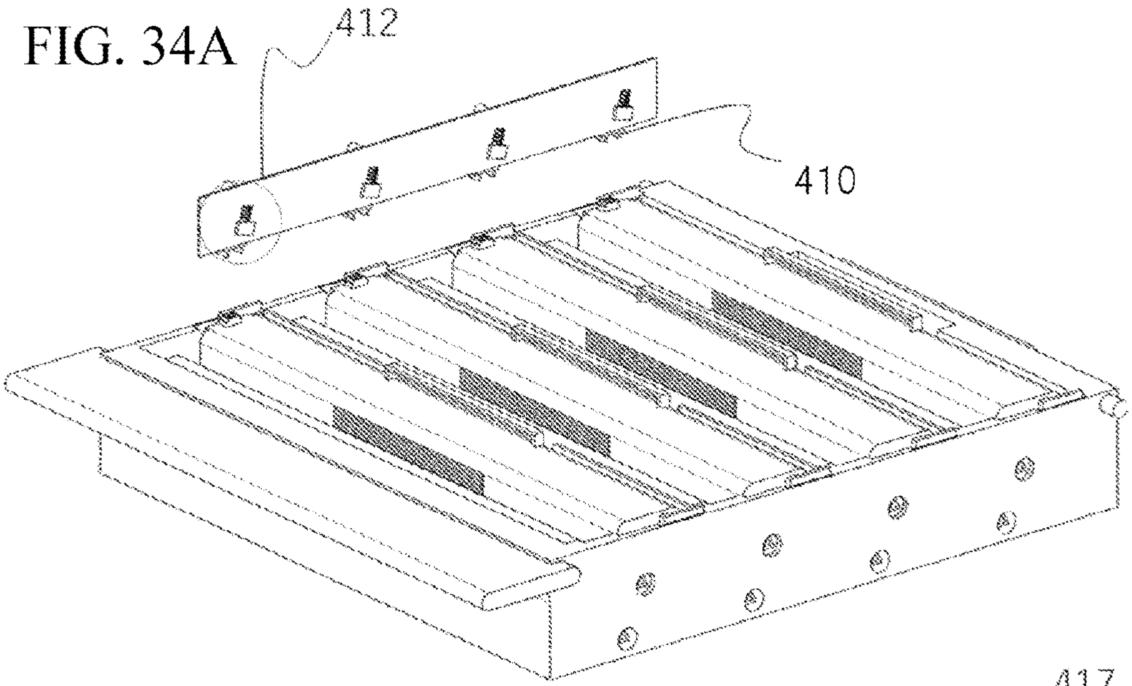
FIGS. 34A to 34C are configuration diagrams of the memory tag connector unit according to Embodiment 4.
Figure 34B:
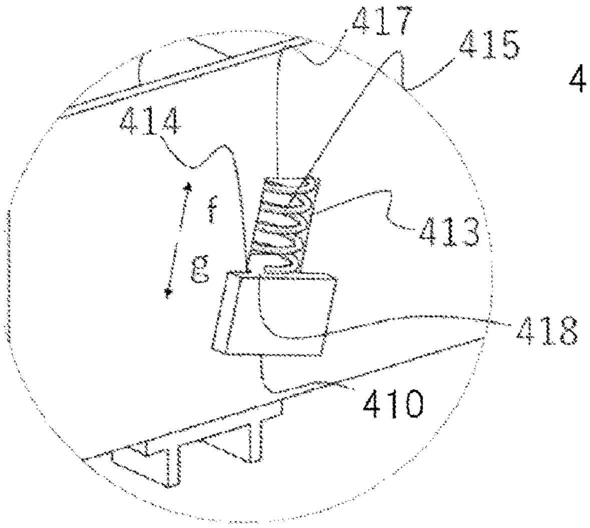
Figure 34C:
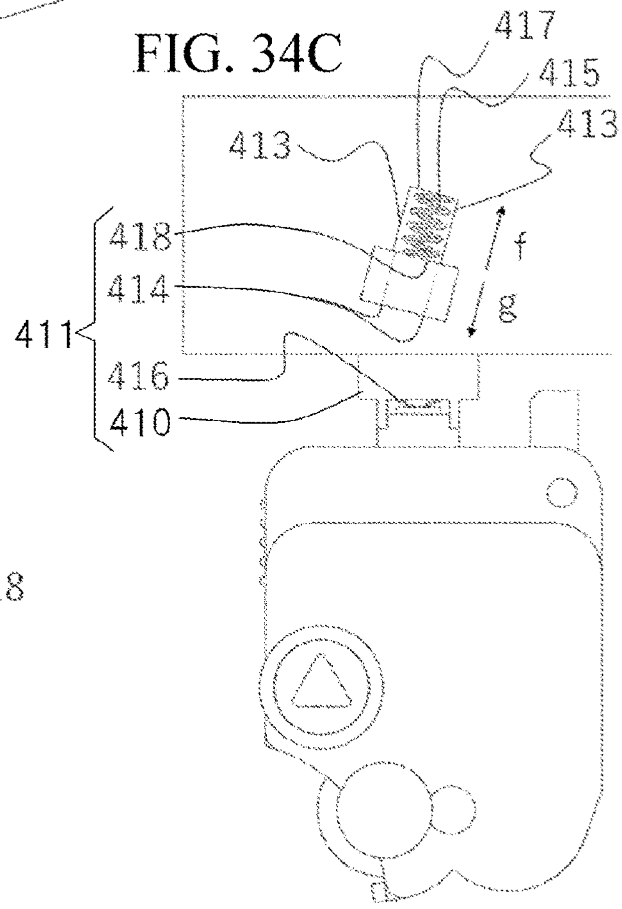

A configuration in which the connector portion 411 of the memory tag connector unit 541 moves following the separating operation of the developing cartridge 502 will be described with reference to FIGS. 34A to 34C. FIG. 34A is a perspective view illustrating the positional relationship between the memory tag connector unit 541 and the cartridge tray 503. FIG. 34B is an enlarged view of a portion surrounded by a circle in FIG. 34A. FIG. 34C is a view illustrating force applied when the memory tag unit 522 and the memory tag connector unit 541 are connected to each other.

As described above, the memory tag connector unit 541 has a connector portion 411, a plate-shaped connector holding portion 412, and an elastic member 415 as main constituent elements. The connector holding portion 412 has a pair of connector guide portions 413 extending in the separating direction (arrow f direction) and a pressure receiving surface 417. As illustrated in FIG. 34C, the connector portion 411 has a protrusion portion 410, an electrical contact 416, a connector guided portion 414 facing the pair of connector guide portions 413, and a pressure receiving surface 418. It is noted that, in the cross-section orthogonal to the longitudinal direction of the developing roller, the direction in which the connector guide portion 413 extends is not limited to the case in which it completely coincides with the separating direction (arrow f direction). The direction in which the connector guide portion 413 extends does not have to be completely the same as the substantial separating direction (arrow f direction) as long as the connector guided portion 414 is movable. For example, when there is a gap between the guide surface (inner side surface) of the connector guide portion 413 and the guided surface of the connector guided portion 414, the extending direction of the connector guide portion 413 does not have to completely coincide with the separating direction (arrow f direction). Further, even when the protrusion portion 410 is swingable or movable with respect to the connector guided portion 414, the extending direction of the connector guide portion 413 does not have to completely coincide with the separating direction (arrow f direction).

The pair of connector guide portions 413 are both side surfaces of a groove-shaped portion formed in the connector holding portion 412, and the elastic member 415 is arranged in the groove-shaped portion. The connector guided portion 414 is movable in the arrow g direction and the arrow f direction integrally with a portion of the connector portion 411 which abuts on the memory tag unit 522, that is, the protrusion portion 410 protruding downward from the connector holding portion 412. The arrow g direction and the arrow f direction correspond to the direction in which the memory tag unit 522 moves when the position of the developing cartridge 502 with respect to the cartridge tray 503 changes between the separation position and the abutting position.

The connector guided portion 414 is guided to the pair of connector guide portions 413 (guide portions). Therefore, the connector guided portion 414 is movable in the separating direction (arrow f direction) relative to the pair of connector guide portions 413 along the pair of connector guide portions 413 extending in the separating direction (arrow f direction). That is, the connector portion 411 is movable with respect to the connector holding portion 412 in the separating direction (arrow f direction). The elastic member 415 as a biasing unit is interposed between the pressure receiving surface 418 of the connector portion 411 and the pressure receiving surface 417 of the connector holding portion 412, and the connector portion 411 is always biased against the connector holding portion 412 in the abutting direction (arrow g direction) which is the opposite direction of the separating direction. Therefore, the connector portion 411 is biased in the abutting direction (arrow g direction) with respect to the connector holding portion 412 within the movable range of the pair of connector guide portions 413. It is noted that the presence of the connector guide portion 413 regulates the movement of the connector portion 411 in a direction other than the moving direction which is the separating direction or the abutting direction.

<<Behavior of Memory Tag Connector Unit During Separating Operation>>

Figures 35A, 35B, 35C:
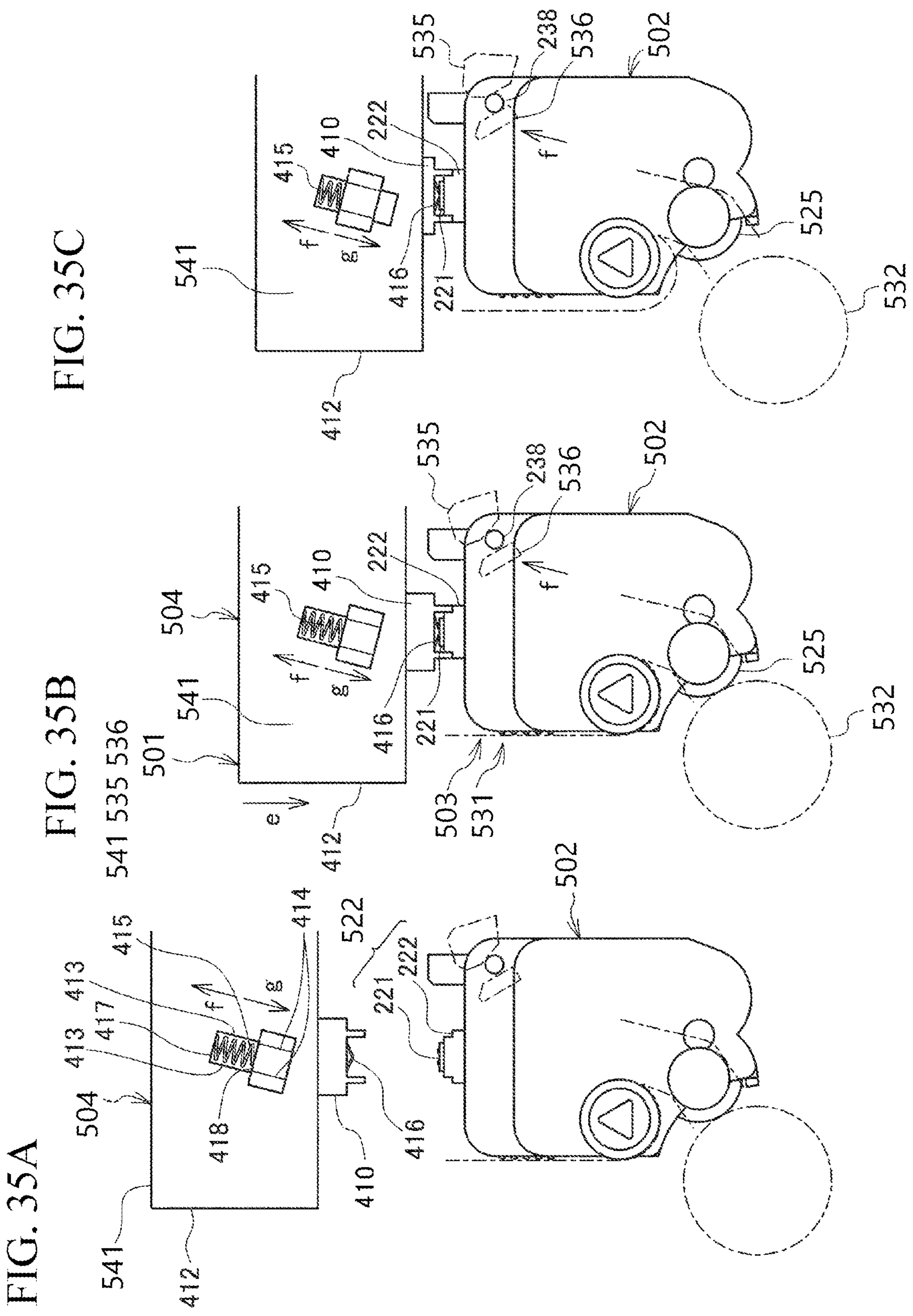
FIGS. 35A to 35C are behavior diagrams when the memory tag connector unit according to Embodiment 4 performs a separating operation.

FIGS. 35A to 35C illustrate the behavior of the memory tag connector unit 541 during the separating operation. FIG. 35A is a view illustrating part of the image forming apparatus 501 in a state in which the front door 545 is opened, when seen from the direction orthogonal to the first direction. The developing cartridge 502 of FIG. 35A is in the second position. FIG. 35B is a view illustrating part of the image forming apparatus 501 in a state in which the front door 545 is closed, when seen from the direction orthogonal to the first direction. In the case of FIG. 35B as well, the developing cartridge 502 is in the second position. FIG. 35C is a view of the memory tag connector unit 541 which is in engagement with the memory tag unit 522, when seen from the direction orthogonal to the first direction. At this time, the developing cartridge 502 is in the third position.

The positions of the memory tag unit 522 and the memory tag connector unit 541 before the front door 545 is closed will be described with reference to FIG. 35A. Since the developing cartridge 502 is in the second position, the position of the memory tag unit 522 is determined. Further, the memory tag connector unit 541 is located above the developing cartridge 502 in the second direction. As described above, the connector portion 411 receives the biasing force in the direction (arrow g direction) opposite to the separating direction from the elastic member 415 and is biased in the direction (arrow g direction) opposite to the separating direction within the movable range. Therefore, the position of the memory tag connector unit 541 is determined.

Next, the state in which the front door 545 is closed and the memory tag connector unit 541 is moved in the arrow e direction will be described with reference to FIG. 35B. The downward movement of the memory tag connector unit 541 on the plane of paper causes the protrusion portion 410 of the connector portion 411 to be engaged with the memory tag holding portion 222.

Next, the state change associated with the separating operation will be described with reference to FIG. 35C. Since the connector portion 411 is movably held in the separating direction (arrow f direction) and is biased in the direction (arrow g direction) opposite to the separating direction, the connector portion 411 moves following the change in the position of the developing cartridge 502 accompanying the separating operation. Therefore, the engagement state between the protrusion portion 410 of the connector portion 411 and the memory tag holding portion 222 is maintained. With this configuration, even when the separating operation is suitable, the memory tag 221 does not rub against the electrical contact 416, and the wear of the memory tag 221 or the electrical contact 416 can be reduced.

As described above, in the image forming apparatus 501 of the present embodiment, the memory tag connector unit 541 is arranged in the vicinity of the optical unit 543 having a space in the first direction in the related art. Thus, the memory and the control unit are electrically connected to each other by closing the front door 545 in a state in which the cartridge tray 503 is inserted into the main body. As described above, according to the present embodiment, it is possible to provide the image forming apparatus 501 having the memory unit without increasing the size of the image forming apparatus 501.

Further, considering the engagement force with which the memory tag connector unit 541 (memory connection unit) is engaged with the memory tag unit 522, the relationship of pressurizing force B>pressurizing force A is set. Thus, the abutting pressure of the developing roller 525 to the photosensitive drum 532 can be kept optimum and a good image can be output.

Further, the memory tag unit 522 is positioned so as to straddle each of the eaves portion 234 and the third surface 233, so that the reduction of the space of the storage chamber 235 can be minimized. Therefore, the developer 521 can be efficiently stored in the storage chamber 235.

Further, since the memory tag connector unit 541 includes the elastic member 415, it is possible to follow the separating operation between the developing cartridge 502 and the photosensitive drum 532. Therefore, the friction between the memory tag 221 and the electrical contact 416 can be suppressed, and the risk of wear can be reduced.

Further, the memory tag unit 572 is provided on the surface not covered with the cartridge tray 503, that is, on the upper surface (third surface 233) of the developing cartridge housing when the developing cartridge 502 is housed in the cartridge tray 503. Compared to the case in which the memory tag unit 572 is provided on the side surface (first surface 231 or second surface 232) of the developing cartridge or on the surface of the developing cartridge 502 orthogonal to the third direction, the memory tag connector unit 541 can be incorporated into the main body under the condition that the configuration of the cartridge tray 503 is not easily restricted. For example, when the memory tag unit 572 is provided on the side surface of the developing cartridge, the side wall of the cartridge tray 503 becomes an obstacle even when the memory tag connector unit 541 is connected to the memory tag unit 572. Further, when the memory tag unit 572 is provided so that the surface of the developing cartridge 502 orthogonal to the third direction or the electrical contact surface of the memory tag unit 572 intersects with the third direction, the memory tag connector unit 541 needs to be arranged inside the cartridge tray 503. Thus, the arrangement is restricted. According to the above-described embodiment, such a problem can be solved.

Embodiment 5

An image forming apparatus 506 according to another embodiment of the present invention and a developing cartridge 507 used in the image forming apparatus 506 will be described. In the following description, the description will be focused on the parts different from Embodiment 1. The image forming apparatus 506 of the present embodiment differs from that of Embodiment 4 in the configuration of the memory tag unit 572 and the memory tag connector unit 591.

<<Configuration of Memory Tag Unit and Memory Tag Connector Unit>>

Figure 36A:
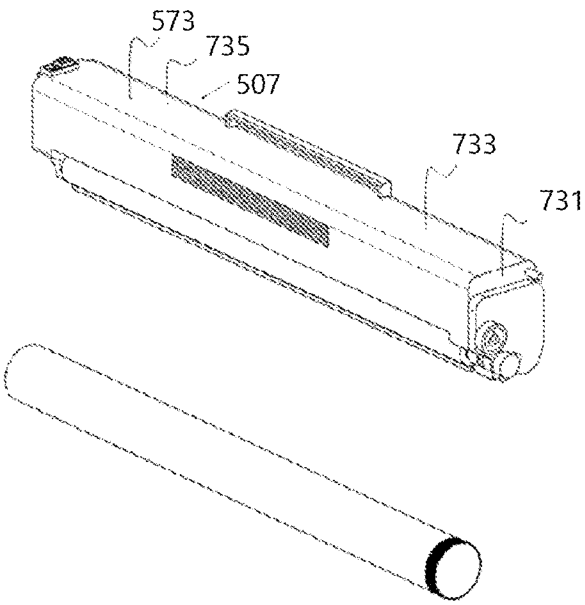
FIGS. 36A to 36C are configuration diagrams of a memory tag unit according to Embodiment 5.
Figure 36B:
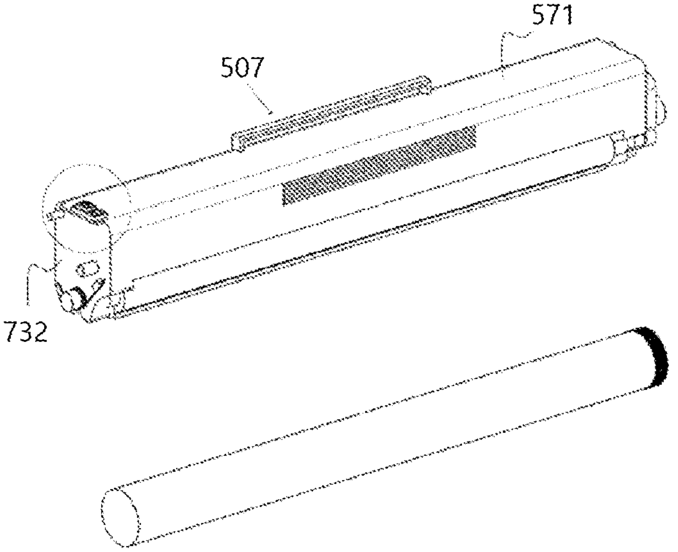
Figure 36C:
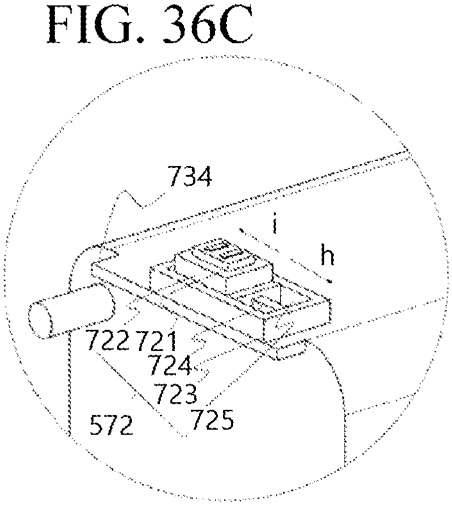

FIGS. 36A to 36C illustrate the configuration of the memory tag unit 572 arranged in the developing cartridge 507. FIGS. 36A and 36B are perspective views of the developing cartridge 507 when seen from different directions, respectively, and also illustrate the positional relationship with the photosensitive drum 532. FIG. 36C is an enlarged view corresponding to a portion surrounded by a circle in FIG. 36B and illustrates the detailed configuration of the memory unit.

As illustrated, the memory tag unit 572 of the present embodiment has a memory tag 721, a memory tag holding portion 722 as a memory holding unit for holding the memory tag 721, a memory tag guide portion 723 as a memory guide unit for guiding the memory tag holding portion 722, and a first elastic member 724 for applying the biasing force to the memory tag holding portion 722 in the arrow i direction. With this configuration, the memory tag 721 is movably held, and its moving direction is regulated to the third direction in which the cartridge tray 503 is inserted.

The developing container 573 is a housing which can store the developer 571. A storage chamber 735 for storing the developer 571 is provided inside the developing container 573. The developing container 573 has a first surface 731 provided at an end on one direction side in the first direction and a second surface 732 provided at an end opposite to the first surface 731 in the first direction. The developing container 573 has a third surface 733 which is an upper surface portion in the second direction. Further, the developing container 573 has an eaves portion 734 located on an extension of the third surface 733 in the first direction. In the present embodiment, the memory tag unit 572 is located so as to straddle the eaves portion 734 and the third surface 733. However, the memory tag unit 572 may be located at the end of the third surface 733 in the first direction or the eaves portion 734. Therefore, since the space of the storage chamber 735 in which the developer 571 is stored is not damaged, or the loss of space can be minimized, the developer 571 can be efficiently stored in the space of the storage chamber 735.

As described above, the memory tag guide portion 723 is provided so as to straddle the third surface 733 and the eaves portion 734 of the developing container 573, and has a pair of guide surfaces 725 facing each other in the first direction (one guide surface is not illustrated). The guide surface 725 extends in the arrow h direction. The memory tag holding portion 722 has a guided surface (not illustrated) so as to be guided to the guide surface 725. Therefore, the memory tag holding portion 722 causes the guided surface (not illustrated) to be guided by the guide surface 725. Thus, the memory tag holding portion 722 is supported along the guide surface 725 so as to be movable in the arrow h direction with respect to the developing cartridge 507. Further, the first elastic member 724 applies the biasing force to the memory tag holding portion 722 in the arrow i direction (direction opposite to the arrow h direction).

Figure 37A:
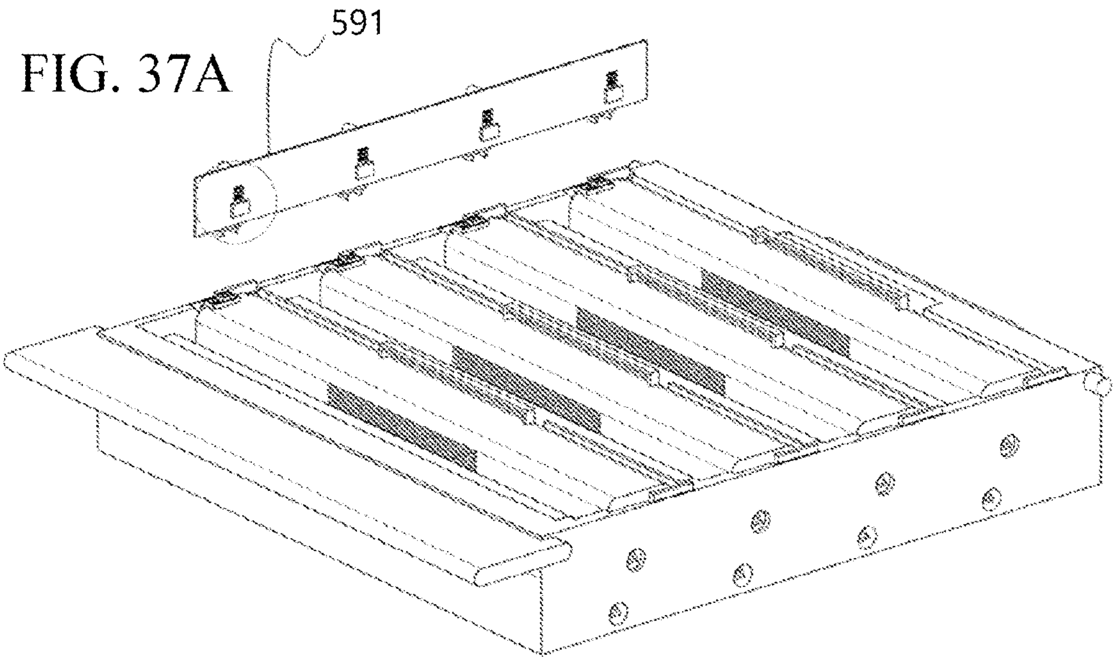
FIGS. 37A to 37C are configuration diagrams of a memory tag connector unit according to Embodiment 5.
Figure 37B:
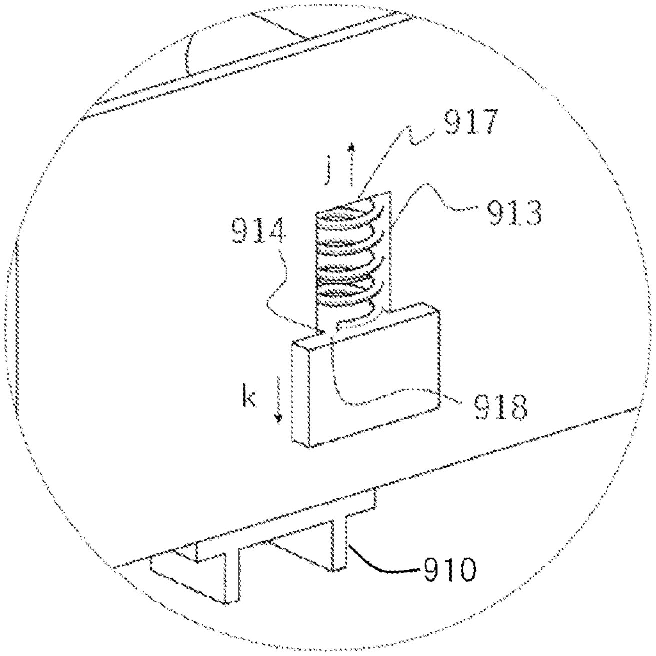
Figure 37C:
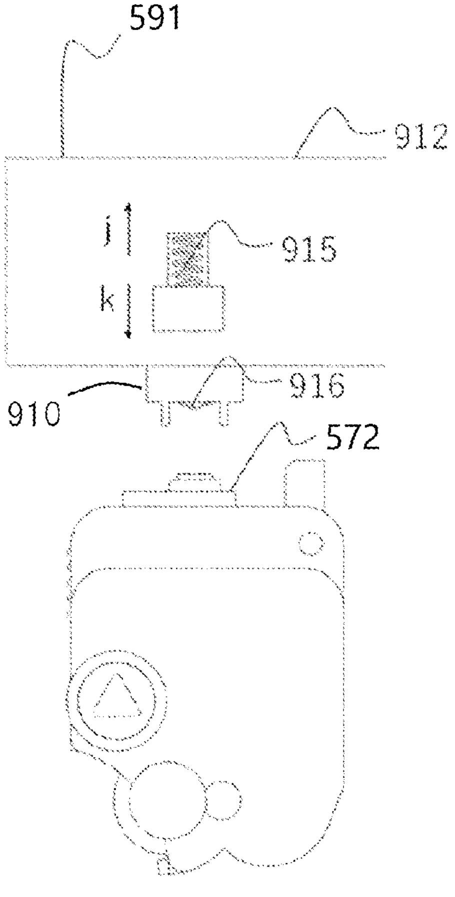

FIGS. 37A to 37C illustrate the configuration of the memory tag connector unit 591 of the present embodiment. FIG. 37A illustrates the positional relationship between the configuration of the memory tag connector unit 591 and the cartridge tray 503. FIG. 37B is an enlarged view of a portion surrounded by a circle in FIG. 37A. FIG. 37C is a view illustrating force applied when the memory tag unit 572 and the memory tag connector unit 591 are connected to each other.

As illustrated in FIGS. 37A to 37C, the memory tag connector unit 591 has a connector portion 911, a connector holding portion 912, and a second elastic member 915 as main constituent elements. The connector holding portion 912 has a pair of connector guide portions 913 extending in the arrow j direction and a pressure receiving surface 917. The connector portion 911 has a protrusion portion 910, an electrical contact 916, a connector guided portion 914 facing the pair of connector guide portions 913, and a pressure receiving surface 918.

The connector guided portion 914 is guided to the pair of connector guide portions 913. Therefore, the connector guided portion 914 is movable in the arrow j direction relative to the pair of connector guide portions 913 along the pair of connector guide portions 913 extending in the arrow j direction. That is, the connector portion 911 is movable with respect to the connector holding portion 912 in the arrow j direction. The second elastic member 915 is interposed between the pressure receiving surface 918 of the connector portion 911 and the pressure receiving surface 917 of the connector holding portion 912, and the connector portion 911 is always biased in the arrow k direction with respect to the connector holding portion 912. Therefore, the connector portion 911 is biased in the arrow k direction with respect to the connector holding portion 912 within the movable range of the pair of connector guide portions 913.

It is noted that, in this drawing, the connector guide portion 913 regulates the moving direction of the connector portion 911 in the vertical direction substantially perpendicular to the third direction. However, the moving direction of the connector portion 911 is not limited thereto. The moving direction of the connector portion 911 may be determined according to the relationship with the movement distance of the memory tag holding portion 722 on the memory tag guide portion 723. That is, it is sufficient that the movement of the memory tag holding portion 722 and the movement of the connector portion 911 can absorb the change in the connection position of the memory tag 721 and the electrical contact 916 based on the separating operation.

<<Behavior of Memory Tag Unit and Memory Tag Connector Unit During Separating Operation>>

Figures 38A, 38B, 38C:
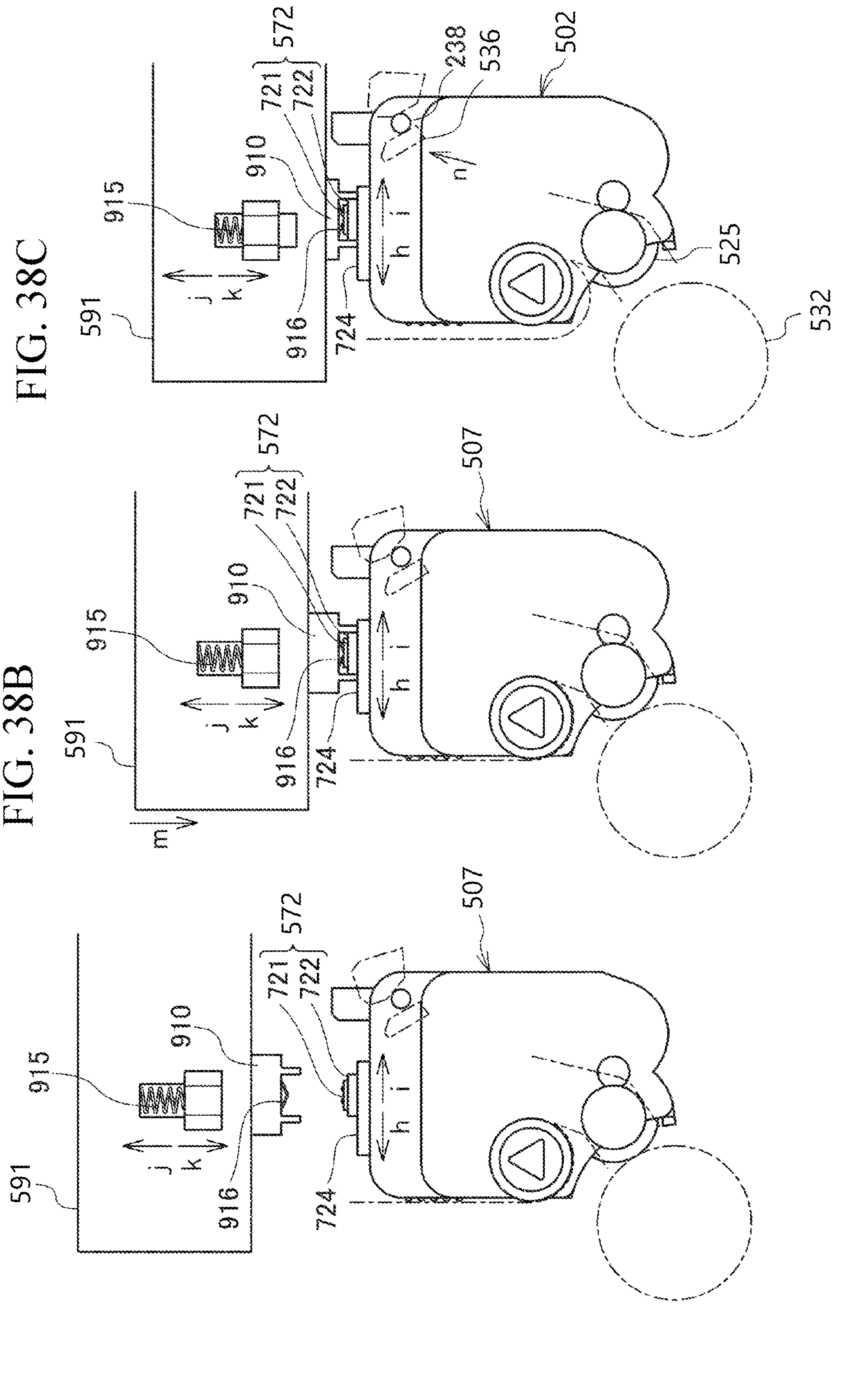
FIGS. 38A to 38C are behavior diagrams when the memory tag connector unit according to Embodiment 5 performs a separating operation.

FIGS. 38A to 38C illustrate the behavior of the memory tag unit 572 and the memory tag connector unit 591 during the separating operation. FIG. 38A is a view illustrating part of the image forming apparatus 506 in a state in which the front door 545 is opened, when seen from the direction orthogonal to the first direction. The developing cartridge 507 of FIG. 38A is in the second position. FIG. 38B is a view illustrating part of the image forming apparatus 506 in a state in which the front door 545 is closed, when seen from the direction orthogonal to the first direction. In the case of FIG. 38B as well, the developing cartridge 507 is in the second position. FIG. 38C is a view of the memory tag connector unit 591 which is in engagement with the memory tag unit 572, when seen from the direction orthogonal to the first direction. At this time, the developing cartridge 507 is in the third position.

The position relationship between the memory tag unit 572 and the memory tag connector unit 591 before the front door 545 is closed will be described with reference to FIG. 38A. At this time, the developing cartridge 507 is located at the second position. Further, the memory tag holding portion 722 is biased in the arrow i direction by the first elastic member 724. Therefore, the position of the memory tag unit 572 is determined. Further, the memory tag connector unit 591 is located above the developing cartridge 507 in the second direction. As described above, the connector portion 911 receives the biasing force in the arrow k direction from the second elastic member 915 and is biased in the arrow k direction within the movable range. Therefore, the position of the memory tag connector unit 591 is determined.

Next, the state in which the front door 545 is closed and the memory tag connector unit 591 is moved in the arrow m direction will be described with reference to FIG. 38B. In the process in which the memory tag connector unit 591 moves in the arrow m direction, the protrusion portion 910 of the connector portion 911 is engaged with the memory tag holding portion 722.

Next, the state change associated with the separating operation will be described with reference to FIG. 38C. The connector portion 911 is held so as to be movable in the arrow j direction, and the memory tag holding portion 722 is held so as to be movable in the arrow h direction. The connector portion moving direction (arrow j direction) and the separating direction (arrow n direction) are different from each other. Therefore, when the developing cartridge 507 is separated in the separating direction (arrow n direction), the force for relatively shifting the position in the arrow h direction acts between the memory tag holding portion 722 and the connector portion 911.

However, as described above, the memory tag holding portion 722 is movable in the arrow h direction with respect to the developing cartridge 507. Therefore, even in the process in which the developing cartridge 507 moves from the second position to the third position, or even when the developing cartridge 507 is in the third position, the memory tag holding portion 722 and the connector portion 911 do not move relative to each other.

Therefore, following the separating operation of the developing cartridge 507, the protrusion portion 910 of the connector portion 911 and the memory tag holding portion 722 are maintained in the engaged state. That is, although the separating direction, the moving direction of the memory tag holding portion 722, and the moving direction of the connector portion 911 are different from each other, the influence of the movement of the developing cartridge 502 in the separating direction is divided into the moving direction of the memory tag holding portion 722 and the moving direction of the connector portion 911 and absorbed. Therefore, since the memory tag 721 does not rub against the electrical contact 916 even when the separating operation is performed, the risk that the memory tag 721 is rubbed against the electrical contact 916 and worn can be reduced.

As described above, even when the separating direction of the developing cartridge 507 and the moving direction of the connector portion are different from each other, the memory tag holding portion 722 is movable relative to the developing cartridge 507. Thus, the memory tag 721 does not rub against the electrical contact 916 due to the separating operation, and the risk that the memory tag 721 is rubbed against the electrical contact 916 and worn can be reduced.

<Modification>

Further, Embodiments 4 and 5 have been described using the developing cartridges 502 and 507 which can be mounted on the cartridge trays 503 and 8, respectively. However, the developing cartridges 502 and 507 may be mountable on a drum cartridge. The drum cartridge is a cartridge having one photosensitive drum. Further, the developing cartridges 502 and 507 may be process cartridges having a photosensitive drum. The process cartridge is one cartridge including a developing roller and a photosensitive drum. A toner cartridge may be used instead of the developing cartridges 502 and 507. The toner cartridge is a cartridge which can store toner and has no developing roller.

That is, the present invention can be applied to an image forming apparatus including a main body, an attachment portion, and a cartridge member attached to the attachment portion. When the developing cartridge is mounted on the drum cartridge, the drum cartridge hits the attachment portion. Further, for example, when the process cartridge is housed in the cartridge tray, the process cartridge is a cartridge member and the cartridge tray corresponds to the attachment portion. When the toner cartridge is used, the toner cartridge corresponds to the cartridge member.

Even in these cases, following the change in the positional relationship between the separation position and the abutting position in the attachment portion and the cartridge member, the electrical connection between both is maintained by moving the main body side memory connection unit connected to the cartridge member side memory unit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD) T n, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-139129, filed on Jul. 29, 2019, Japanese Patent Application No. 2019-132086, filed on Jul. 17, 2019, Japanese Patent Application No. 2019-172221, filed on Sep. 20, 2019, Japanese Patent Application No. 2019-135189, filed on Jul. 23, 2019, and Japanese Patent Application No. 2020-098379, filed on Jun. 5, 2020, which are hereby incorporated by reference herein in their entirety.

What is claimed is:

1. An image forming apparatus comprising:

a main body, the main body including a controller and a first metal terminal;

a tray which is movable between a housed position housed in the main body and a drawn-out position drawn out from the main body, the tray including:

a frame, photosensitive drums, and a communicator provided at the frame, the communicator including tray contacts and a second metal terminal, cartridges detachably attached to the frame, wherein each of the cartridges includes a housing storing toner, a developing roller, a supporting member provided at one end in a longitudinal direction of the developing roller, and a memory medium configured to store information about each of the cartridges and being supported by the supporting member, the memory medium including a memory contact, wherein in a housed state in which the cartridges are attached to the frame and the tray is in the housed position, each of the cartridges is capable of taking a first position in which the developing roller is in contact with one of the photosensitive drums and a second position in which the developing roller separates from one of the photosensitive drums while the memory contact is in contact with one of the tray contacts, wherein in the housed state the memory contact faces an upstream side with respect to a moving direction of the tray from the drawn-out position to the housed position and the tray contacts face a downstream side with respect to the moving direction, wherein in the housed state, the first metal terminal and the second metal terminal are in contact with each other, and the memory contact and one of the tray contacts are in contact with each other while facing each other in the moving direction of the tray, so that the controller is allowed to perform a process related to the memory medium.

2. The image forming apparatus according to claim 1, wherein each of the cartridges comprises a protrusion portion protruding in the longitudinal direction from part of the housing which intersects with the longitudinal direction, the tray comprises guide members, each of the guide members is configured to be provided at a position corresponding to the one end of the housing in the longitudinal direction when each of the cartridges is mounted in the frame, and is configured to guide the protrusion portion at a downstream side of each of the tray contacts in a mounting direction of each of the cartridges.

3. The image forming apparatus according to claim 2, wherein the tray comprises cartridge positioning portions, each of the cartridge positioning portions is configured to position the protrusion at the downstream side of each of the tray contacts in the mounting direction.

4. The image forming apparatus according to claim 2, wherein a cross-section of each of the guide members in a direction orthogonal to the longitudinal direction has a substantially U-shape including a first side portion and a second side portion facing each other.

5. The image forming apparatus according to claim 2, wherein each of the guide members is provided on a side wall of the frame extending in a direction orthogonal to the longitudinal direction, and a width of each of the guide members in the longitudinal direction is within a width of the side wall.

6. The image forming apparatus according to claim 2, wherein the tray includes a pressure member which pressurizes one of the cartridges.

7. The image forming apparatus according to claim 1, wherein in the state the cartridges are mounted in the frame, in each of the cartridges, the developing roller is positioned at the downstream side of the memory contact of the memory medium with respect to the moving direction of the tray from the drawn-out position to the housed position.

8. The image forming apparatus according to claim 7, wherein each of the cartridges comprises a spring which pressurizes the supporting member toward one of the tray contacts.

9. The image forming apparatus according to claim 8, wherein in the state the cartridges are mounted in the frame, a direction in which the spring pressurizes the supporting member is opposite to the moving direction of the tray from the drawn-out position to the housed position.

10. The image forming apparatus according to claim 8, wherein a deformation amount of the spring when each of the cartridges is in the second position is larger than a deformation amount of the spring when each of the cartridges is in the first position.

11. The image forming apparatus according to claim 8, wherein the spring is a compression spring, and each of the cartridge includes a receiving surface supporting the spring, wherein a distance between the receiving surface and the supporting member when each of the cartridges is in the second position is shorter than a distance between the receiving surface and the supporting member when each of the cartridges is in the first position.

12. The image forming apparatus according to claim 1, wherein the frame includes a first wall extending in the moving direction, a second wall extending in the moving direction, and a connected wall extending a direction crossing the moving direction and connected with the first wall and the second wall, wherein in the housed state, the cartridges are supported by the first wall and the second wall, and the first wall and the second wall are opposite to each other in the longitudinal direction, wherein the connected wall faces the moving direction and supports the second metal terminal.

13. The image forming apparatus according to claim 12, wherein, with respect to the moving direction, the connected wall is closer to a downstream end of the frame than to an upstream end of the frame.

* * * * *